US011275499B2

(12) United States Patent
Nilo et al.

(10) Patent No.: US 11,275,499 B2
(45) Date of Patent: Mar. 15, 2022

(54) DEVICE, METHOD, AND GRAPHICAL USER INTERFACE FOR CHANGING A NUMBER OF COLUMNS OF AN APPLICATION REGION

(71) Applicant: Apple Inc., Cupertino, CA (US)

(72) Inventors: Bruce D. Nilo, Cupertino, CA (US); Jason Clay Beaver, San Jose, CA (US)

(73) Assignee: APPLE INC., Cupertino, CA (US)

( * ) Notice: Subject to any disclaimer, the term of this patent is extended or adjusted under 35 U.S.C. 154(b) by 677 days.

(21) Appl. No.: 15/609,517

(22) Filed: May 31, 2017

(65) Prior Publication Data

US 2017/0357436 A1 Dec. 14, 2017

Related U.S. Application Data

(60) Provisional application No. 62/348,671, filed on Jun. 10, 2016.

(51) Int. Cl.
| G06F 3/0488 | (2013.01) |
| G06F 3/04883 | (2022.01) |
| G06F 3/0482 | (2013.01) |
| G06F 3/04845 | (2022.01) |
| G06Q 10/10 | (2012.01) |

(Continued)

(52) U.S. Cl.
CPC ........ G06F 3/04883 (2013.01); G06F 3/0482 (2013.01); G06F 3/0483 (2013.01); G06F 3/04845 (2013.01); G06F 3/04886 (2013.01); G06Q 10/10 (2013.01); G06Q 10/107 (2013.01); *G06F 2203/04803* (2013.01)

(58) Field of Classification Search
CPC ... H04L 65/403; H04L 67/26; H04L 67/1095; H04L 51/16; H04L 4143/106; G06F 17/24; G06F 17/2288; G06F 3/04883; G06F 3/0482; G06F 3/04845; G06F 3/0483; G06F 3/04886; G06F 2203/04803; G06Q 10/10; G06Q 10/107
See application file for complete search history.

(56) References Cited

U.S. PATENT DOCUMENTS

| 6,525,749 B1 * | 2/2003 | Moran ................ G06F 3/04883 715/863 |
| 7,530,029 B2 * | 5/2009 | Satterfield ............... G06F 9/451 715/779 |

(Continued)

*Primary Examiner* — William L Bashore
*Assistant Examiner* — Gregory A Distefano
(74) *Attorney, Agent, or Firm* — Fernando & Partners, LLP

(57) ABSTRACT

In accordance with some embodiments, a method is performed at a device with one or more processors, non-transitory memory, a display, and an input device. The method includes displaying, on the display, a first column and a second column in an application region. The method includes detecting, via the input device, a first user input that starts at a location at a top of the application region and moves toward an edge of the application region. The method includes, in response to detecting the first user input, changing the number of columns displayed in the application region, wherein changing the number of columns displayed in the application region includes, in accordance with a determination that the first user input was in a first direction, displaying a third column in the application region while maintaining display of the first column and the second column in the application region.

32 Claims, 48 Drawing Sheets

(51) Int. Cl.
    *G06F 3/0483*    (2013.01)
    *G06F 3/04886*   (2022.01)

(56) References Cited

U.S. PATENT DOCUMENTS

| | | | | |
|---|---|---|---|---|
| 8,527,909 | B1* | 9/2013 | Mullany | G06F 3/0484 |
| | | | | 345/173 |
| 2005/0068290 | A1* | 3/2005 | Jaeger | G06F 3/04845 |
| | | | | 345/156 |
| 2011/0163968 | A1* | 7/2011 | Hogan | G06F 3/04883 |
| | | | | 345/173 |
| 2012/0110515 | A1* | 5/2012 | Abramoff | G06F 16/904 |
| | | | | 715/854 |
| 2013/0047104 | A1* | 2/2013 | Chen | G06F 3/0482 |
| | | | | 715/765 |
| 2014/0033093 | A1* | 1/2014 | Brauninger | G06F 3/04883 |
| | | | | 715/765 |
| 2014/0372856 | A1* | 12/2014 | Radakovitz | G06F 40/18 |
| | | | | 715/220 |
| 2016/0062508 | A1* | 3/2016 | Ilmonen | G06F 3/04883 |
| | | | | 345/174 |
| 2016/0179798 | A1* | 6/2016 | Franks | G06F 3/04883 |
| | | | | 715/739 |
| 2016/0323224 | A1* | 11/2016 | Stein | G06F 40/174 |

\* cited by examiner

600

```
Changing the number of columns displayed in the application region ――606

Ⓐ

┌─────────────────────────────────────────────────────────────┐
│   Not changing a size of the application region              │――622
└─────────────────────────────────────────────────────────────┘
┌─────────────────────────────────────────────────────────────┐
│   Not changing a size of the second column                   │――624
└─────────────────────────────────────────────────────────────┘
┌─────────────────────────────────────────────────────────────┐
│   The first column displays a content file and the second    │――626
│ column displays a list of content files                      │
│  ┌────────────────────────────────────────────────────────┐  │
│  │   In response to detecting a user input at a location of one of │――628
│  │ the list of content files, changing display of the first column to │
│  │ display the corresponding content file                  │  │
│  └────────────────────────────────────────────────────────┘  │
└─────────────────────────────────────────────────────────────┘
┌─────────────────────────────────────────────────────────────┐
│   The second column displays a list of content files and the third │――630
│ column displays a list of content folders                    │
│  ┌────────────────────────────────────────────────────────┐  │
│  │   In response to detecting a user input at a location of one of │――632
│  │ the content folders, changing display of the second column to │
│  │ display a corresponding list of content files           │  │
│  └────────────────────────────────────────────────────────┘  │
└─────────────────────────────────────────────────────────────┘
┌─────────────────────────────────────────────────────────────┐
│   In accordance with a determination that the first user input │――634
│ included a first amount of movement toward the edge of the application │
│ region, changing the number of columns by a first number of columns │
└─────────────────────────────────────────────────────────────┘
┌─────────────────────────────────────────────────────────────┐
│   In accordance with a determination that the first user input │――636
│ included a second amount of movement, greater than the first amount of │
│ movement, toward the edge of the application region, changing the │
│ number of columns by a second number of columns greater than the first │
│ number of columns                                            │
└─────────────────────────────────────────────────────────────┘
┌─────────────────────────────────────────────────────────────┐
│   In accordance with a determination that the first user input │――638
│ included a third amount of movement, greater than the second amount of │
│ movement, toward the edge of the application region, changing the │
│ number of columns by the second number of columns and displaying a │
│ different column in the application region                   │
└─────────────────────────────────────────────────────────────┘

DEVICE, METHOD, AND GRAPHICAL USER INTERFACE FOR CHANGING A NUMBER OF COLUMNS OF AN APPLICATION REGION

CROSS-REFERENCE TO RELATED-APPLICATIONS

This application claims the benefit of U.S. Provisional Patent App. No. 62/348,671, filed on Jun. 10, 2016, which is incorporated by reference in its entirety.

TECHNICAL FIELD

This relates generally to electronic devices with touch-sensitive surfaces, including but not limited to electronic devices with touch-sensitive surfaces that display an application region with a changing number of columns.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

Some user interfaces includes applications with a number of columns. The user interfaces can be manipulated to display different information in the columns. However, methods for performing these manipulations are cumbersome and inefficient. For example, using a sequence of mouse-based inputs to select one or more user interface objects and perform one or more actions on the selected user interface objects to display different information in one or more of the columns is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for displaying an application region with a changing number of columns. Such methods and interfaces optionally complement or replace conventional methods for displaying an application region with a changing number of columns. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes displaying, on the display, a first column and a second column in an application region. The method includes detecting, via the input device, a first user input that starts at a location at a top of the application region and moves toward an edge of the application region. The method includes, in response to detecting the first user input, changing the number of columns displayed in the application region, wherein changing the number of columns displayed in the application region includes, in accordance with a determination that the first user input was in a first direction, displaying a third column in the application region while maintaining display of the first column and the second column in the application region.

In accordance with some embodiments, an electronic device includes a display unit configured to display a user interface, one or more input units configured to receive user inputs, and a processing unit coupled with the display unit and the one or more input units. The processing unit is configured display, on the display unit, a first column and a second column in an application region. The processing unit is configured to detect, via the one or more input devices, a first user input that starts at a location at a top of the application region and moves toward an edge of the application region. The processing unit is configure to, in response to detecting the first user input, change the number of columns displayed in the application region by, in accordance with a determination that the first user input was in a first direction, displaying a third column in the application region while maintaining display of the first column and the second column in the application region.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for displaying an application region with a changing number of columns, thereby increasing the effectiveness, efficiency, and user satisfaction with such devices. Such methods and interfaces may complement or replace conventional methods for displaying an application region with a changing number of columns.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6D are flow diagrams illustrating a method of displaying an application region with a changing number of columns in accordance with some embodiments.

DESCRIPTION OF EMBODIMENTS

Many electronic devices have graphical user interfaces with folders that contain digital content files. Applications used to view the content or documents can have a limited amount of space to display to content of the content files while simultaneously displaying the folders and affordances for selecting the content file to be viewed. In the embodiments described below, an improved method for displaying content is achieved by changing the number of columns in an application region in accordance with user input at a top of the application region. Detecting a user input starting at the top of the application region and moving toward an edge of the application region changes the number of columns displayed. Thus, at times, the application region includes three columns, one displaying a list of folders, one displaying a list of content files within a selected folder, and one displaying content of a selected content file such that a content file can be more easily selected. At other times, the application region includes a single column displaying content of the selected content file in a larger area, such that the content can be more easily consumed.

Figure 2:
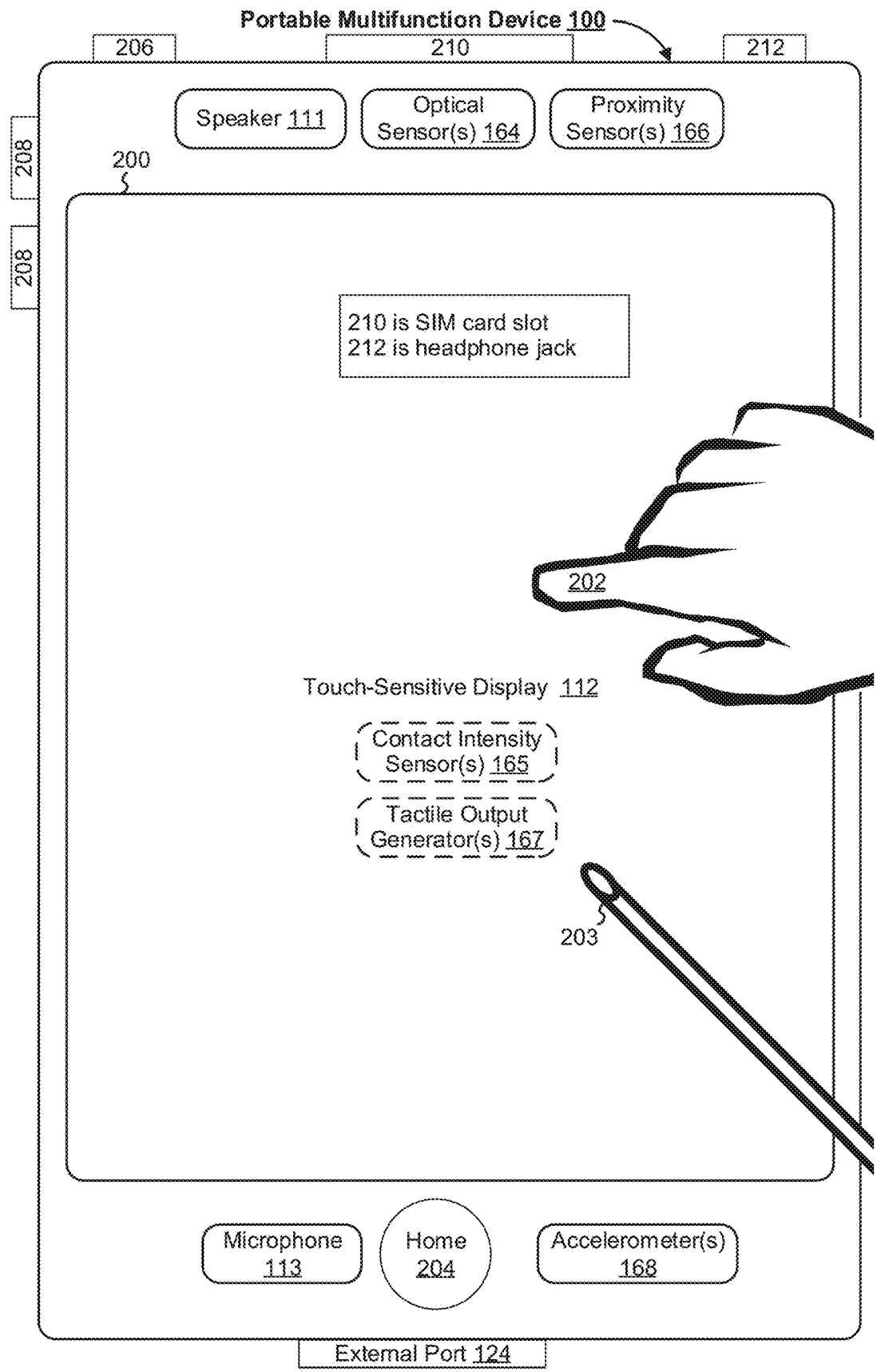
FIG. 2 illustrates a portable multifunction device having a touch screen in accordance with some embodiments.
Figure 3:
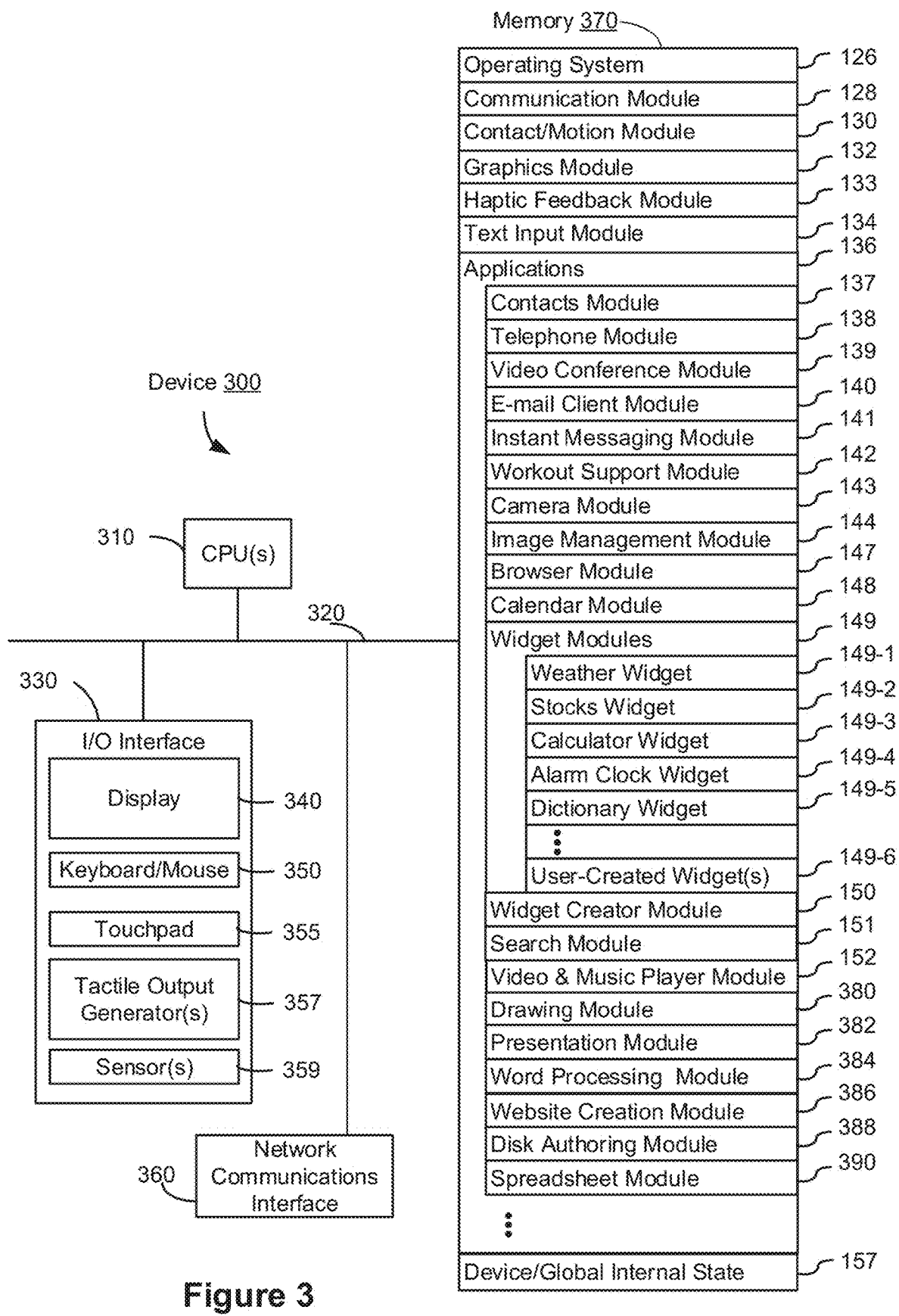
FIG. 3 is a block diagram of an example multifunction device with a display and a touch-sensitive surface in accordance with some embodiments.
Figure 4A:
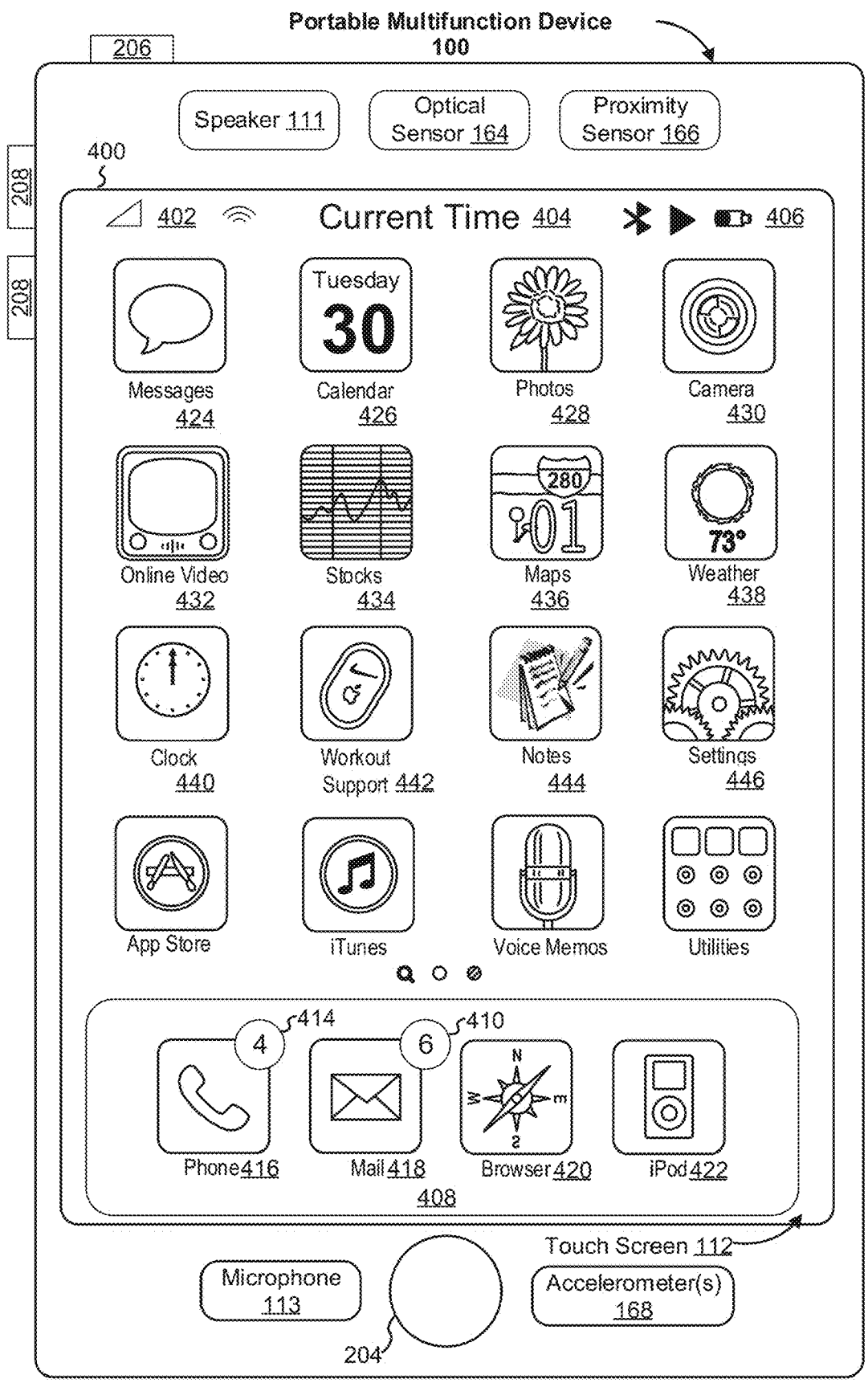
FIG. 4A illustrates an example user interface for a menu of applications on a portable multifunction device in accordance with some embodiments.
Figure 4B:
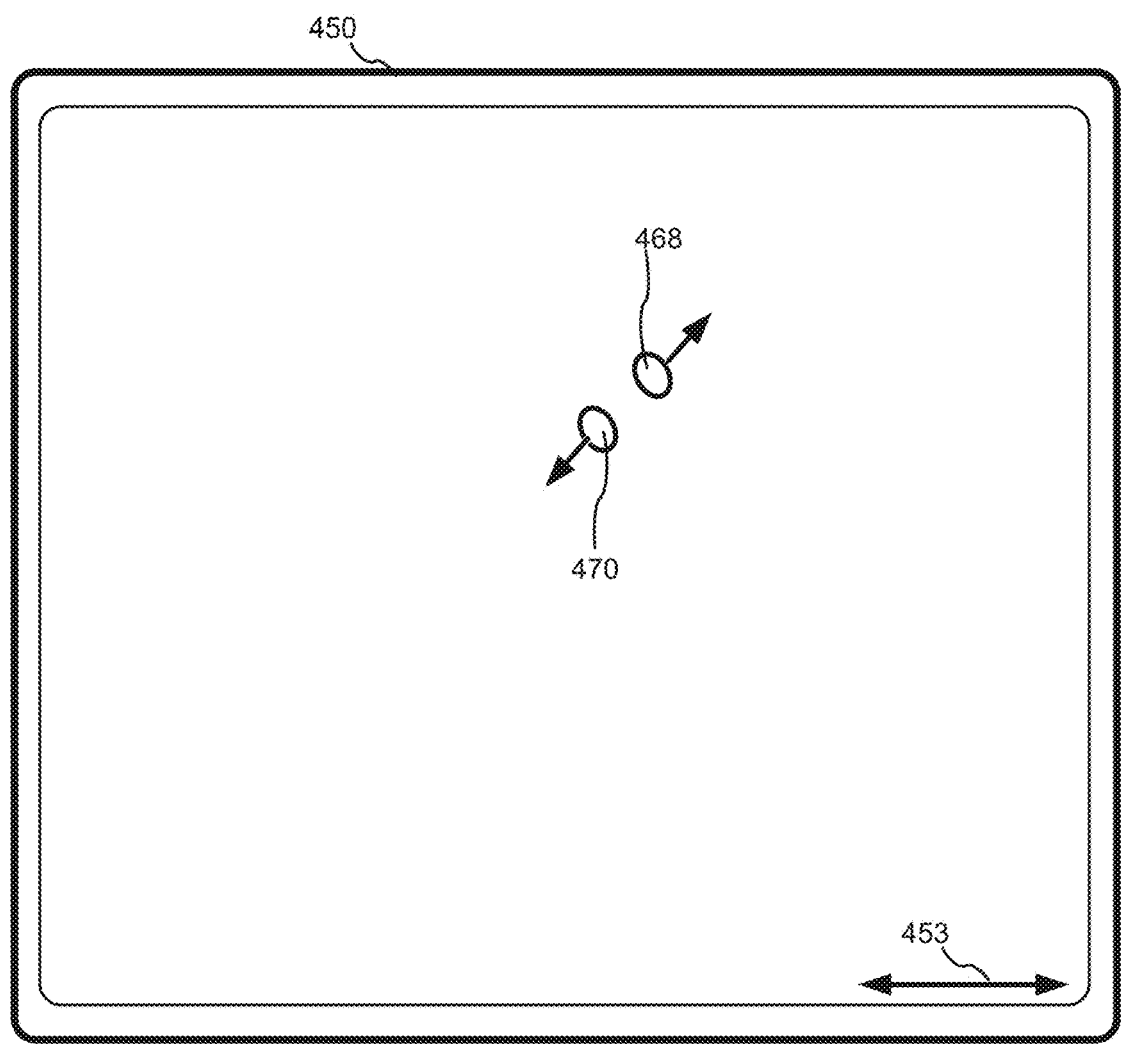
FIG. 4B illustrates an example user interface for a multifunction device with a touch-sensitive surface that is separate from the display in accordance with some embodiments.
Figure 4B:
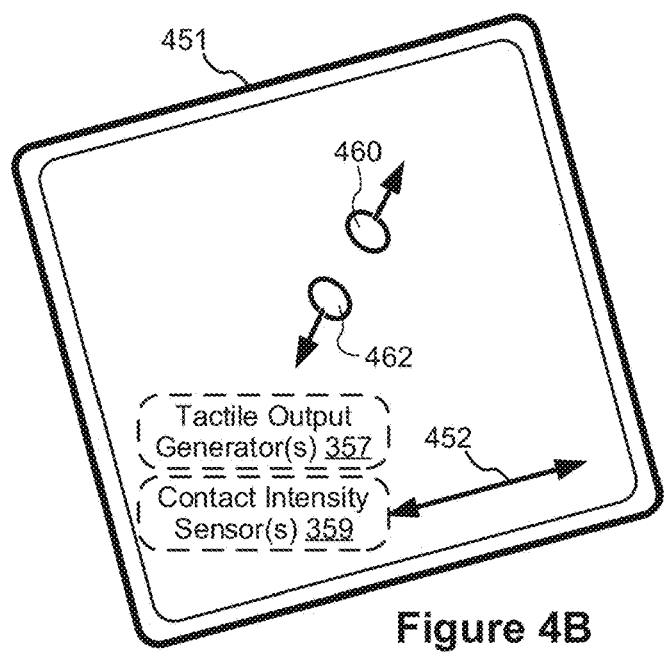
Figure 5A:
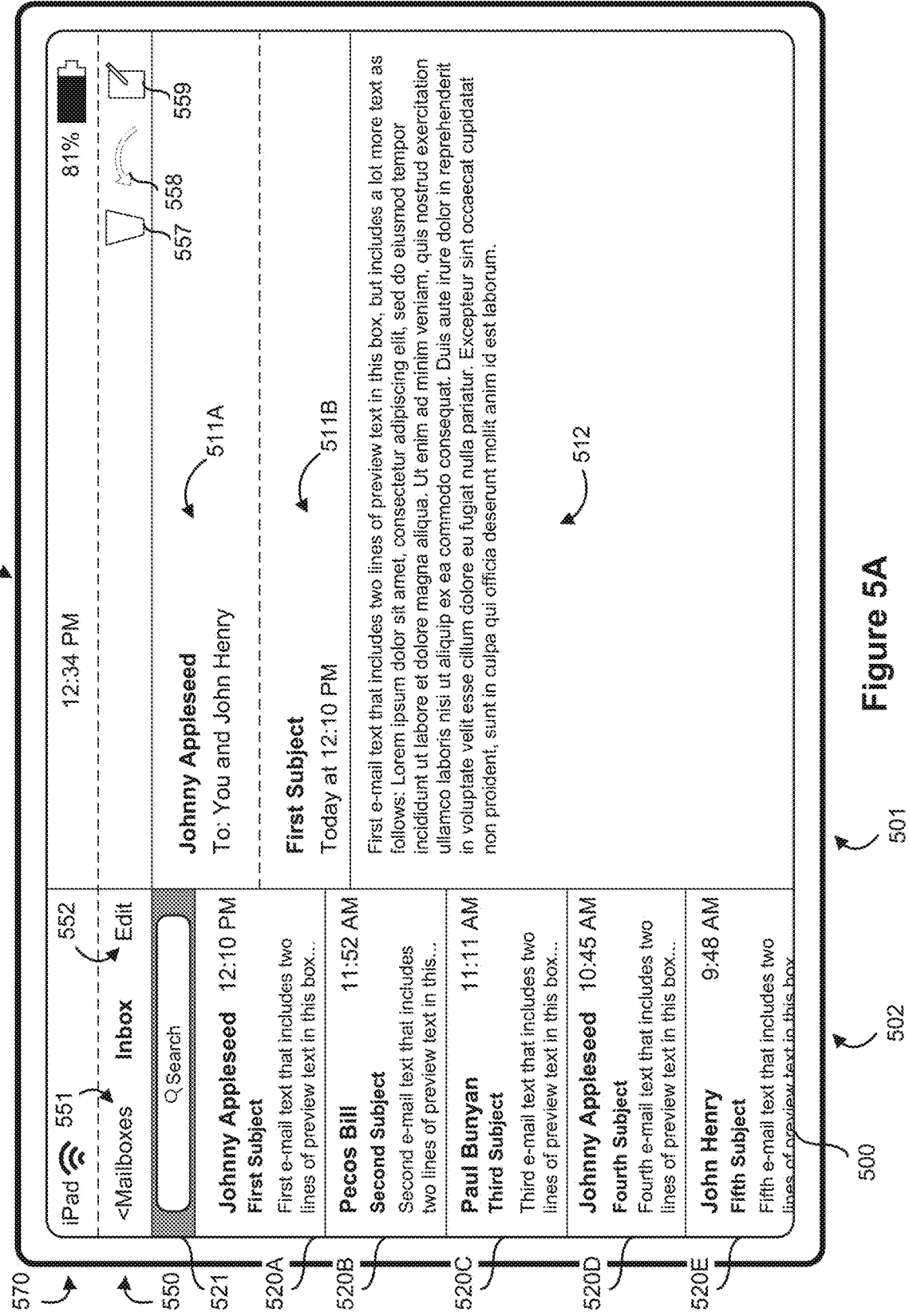
FIGS. 5A-5AK illustrate example user interfaces for displaying an application region with a changing number of columns in accordance with some embodiments.

Below, FIGS. 1A-1B, 2, and 3 provide a description of example devices. FIGS. 4A-4B, and 5A-5AK illustrate example user interfaces for displaying an application region with a changing number of columns. FIGS. 6A-6D illustrate a flow diagram of a method of displaying an application region with a changing number of columns. The user interfaces in FIGS. 5A-5AK are used to illustrate the processes in FIGS. 6A-6D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
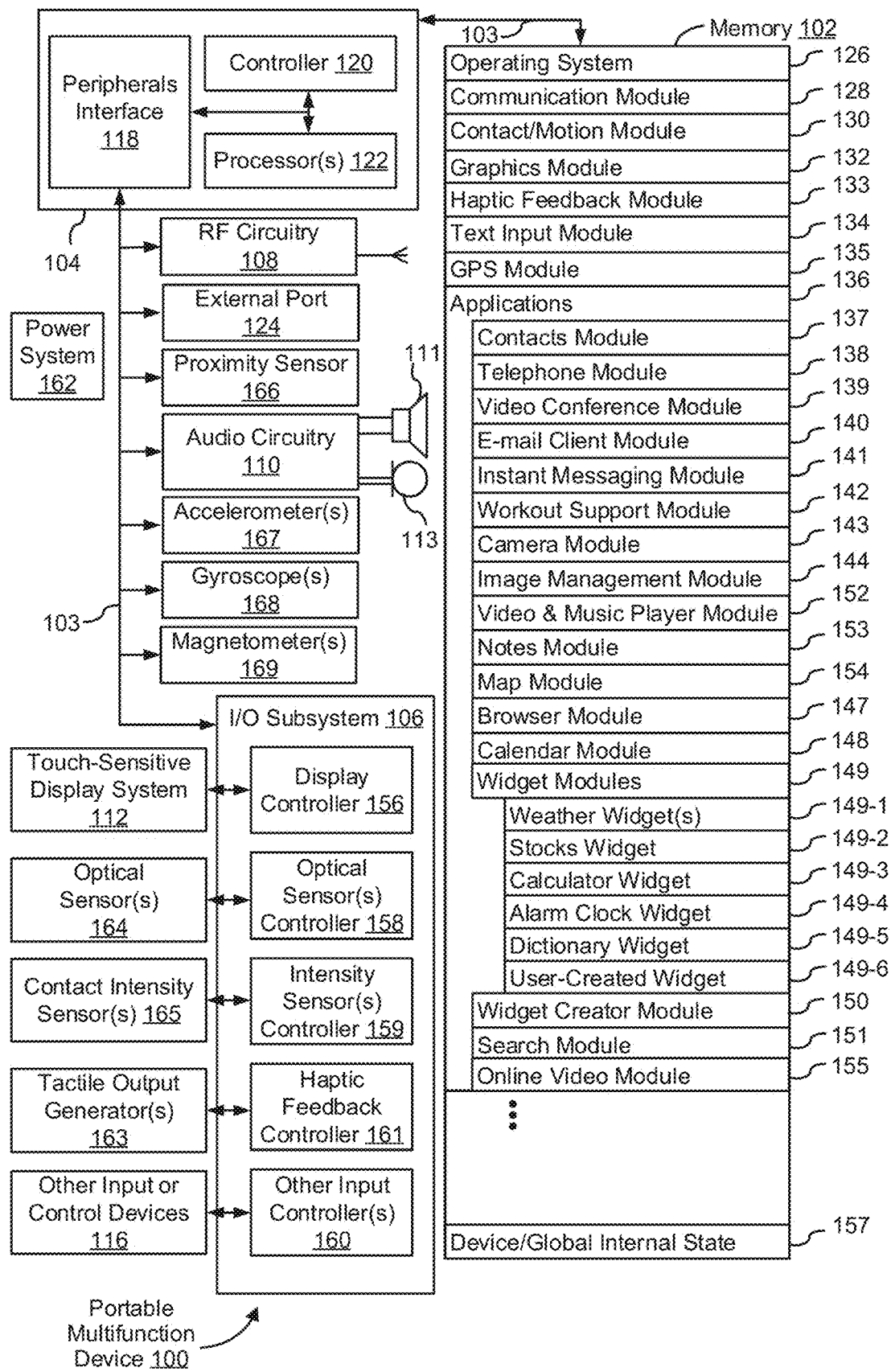
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
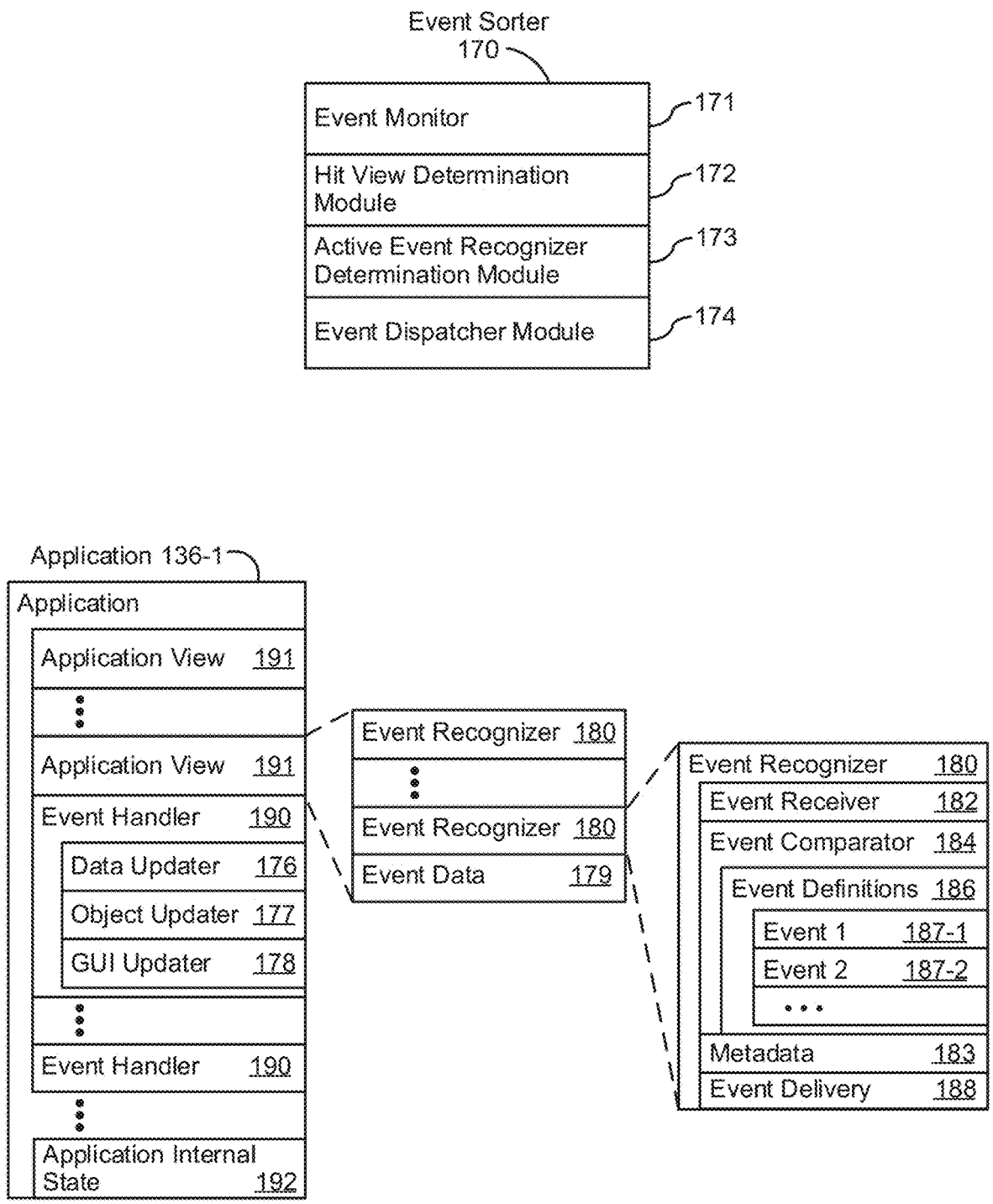
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse-based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device, such as portable multifunction device (PMD) 100 or device 300, with a display, a touch-sensitive surface, and one or more sensors to detect intensity of contacts with the touch-sensitive surface.

FIGS. 5A-5AK illustrate example user interfaces for displaying an application region with a changing number of columns in accordance with some embodiments. The user interfaces in these figures are used to illustrate the processes described below, including the processes in FIGS. 6A-6D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates a mail application as part of a user interface 500 displayed by a portable multifunctional device 100. The user interface 500 includes, in addition to the mail application, within an application region, a device bar 570 at the top of the display including an identifier of the portable multifunctional device 100 (e.g., "iPad"), a wireless connection indicator, a current time, and a battery indicator indicating a charge level of the portable multifunctional device 100.

The user interface 500 includes, below the device bar 570 and spanning the rest of the display, an application region of a mail application. Although primary described herein (with reference to FIGS. 5A-5AK) in the context of a mail application, aspects described herein can be applied to other applications including multiple columns, such as a note-taking application or a settings menu.

The application region includes, in FIG. 5A, a first column 501 and a second column 502. The first column 501 displays a content file, e.g., a message. The first column 501 includes a first metadata section 511A that includes text identifying a sender of the message and one or more recipients of the message. The first column 501 includes a second metadata section 511B that includes text identifying a subject of the message and a date and time the message was sent. In some embodiments, the first metadata section 511A and second metadata section 511B are combined into a single metadata section or split into more than two metadata sections. In some embodiments, the first metadata section 511A and/or the second metadata section 511B includes additional information, such as an e-mail address of the sender of the message or a ranking and/or categorization of the message. The first column 501 includes a content section 512 that includes the content of the content file (e.g., the text of the message).

The second column 502 includes a number of message affordances 520A-520E including information regarding a number of messages within a folder (e.g., the "Inbox" folder). Each message affordance 520A-520E includes a sender of the message, a date and/or time the message was sent, a subject of the message, and preview text of the content of the message. The second column 502 includes a search field 521 for searching the messages within the folder.

The application region includes an application bar 550 at the top of the application region. In some embodiments, the application bar 550 is displayed at a bottom of the application region or at another location within the application region. The application bar 550 includes the top of the first column 501 and the second column 502. Within the first column 501, the application bar includes a delete affordance 557 for deleting the displayed message, a reply affordance 558 for replying to the displayed message, and a compose affordance 559 for composing a new message. Within the second column 502, the application bar 550 includes a folders affordance 551 for displaying a list of folders and an edit affordance 552 for selecting one or more of the messages for deletion, archival, or movement to another folder.

Figure 5B:
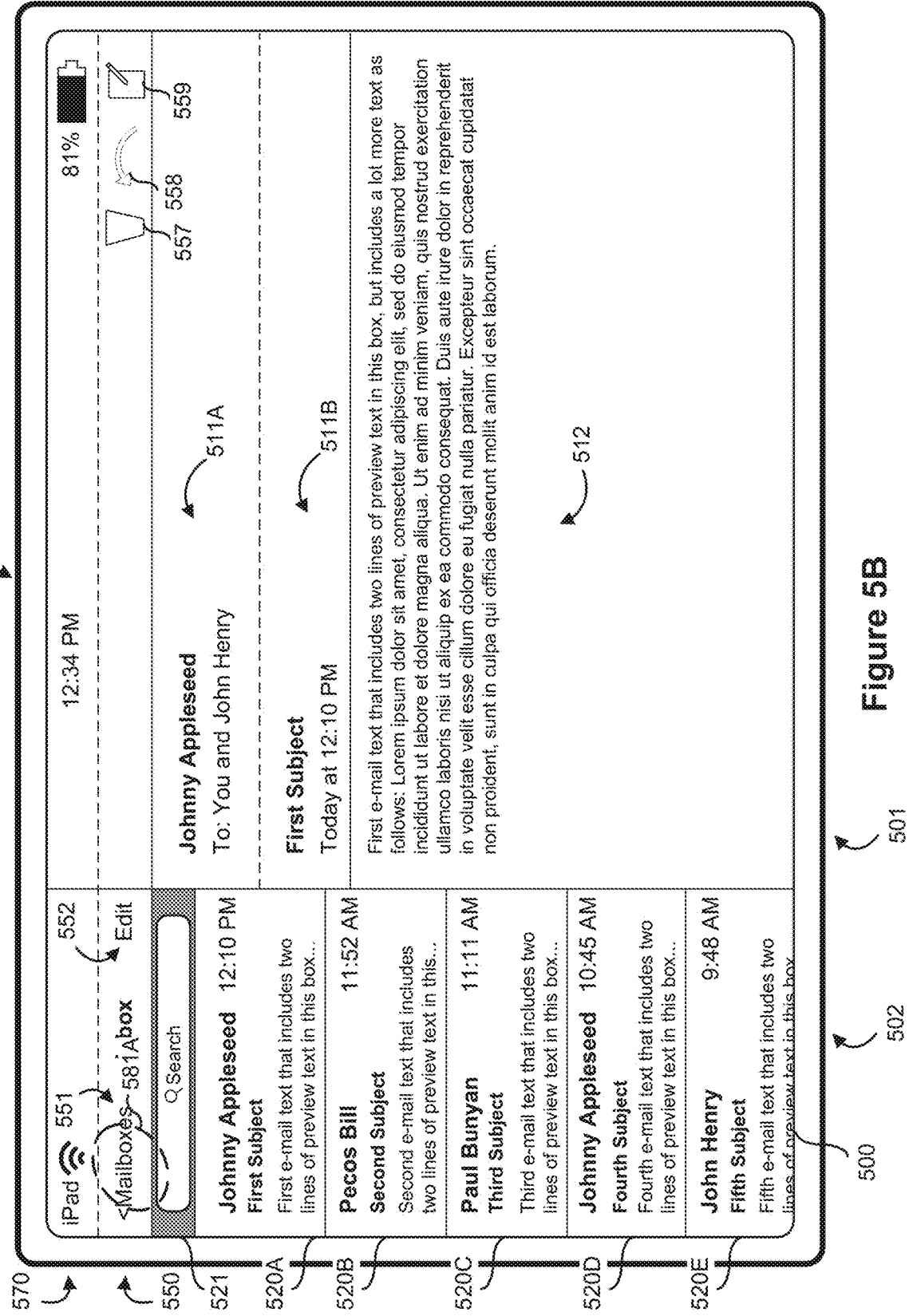

FIG. 5B illustrates the user interface 500 of FIG. 5A with a touch 581A detected at a location of the folders affordance 551.

Figure 5C:
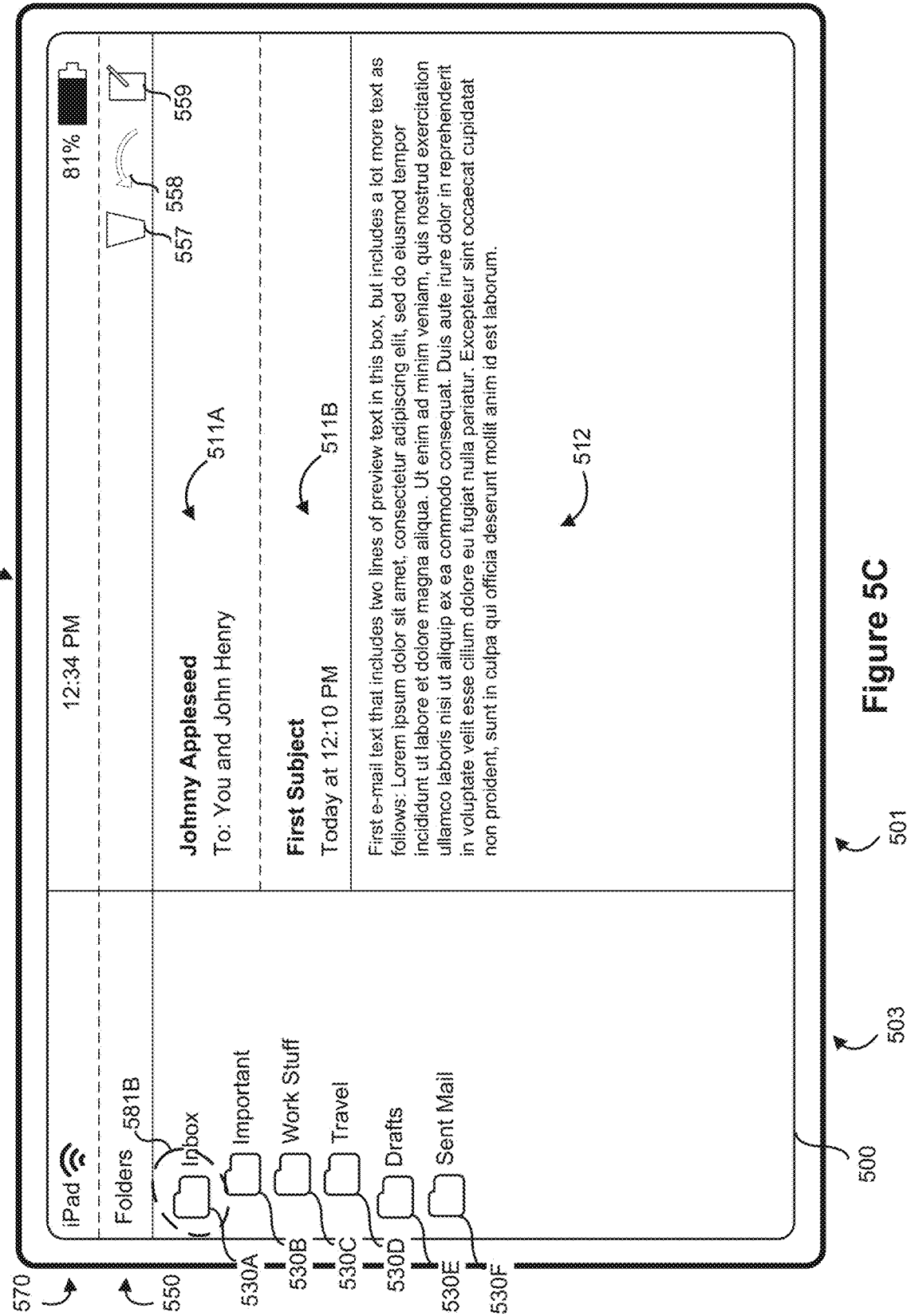

FIG. 5C illustrates the user interface 500 of FIG. 5B in response to detecting the touch 581A at the location of the folders affordance 551. In FIG. 5C, the second column 502 is replaced with a third column 503. The third column 503 includes a number of folder affordances 530A-530F for displaying different folders of messages. In FIG. 5C, like FIG. 5B, two columns are displayed. In FIG. 5B, the first column 501 and second column 502 are displayed. In FIG. 5C, the first column 501 and third column 503 are displayed.

FIG. 5C illustrates a touch 581B detected at a location of an inbox folder affordance 530A of the folder affordances 530A-530F.

Figure 5D:
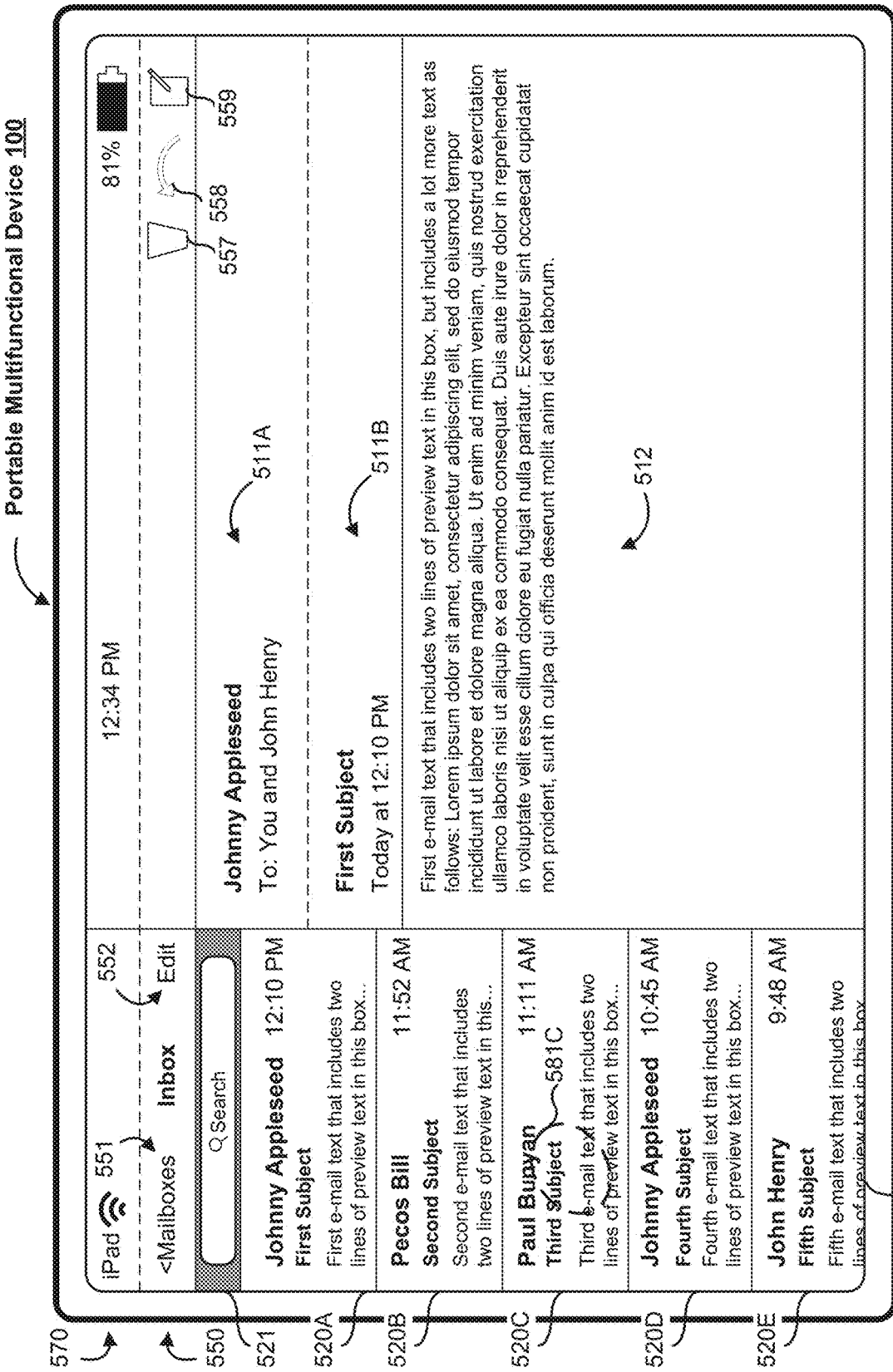

FIG. 5D illustrates the user interface 500 of FIG. 5C in response to detecting the touch 581B at the location of the inbox folder affordance 530A. In FIG. 5D, the third column 503 is replaced with the second column 502.

FIG. 5D illustrates a touch 581C detected at a location of the third message affordance 520C.

Figure 5E:
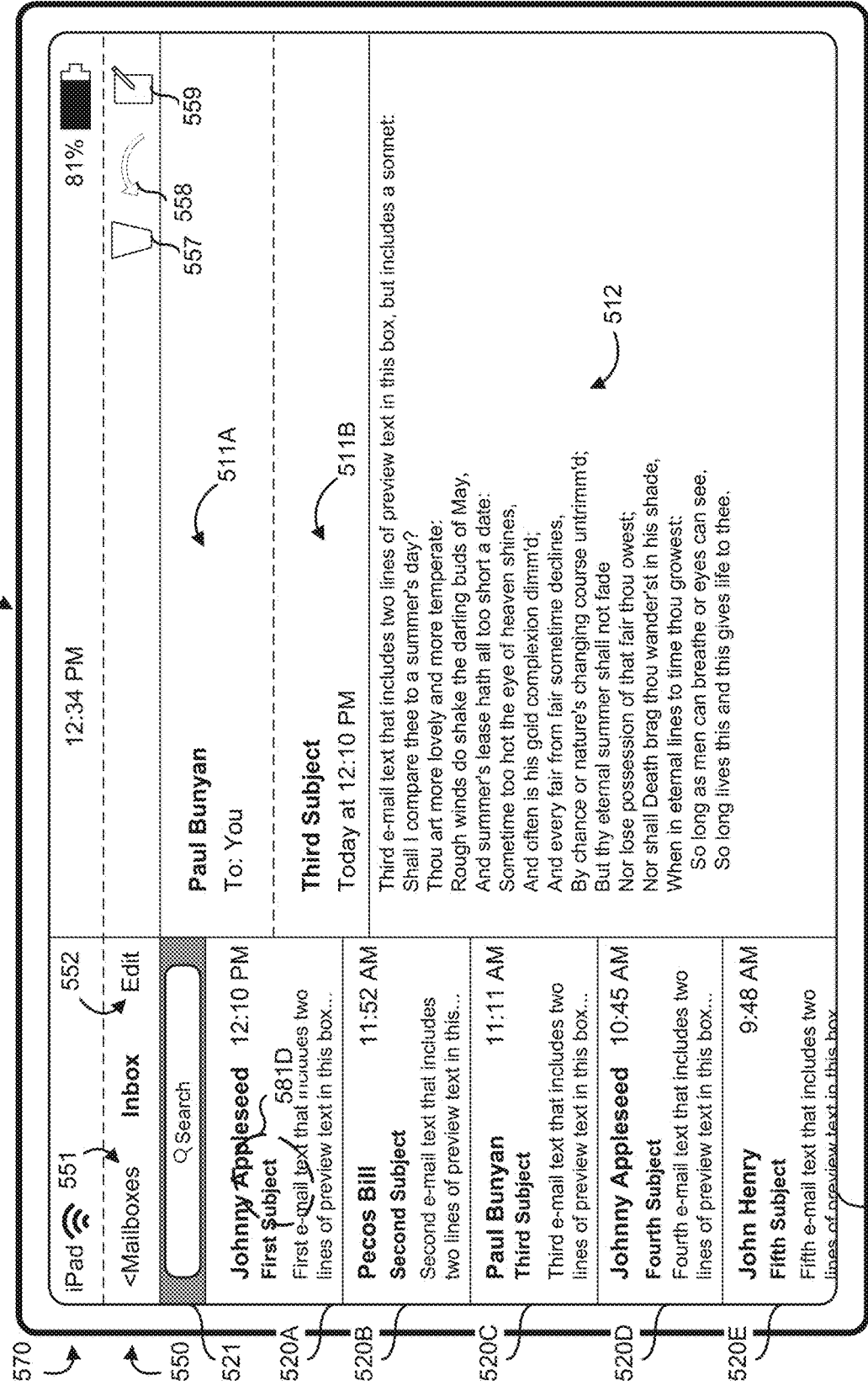

FIG. 5E illustrates the user interface 500 in response to detecting the touch 581C at the location of the third message affordance 520C. In FIG. 5E, the first column 501 displays metadata (in the first metadata region 511A and second metadata region 511B) and content (in the content region 512) of a third message.

FIG. 5E illustrates a touch 581D detected at a location of the first message affordance 520A.

Figure 5F:
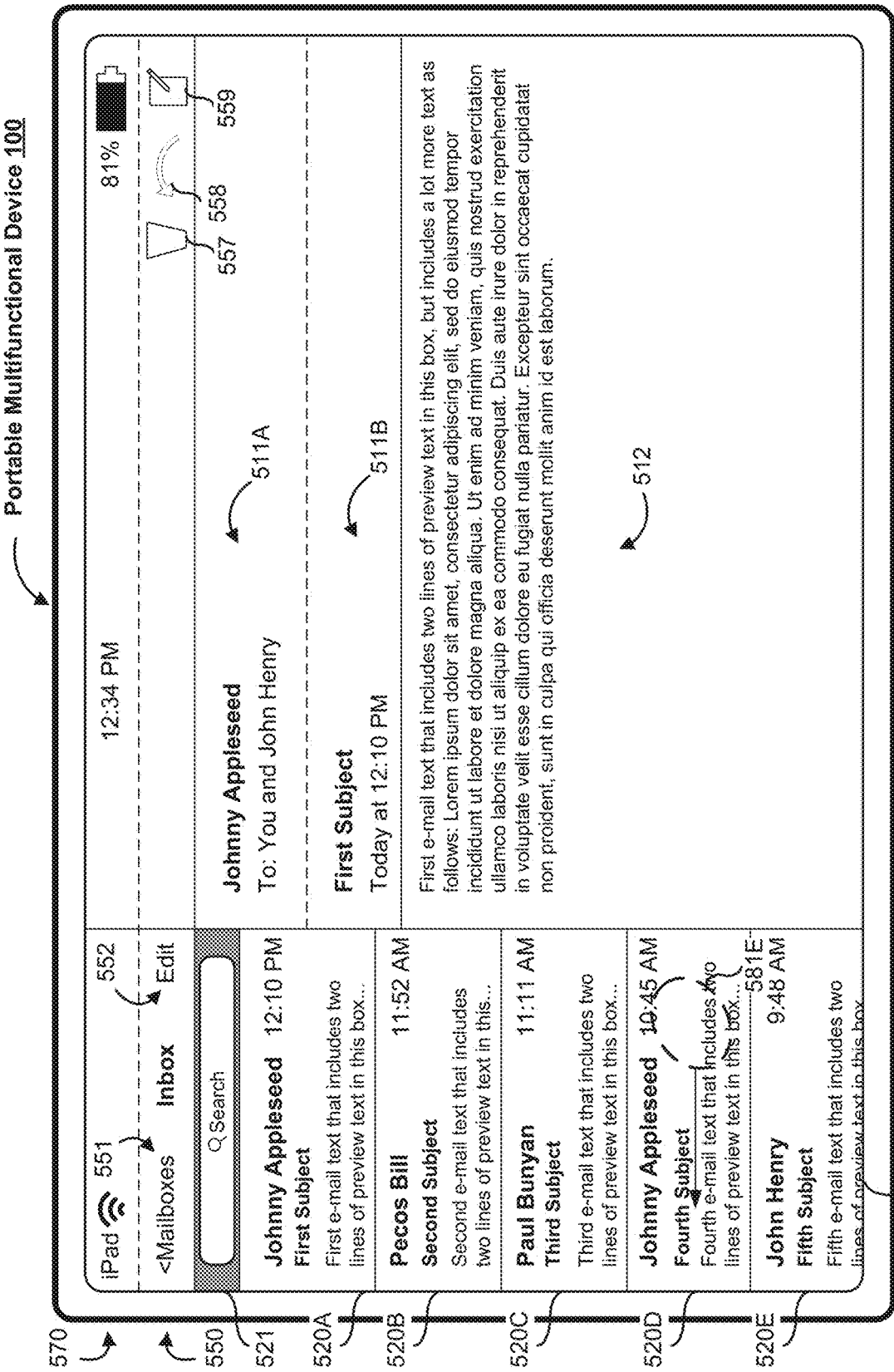

FIG. 5F illustrates the user interface 500 in response to detecting the touch 581D at the location of the first message affordance 520A. In FIG. 5F, the first column 501 displays metadata (in the first metadata region 511A and second metadata region 511B) and content (in the content region 512) of the first message.

FIG. 5F illustrates a swipe 581E detected starting at a location of the fourth message affordance 520D.

Figure 5G:
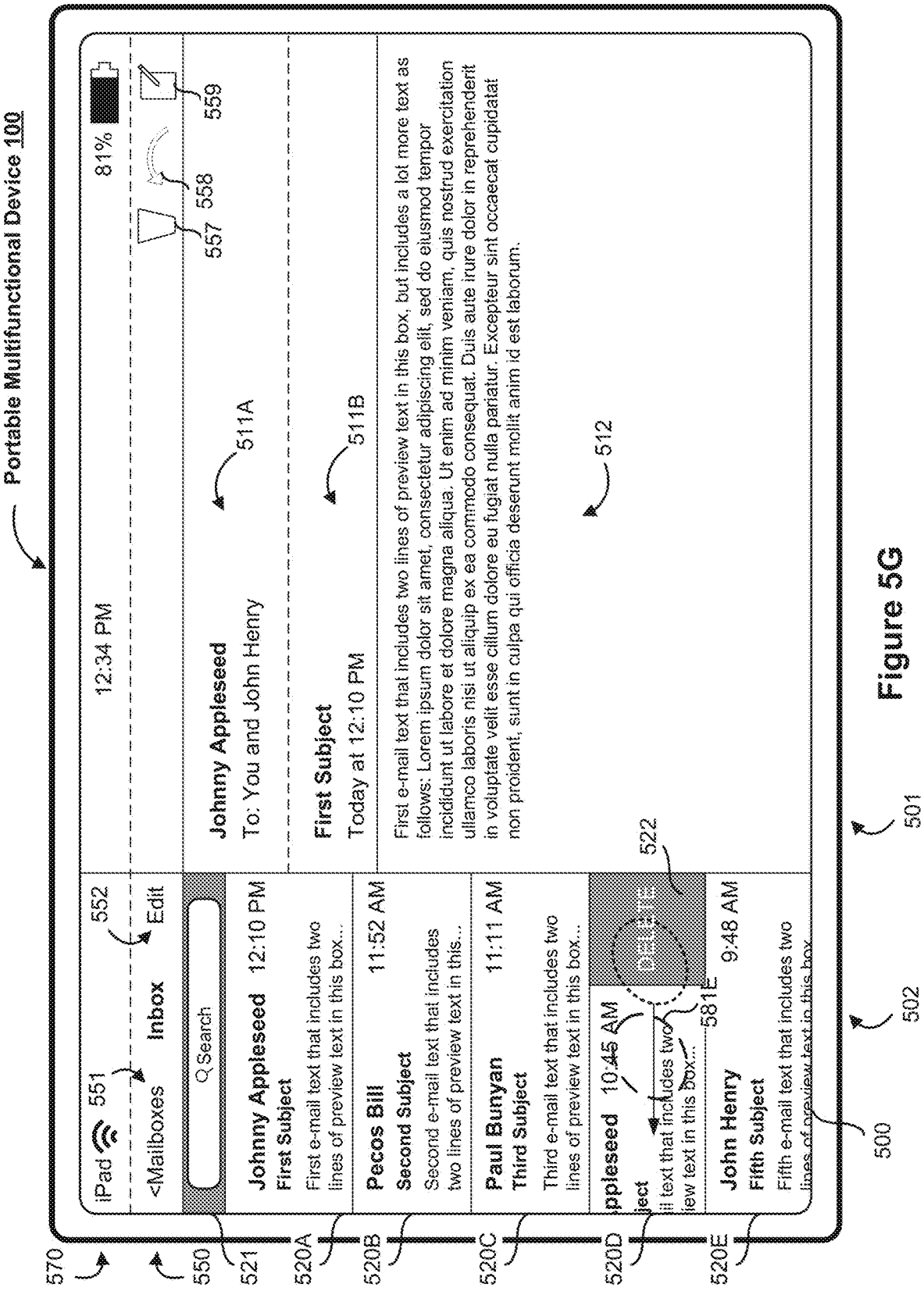

FIG. 5G illustrates the user interface 500 of FIG. 5F in response to detecting a first portion of the swipe 581E (e.g., contact and movement of the contact a first distance). In FIG. 5G, the fourth message affordance 520D is moved in the direction of the swipe 581E. In the space provided, a delete affordance 522 is displayed. In some embodiments, in response to detecting a touch at the location of the delete affordance 522, the corresponding message is deleted.

Figure 5H:
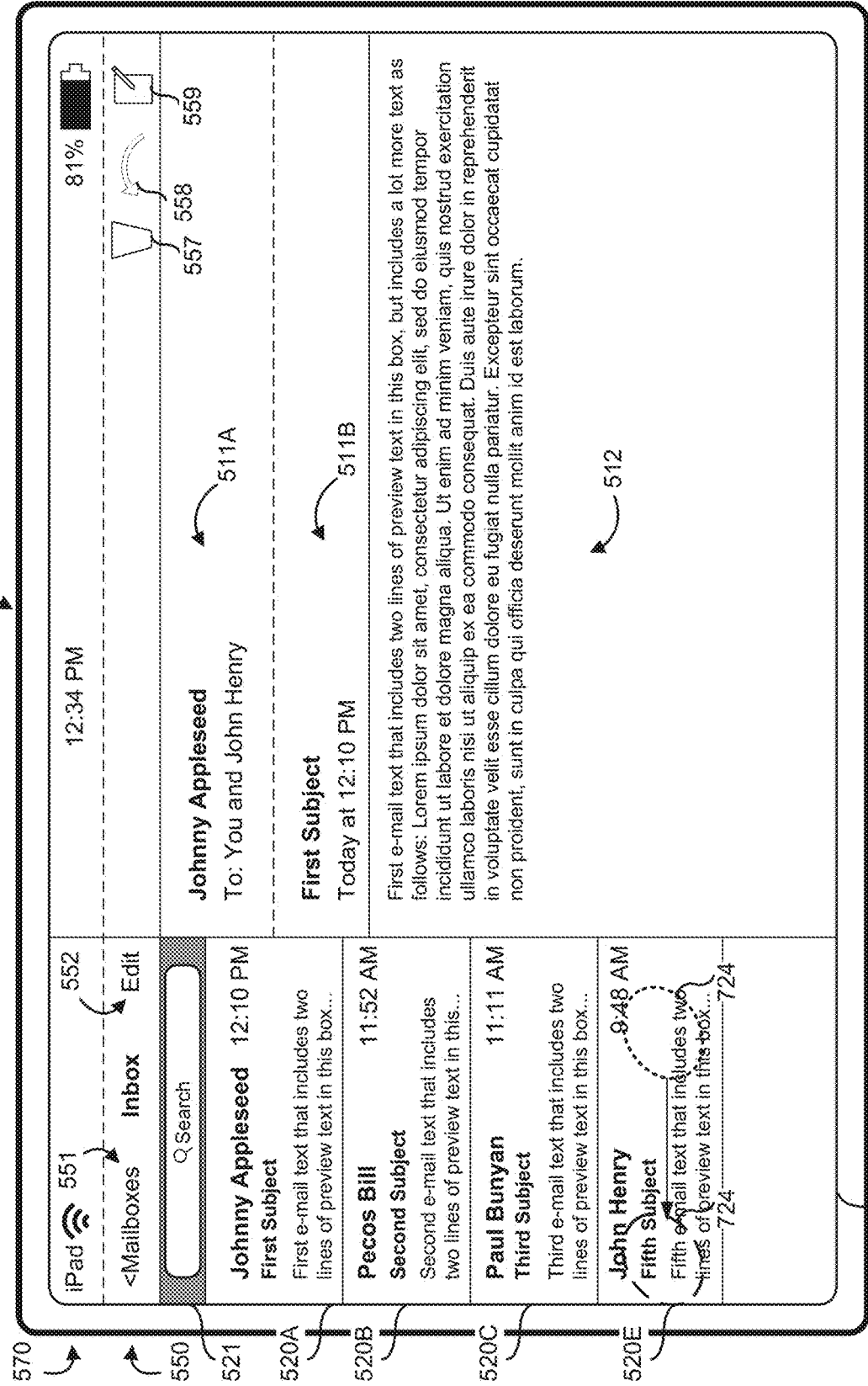

FIG. 5H illustrates the user interface 500 of FIG. 5G in response to detecting a second portion of the swipe 581E (e.g., movement of the contact a second distance and liftoff of the contact). In FIG. 5H, the fourth message affordance 520D is removed, indicating that the fourth message has been deleted or, alternatively, moved to a trash folder or archive folder.

Figure 5I:
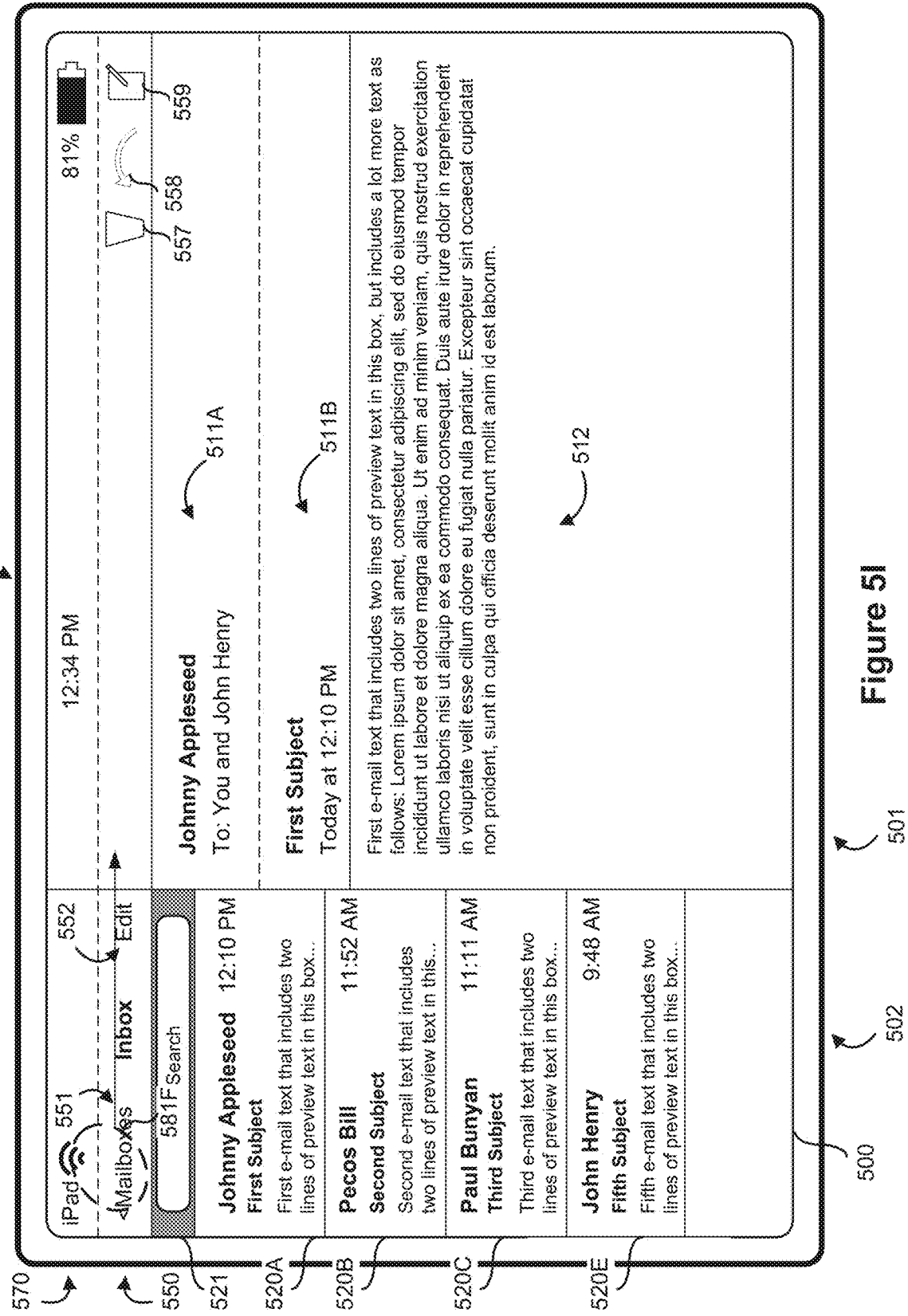

FIG. 5I illustrates the user interface 500 of FIG. 5H with a swipe 581F detected in a first direction (e.g., to the right) starting at a location within the application bar 550.

Figure 5J:
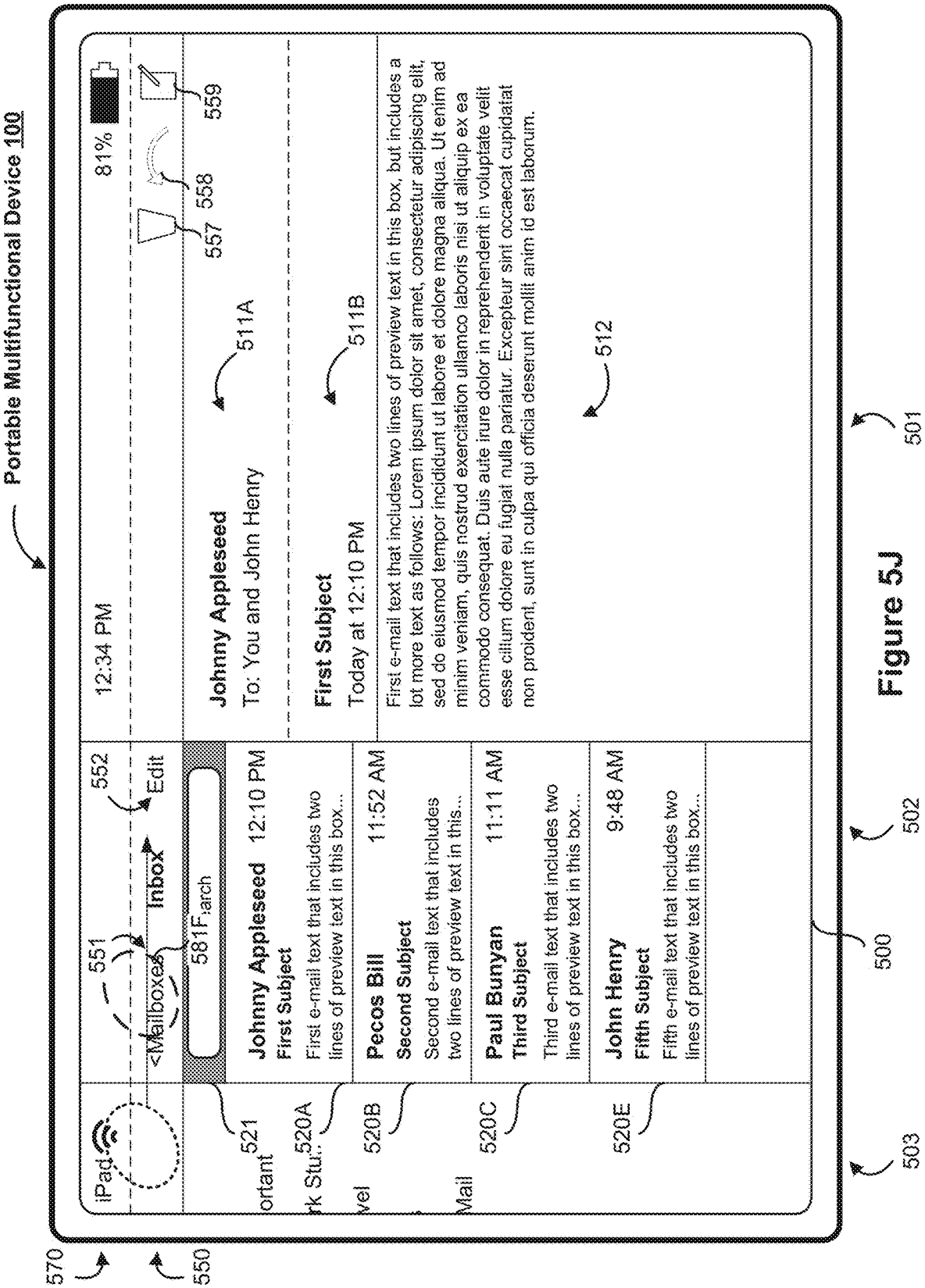

FIG. 5J illustrates the user interface 500 of FIG. 5I in response to detecting a first portion of the swipe 581F (e.g., contact and movement of the contact a first distance). In FIG. 5J, the second column 502 is moved in the direction of the swipe 581F (e.g., to the right). The first column 501 is reduced in size to the right of the second column 502 and the third column 503 is partially displayed to the left of the second column 502. As illustrated in FIG. 5J, the size of the second column 502 (e.g., the width of the second column 502) does not change.

Figure 5K:
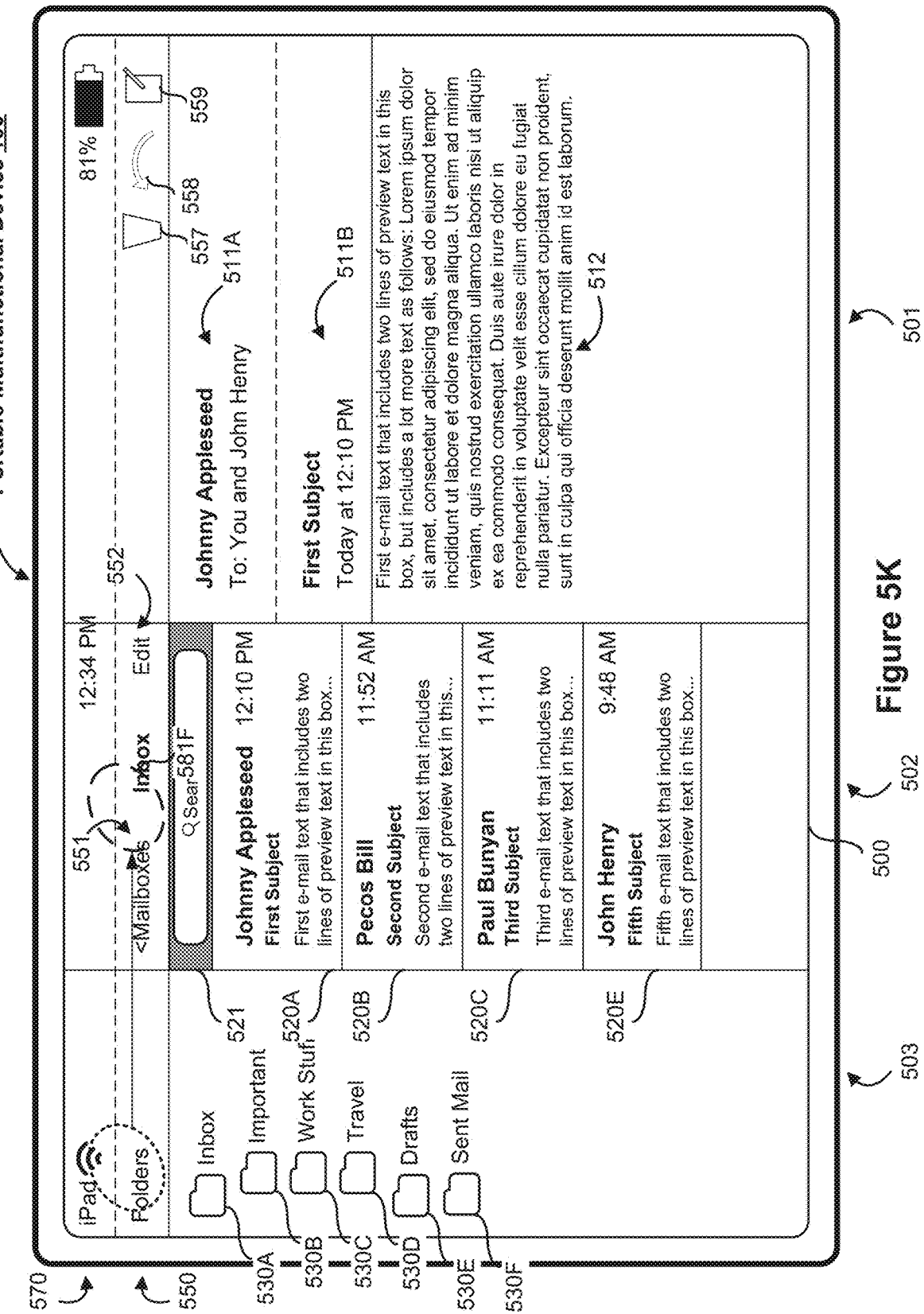

FIG. 5K illustrates the user interface 500 of FIG. 5J in response to detecting a second portion of the swipe 581F (e.g., movement of the contact a second distance and liftoff of the contact). In FIG. 5J, the second column 502 is further moved in the direction of the swipe 581F (e.g., further to the right). The first column 501 is further reduced in size to the right of the second column 502 and the third column 503 is fully displayed to the left of the second column 502. As illustrated in FIG. 5K, the size of the second column 502 (e.g., the width of the second column 502) does not change. Thus, in FIG. 5K, in contrast to FIG. 5B or FIG. 5C, three columns are displayed, the first column 501, the second column 502, and the third column 503.

As noted above, FIG. 5K illustrates the user interface 500 of FIG. 5J in response to detecting a second portion of the swipe 581F. In some embodiments, if the second portion of the swipe 581F is not detected, e.g., the swipe 581F only includes movement of a contact a first distance, the user interface 500 returns to the state of FIG. 5I. Thus, in response to detecting a first amount of movement (e.g., a swipe of a first distance), the third column is partially shown (as in FIG. 5J) and subsequently removed and, in response to detecting a second amount of movement (e.g., a swipe of a first distance and a second distance), the third column is fully shown and maintained on the display.

Figure 5L:
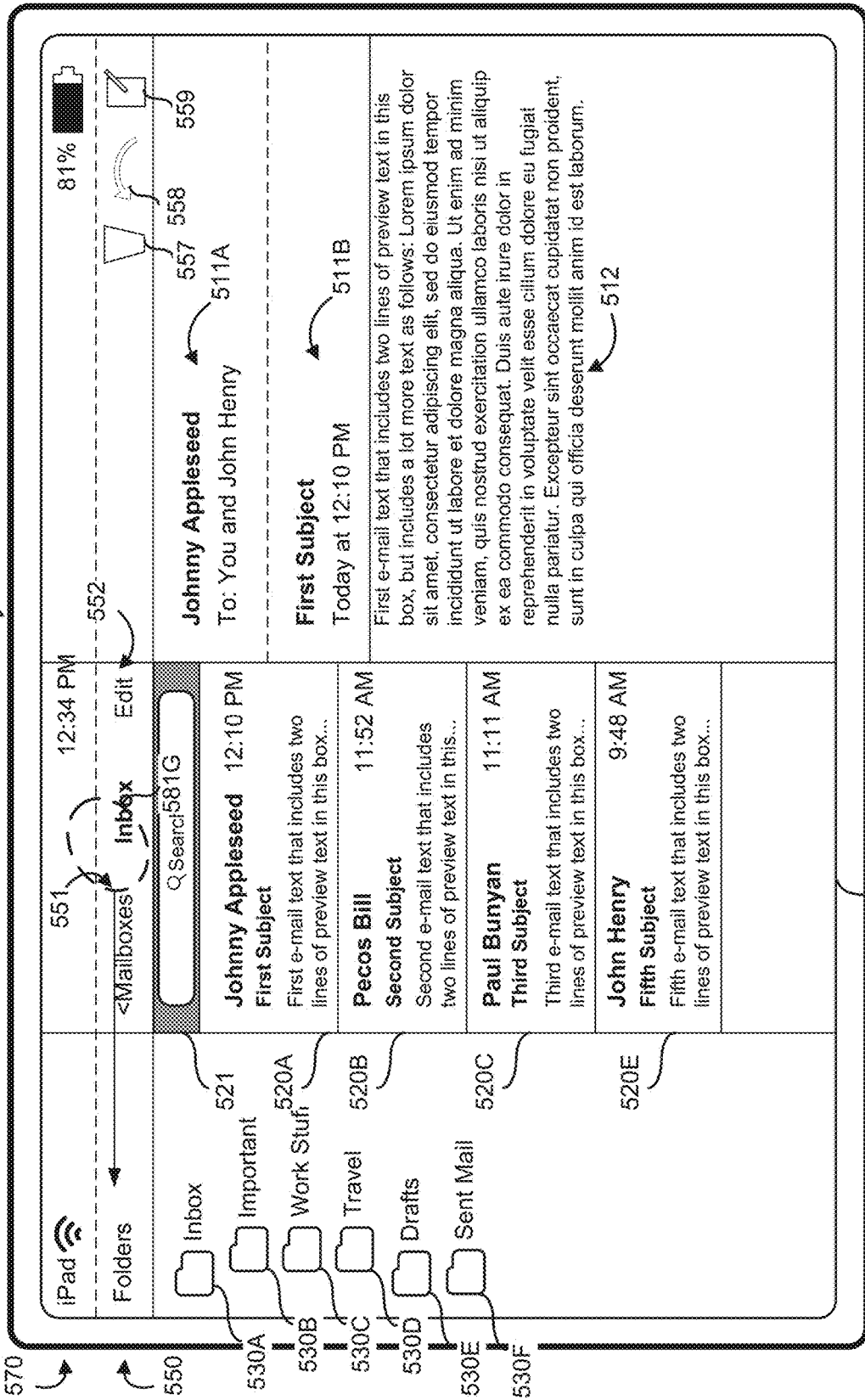

FIG. 5L illustrates the user interface 500 of FIG. 5K with a swipe 581G detected in a second direction (e.g., to the left) starting at a location within the application bar 550.

Figure 5M:
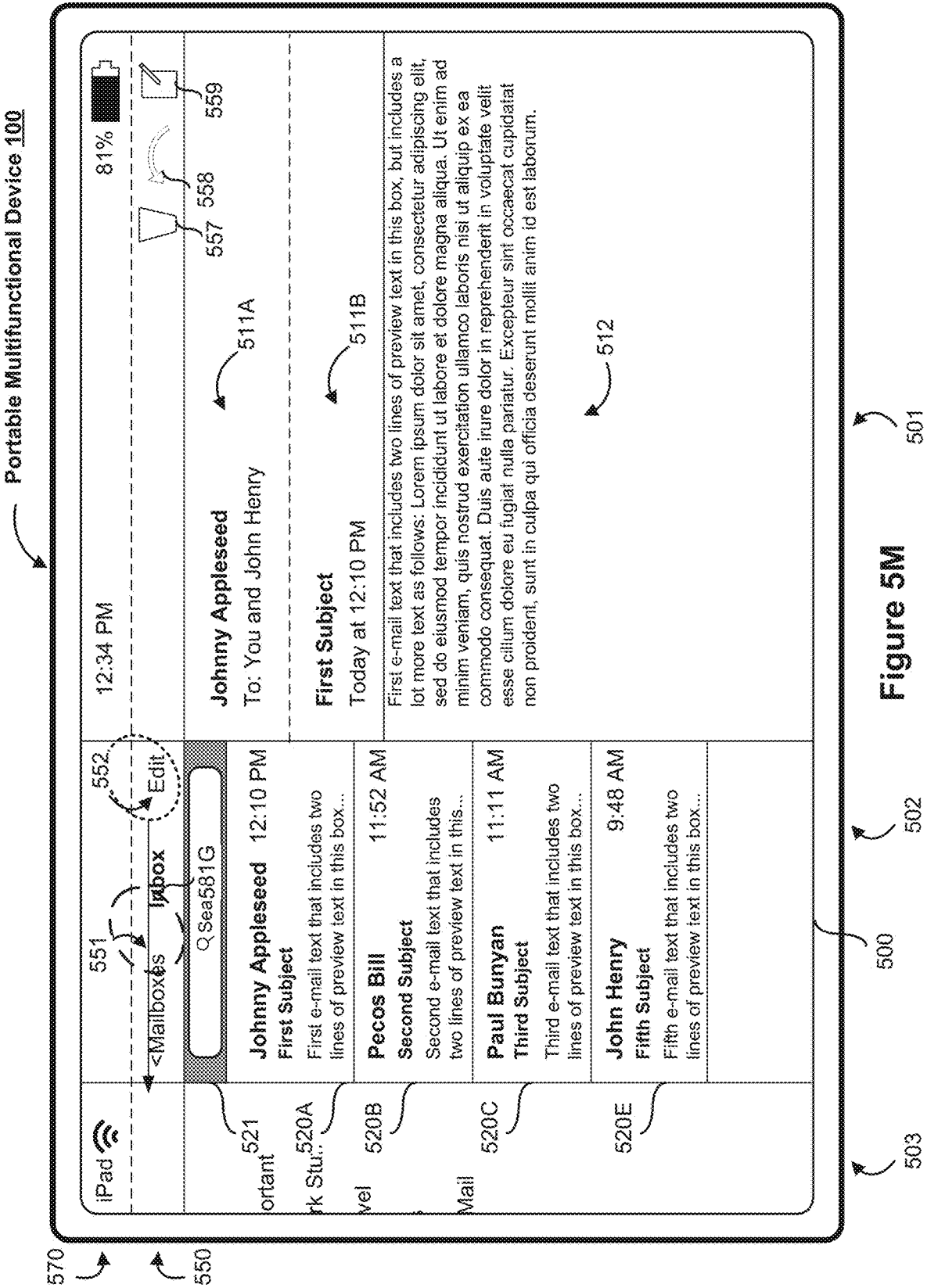

FIG. 5M illustrates the user interface 500 of FIG. 5L in response to detecting a first portion of the swipe 581G (e.g., contact and movement of the contact a first distance). In FIG. 5M, the second column 502 is moved in the direction of the swipe 581G (e.g., to the left). The first column 501 is increased in size to the right of the second column 502 and the third column 503 is partially hidden to the left of the second column 502. As illustrated in FIG. 5.1, the size of the second column 502 (e.g., the width of the second column 502) does not change.

Figure 5N:
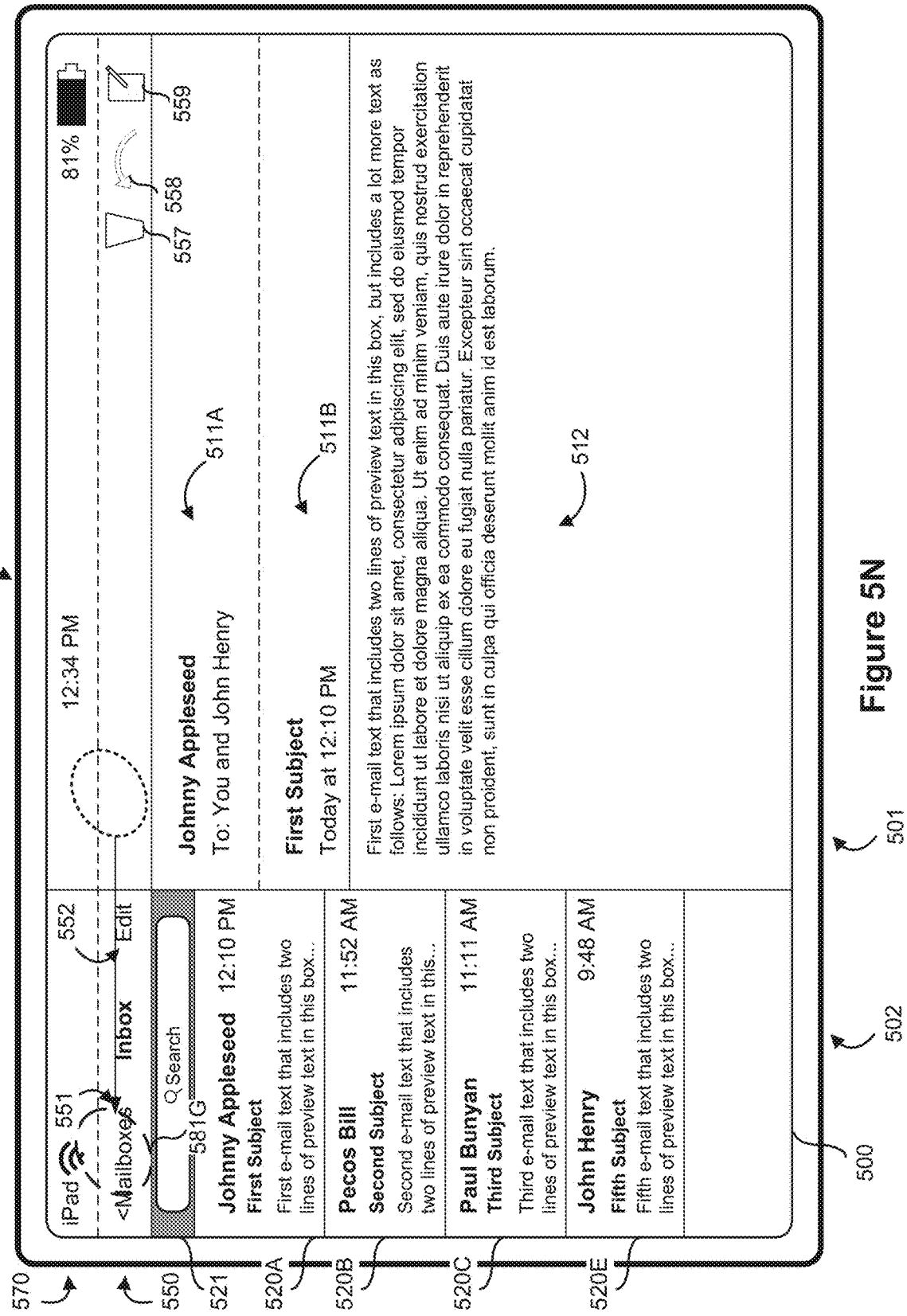

FIG. 5N illustrates the user interface 500 of FIG. 5M in response to detecting a second portion of the swipe 581G (e.g., movement of the contact a second distance and liftoff of the contact). In FIG. 5N, the second column 502 is further moved in the direction of the swipe 581G (e.g., further to the left). The first column 501 is further increased in size to the right of the second column 502 and the third column 503 is fully hidden (e.g., not displayed). As illustrated in FIG. 5N, the size of the second column 502 (e.g., the width of the second column 502) does not change.

As noted above, FIG. 5N illustrates the user interface 500 of FIG. 5M in response to detecting a second portion of the swipe 581G. In some embodiments, if the second portion of the swipe 581G is not detected, e.g., the swipe 581G only includes movement of a contact a first distance, the user interface 500 returns to the state of FIG. 5L. Thus, in response to detecting a first amount of movement (e.g., a swipe of a first distance), the third column 503 is partially hidden (as in FIG. 5M) and subsequently fully displayed and, in response to detecting a second amount of movement (e.g., a swipe of a first distance and a second distance), the third column 503 is no longer displayed.

Figure 5O:
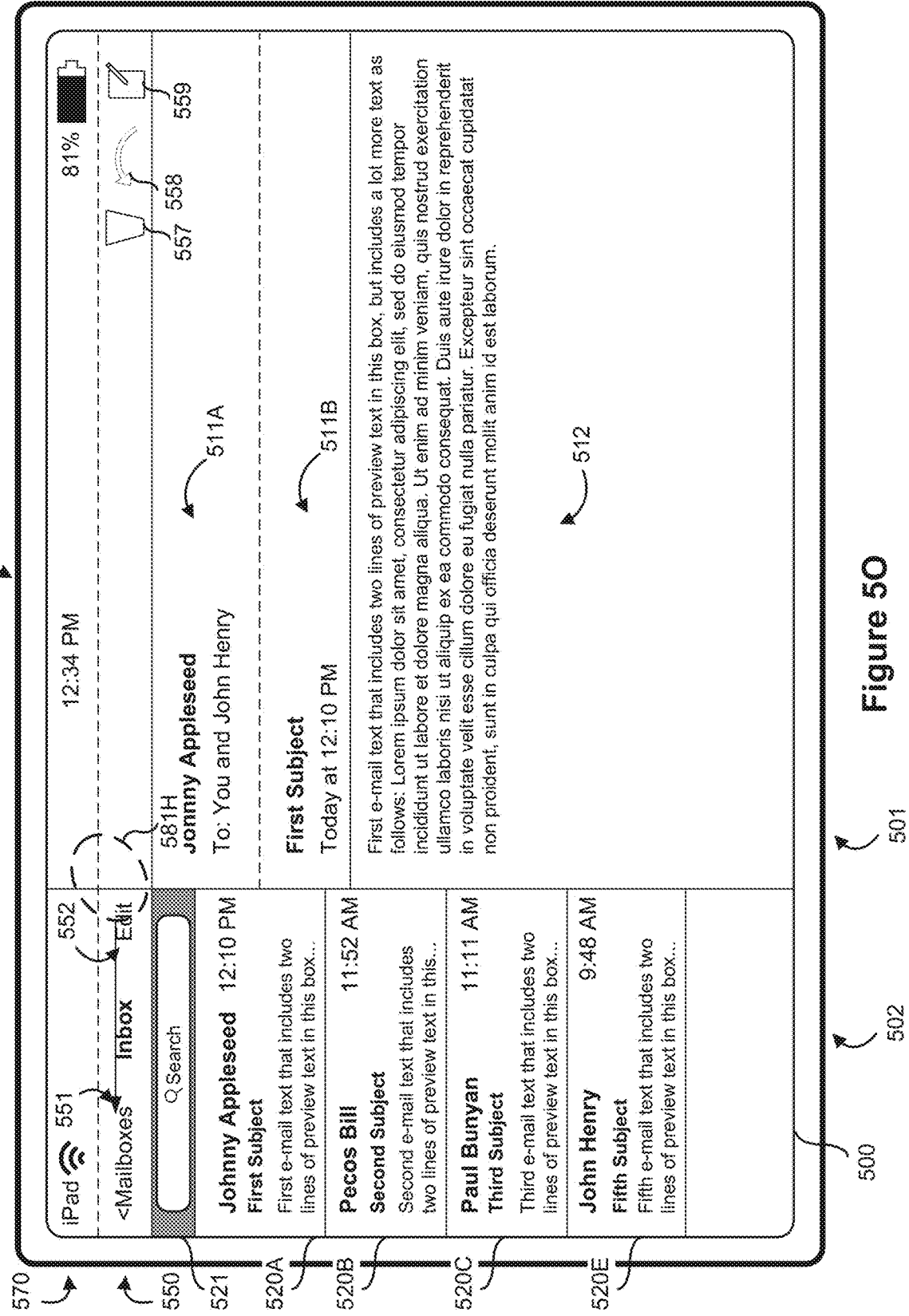

FIG. 5O illustrates the user interface 500 of FIG. 5N with a swipe 581H detected in a second direction (e.g., to the left) starting at a location within the application bar 550.

Figure 5P:
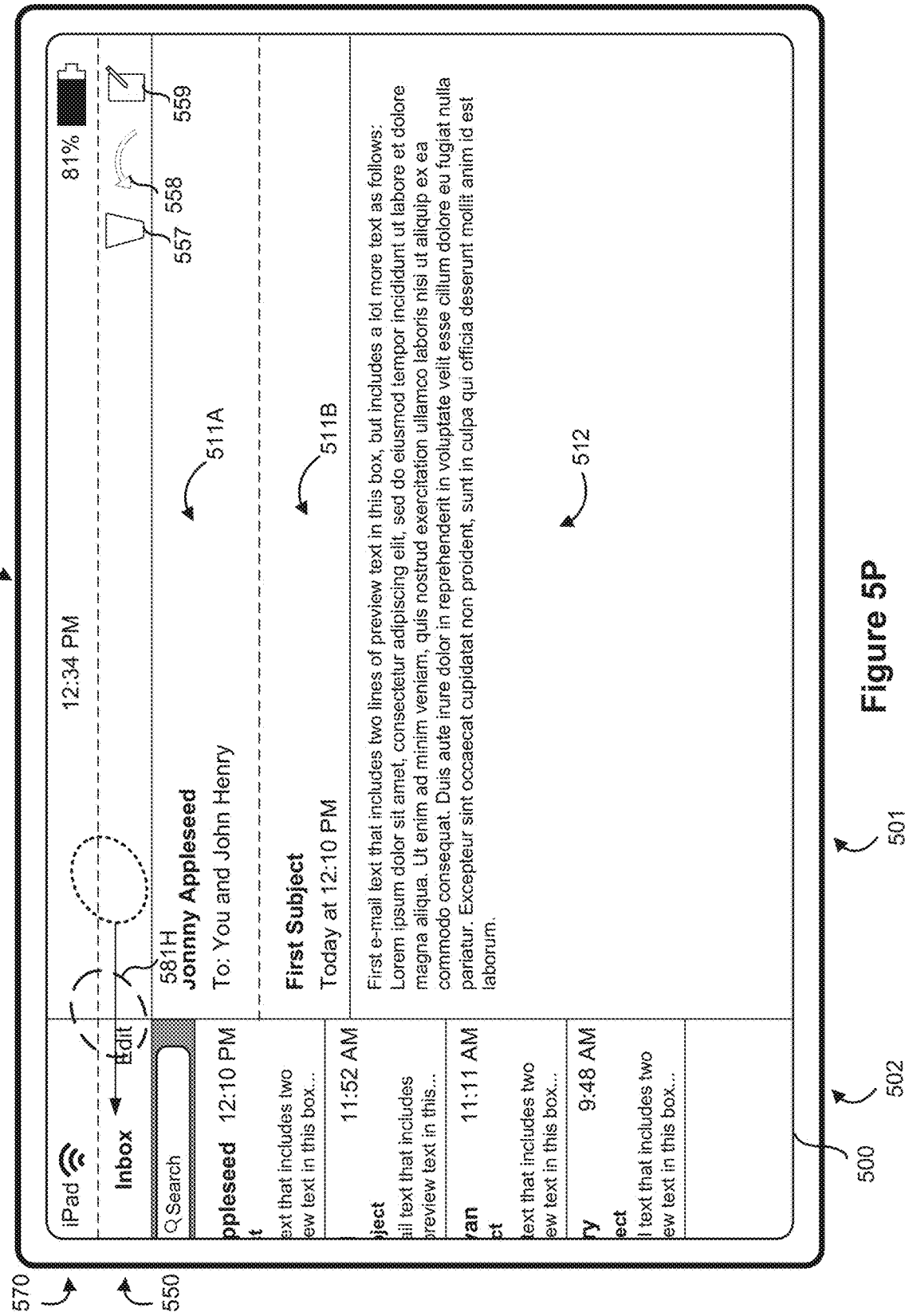

FIG. 5P illustrates the user interface 500 of FIG. 5N in response to detecting a first portion of the swipe 581H (e.g., contact and movement of the contact a first distance). In FIG. 5P, the second column 502 is moved in the direction of the swipe 581H (e.g., to the left) partially off the display. The first column 501 is increased in size to the right of the second column 502.

Figure 5Q:
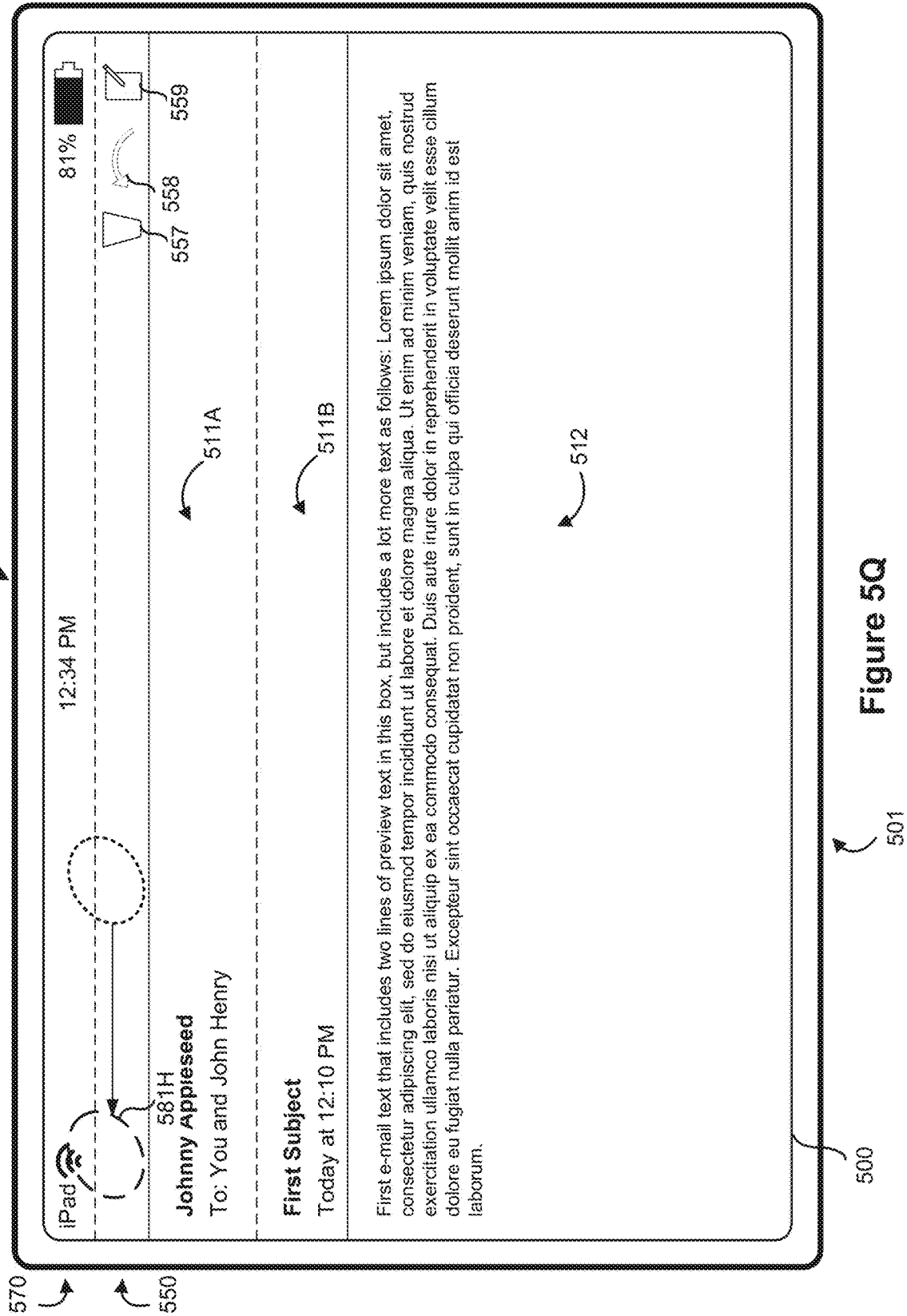

FIG. 5Q illustrates the user interface 500 of FIG. 5P in response to detecting a second portion of the swipe 581H (e.g., movement of the contact a second distance and liftoff of the contact). In FIG. 5Q, the second column 502 is hidden and the first column 501 is further increased in size to occupy the width of the application region.

As noted above, FIG. 5Q illustrates the user interface 500 of FIG. 5P in response to detecting a second portion of the swipe 581H. In some embodiments, if the second portion of the swipe 581H is not detected, e.g., the swipe 581G only includes movement of a contact a first distance, the user interface 500 returns to the state of FIG. 5O. Thus, in response to detecting a first amount of movement (e.g., a swipe of a first distance), the second column 502 is partially hidden (as in FIG. 5N) and subsequently fully displayed and, in response to detecting a second amount of movement (e.g., a swipe of a first distance and a second distance), the second column 502 is no longer displayed.

Figure 5R:
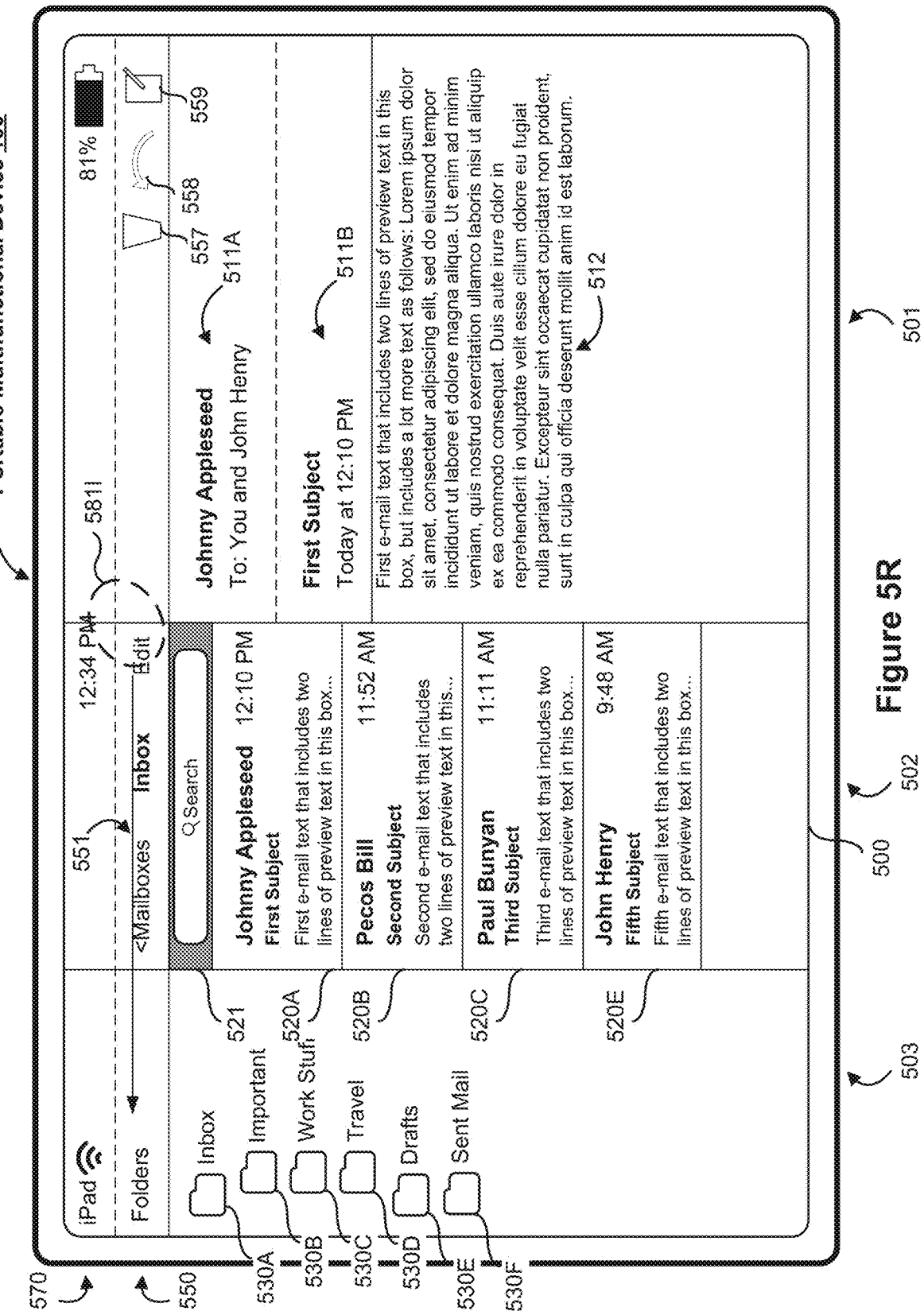

FIG. 5R, like FIG. 5L, illustrates the user interface 500 of FIG. 5K with a swipe 581I detected in a second direction (e.g., to the left) starting at a location within the application bar 550. In FIG. 5R, the swipe 581I is longer than the swipe 581G of FIG. 5L.

Figure 5S:
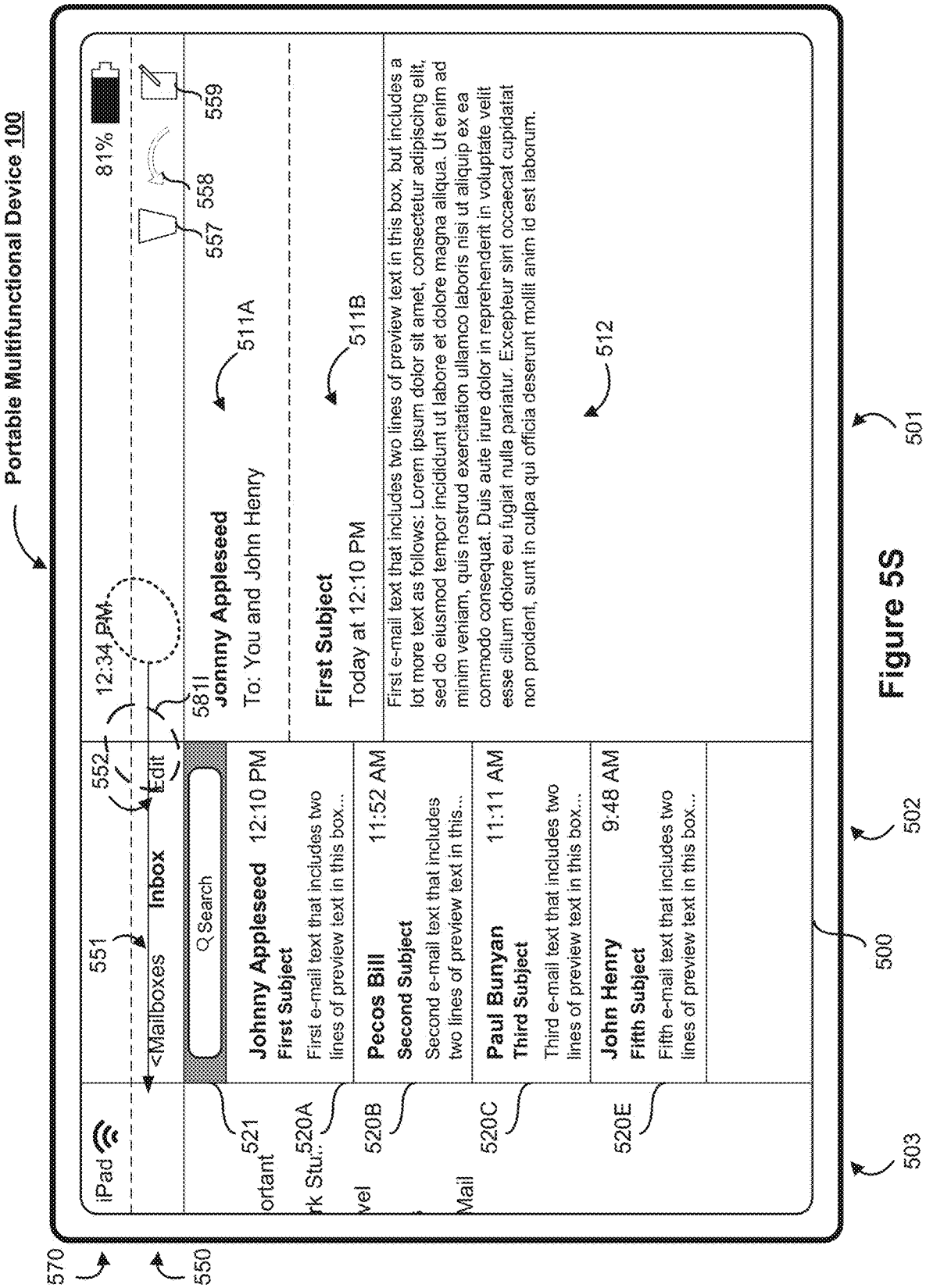

FIG. 5S illustrates the user interface 500 of FIG. 5R in response to detecting a first portion of the swipe 581I (e.g., contact and movement of the contact a first distance). In FIG. 5S, the second column 502 is moved in the direction of the swipe 581I (e.g., to the left). The first column 501 is increased in size to the right of the second column 502 and the third column 503 is partially hidden to the left of the second column 502. As illustrated in FIG. 5S, the size of the second column 502 (e.g., the width of the second column 502) does not change.

Figure 5T:
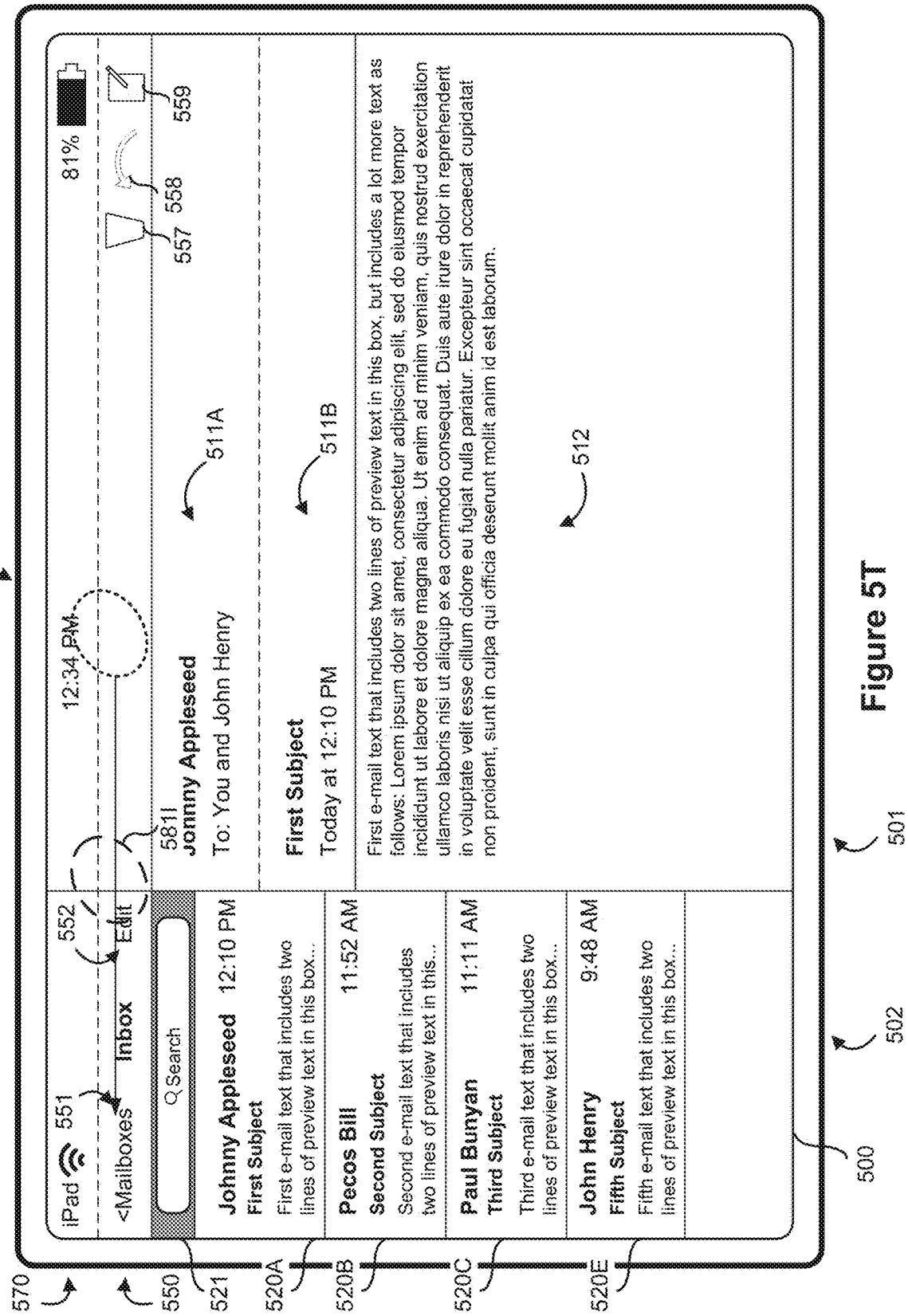

FIG. 5T illustrates the user interface 500 of FIG. 5S in response to detecting a second portion of the swipe 581I (e.g., movement of the contact a second distance). In FIG. 5T, the second column 502 is further moved in the direction of the swipe 581I (e.g., further to the left). The first column 501 is further increased in size to the right of the second column 502 and third column 503 is fully hidden (e.g., not displayed). As illustrated in FIG. 5T, the size of the second column 502 (e.g., the width of the second column 502) does not change.

Figure 5U:
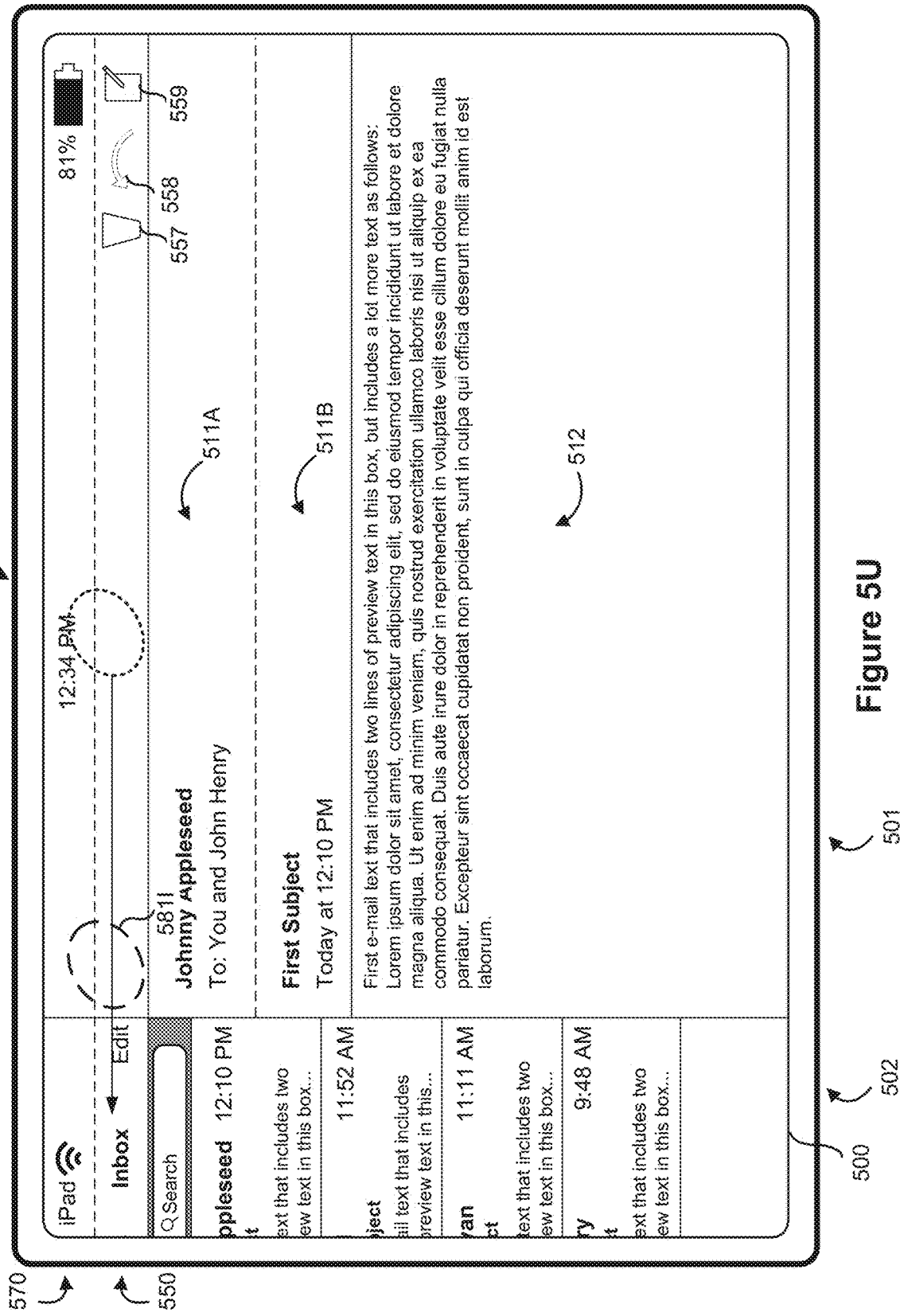

FIG. 5U illustrates the user interface of FIG. 5T in response to detecting a third portion of the swipe 581I (e.g., movement of the contact a third distance). In FIG. 5U, the second column 502 is moved in the direction of the swipe 581I (e.g., to the left) partially off the display. The first column 501 is increased in size to the right of the second column 502.

Figure 5V:
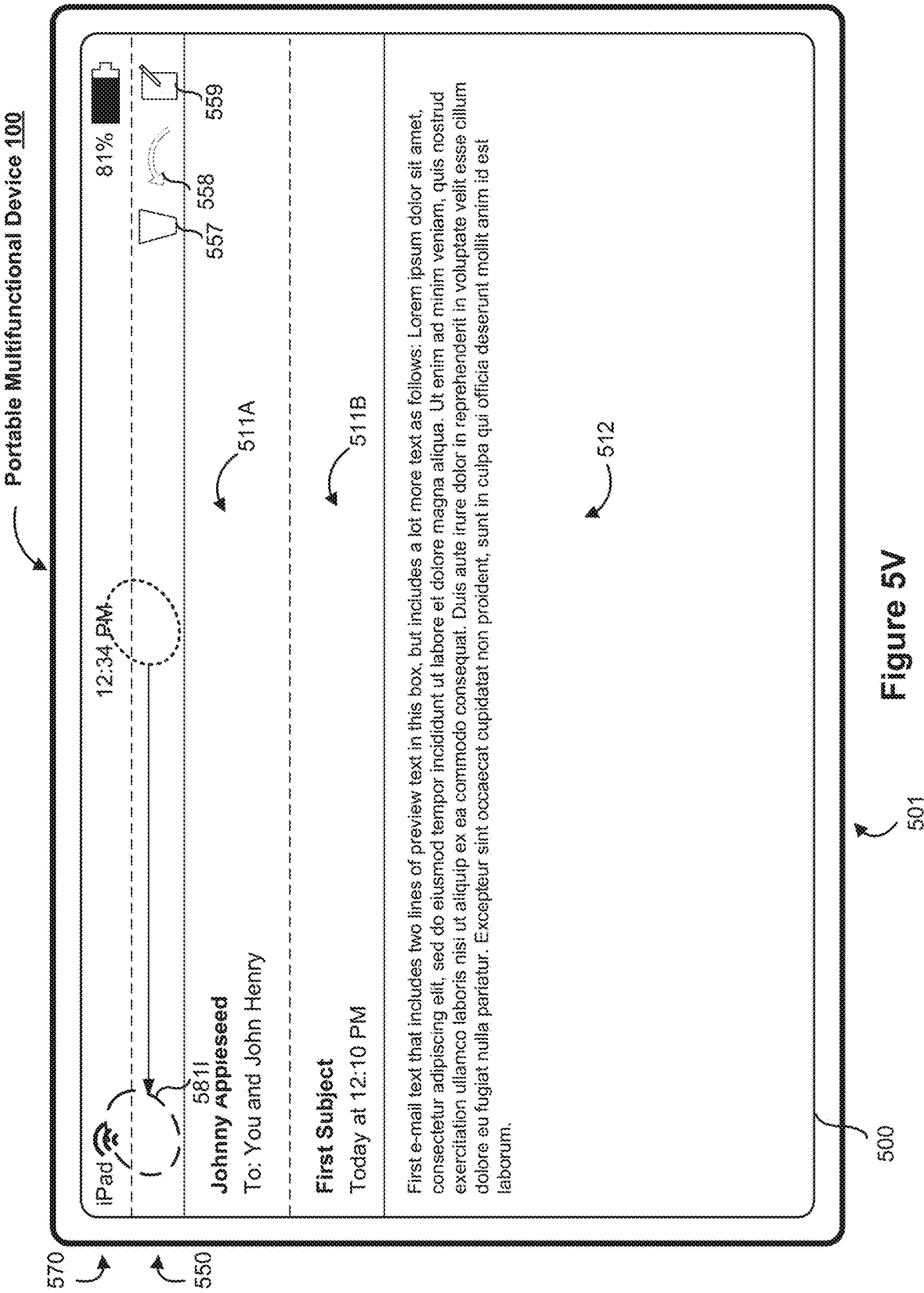

FIG. 5V illustrates the user interface 500 of FIG. 5U in response to detecting a fourth portion of the swipe 581I (e.g., movement of the contact a fourth distance and liftoff of the contact). In FIG. 5V, the second column 502 is hidden and the first column 501 is further increased in size to occupy the width of the application region.

Thus, FIGS. 5I-5K illustrate a swipe 581F in a first direction of a first total distance that changes the number of columns of the user interface 500 from two columns to three columns. FIGS. 5L-5N illustrate a swipe 581G in a second direction of a first total distance that changes the number of columns of the user interface 500 from three columns to two columns. Accordingly, in accordance with a determination that an input is in a first direction, the portable multifunctional device 100 increases the number of columns of an application region and, in accordance with a determination that an input is in a second direction, the portable multifunctional device 100 decrease the number of columns of an application region.

FIGS. 5R-5V illustrates a swipe 581I in the second direction of a second total distance that changes the number of columns of the user interface 500 from three columns to one column. Accordingly, in accordance with a determination that an input includes a first amount of movement, the portable multifunctional device 100 changes the number of columns by a first number of columns and, in accordance with a determination that an input includes a second amount of movement, the portable multifunctional device 100 changes the number of columns by a second number of columns.

Figure 5W:
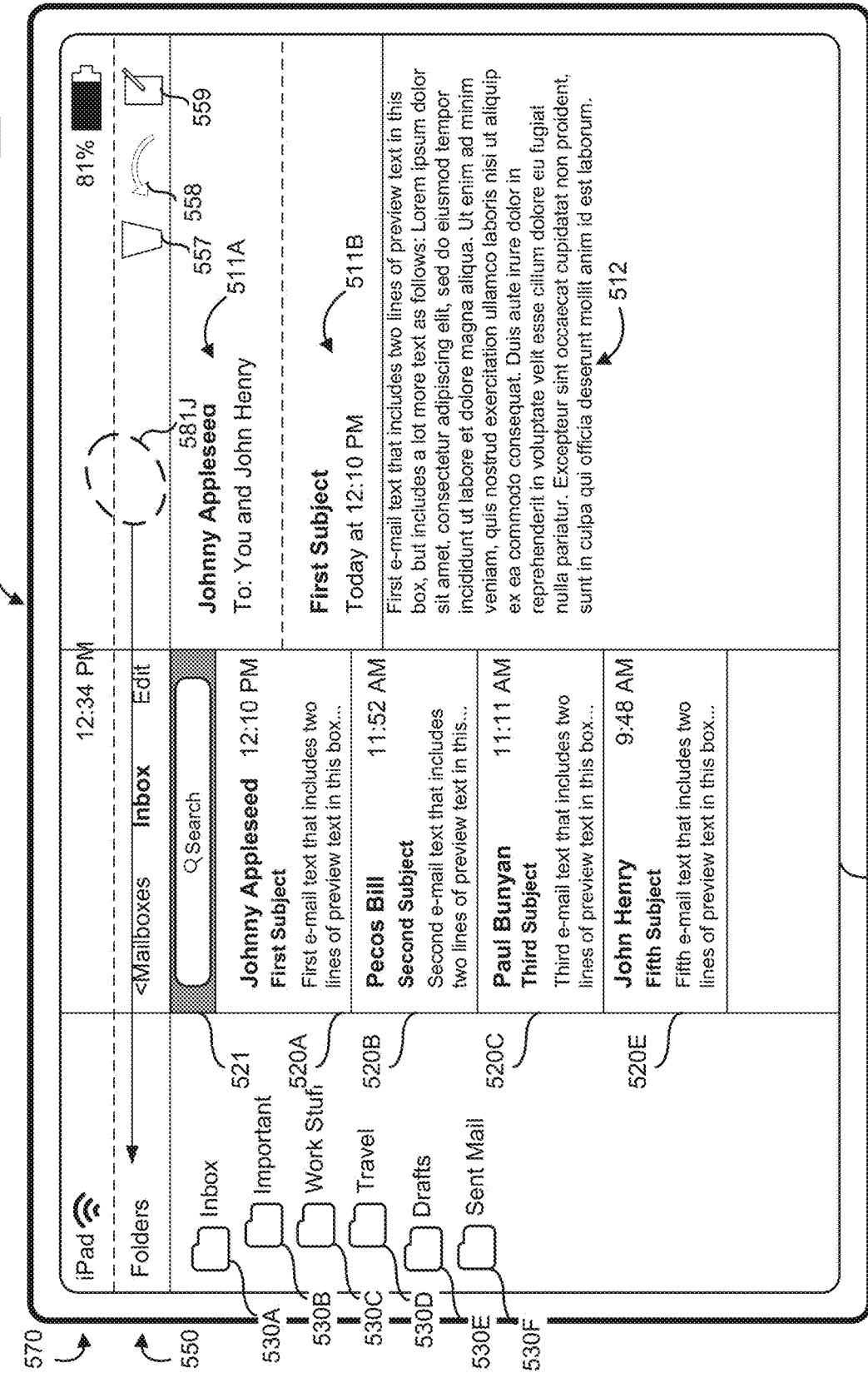

FIGS. 5W-5AC illustrate a swipe 581I in the second direction of a third total distance that changes the number of columns of the user interface 500 from three columns down to one column and back up to two columns. Accordingly, in some embodiments, the portable multifunctional device 100 changes the number of columns by decreasing the number of columns and increasing the number of columns.

FIG. 5W, like FIG. 5L and FIG. 5R, illustrates the user interface 500 of FIG. 5K with a swipe 581I detected in a second direction (e.g., to the left) starting at a location within the application bar 550. In FIG. 5W, the swipe 581I is longer than that the swipe 581I of FIG. 5R.

Figure 5X:
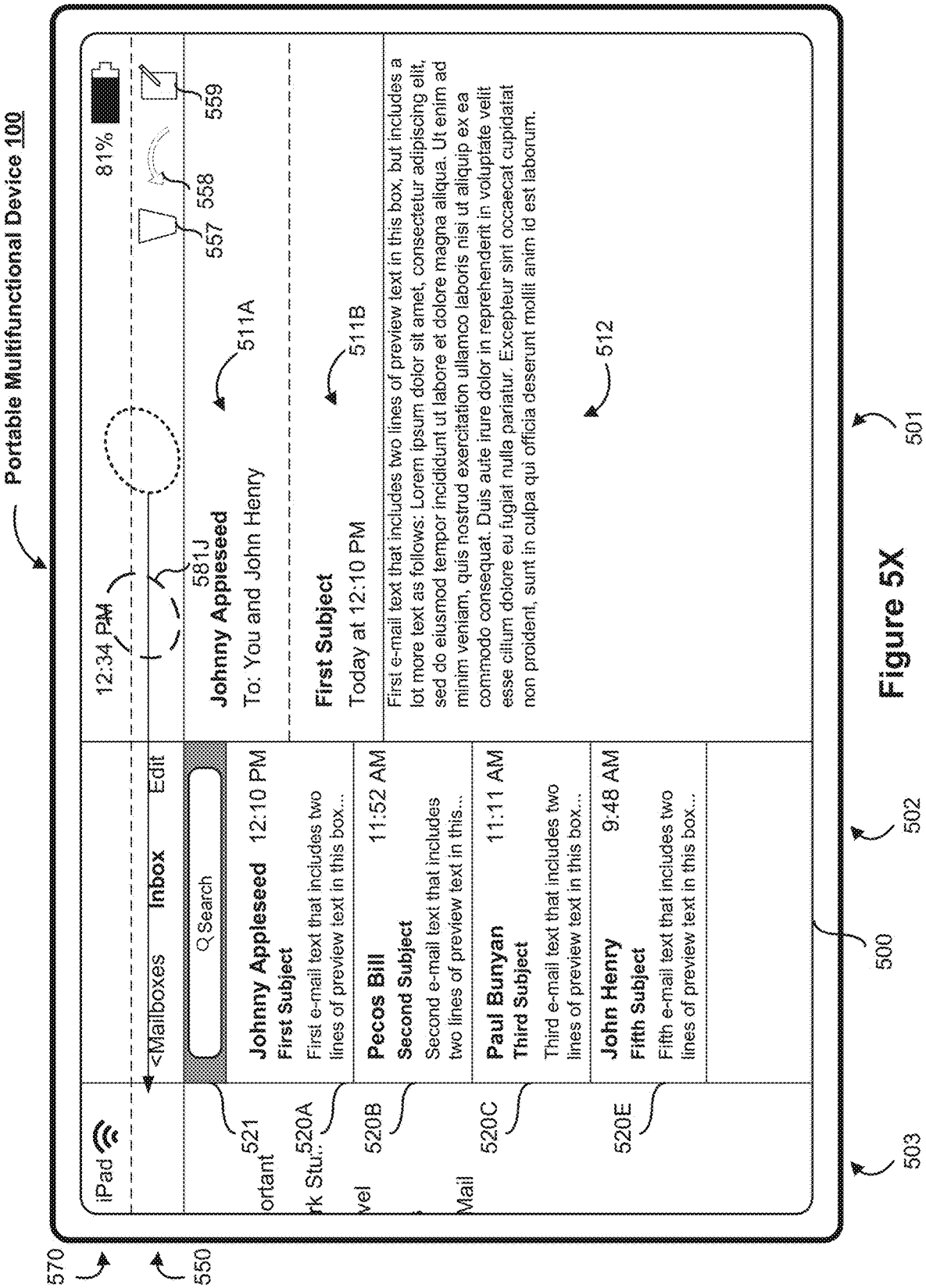

FIG. 5X illustrates the user interface 500 of FIG. 5W in response to detecting a first portion of the swipe 581I (e.g., contact and movement of the contact a first distance). In FIG. 5X, the second column 502 is moved in the direction of the swipe 581I (e.g., to the left). The first column 501 is increased in size to the right of the second column 502 and third column 503 is partially hidden to the left of the second column 502. As illustrated in FIG. 5X, the size of the second column 502 (e.g., the width of the second column 502) does not change.

Figure 5Y:
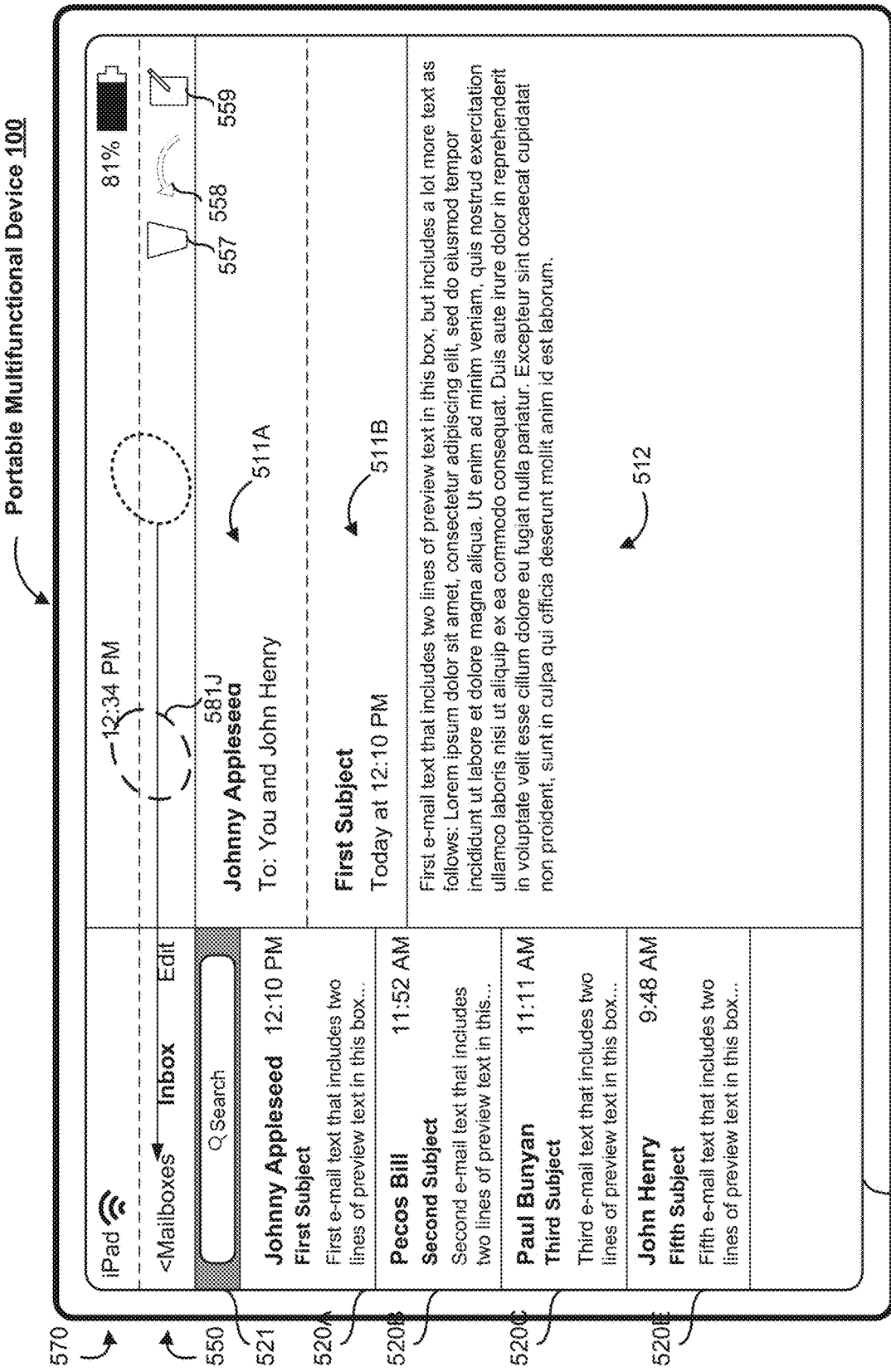

FIG. 5Y illustrates the user interface 500 of FIG. 5X in response to detecting a second portion of the swipe 581I (e.g., movement of the contact a second distance). In FIG. 5Y, the second column 502 is further moved in the direction of the swipe 581I (e.g., further to the left). The first column 501 is further increased in size to the right of the second column 502 and third column 503 is fully hidden (e.g., not displayed). As illustrated in FIG. 5Y, the size of the second column 502 (e.g., the width of the second column 502) does not change.

Figure 5Z:
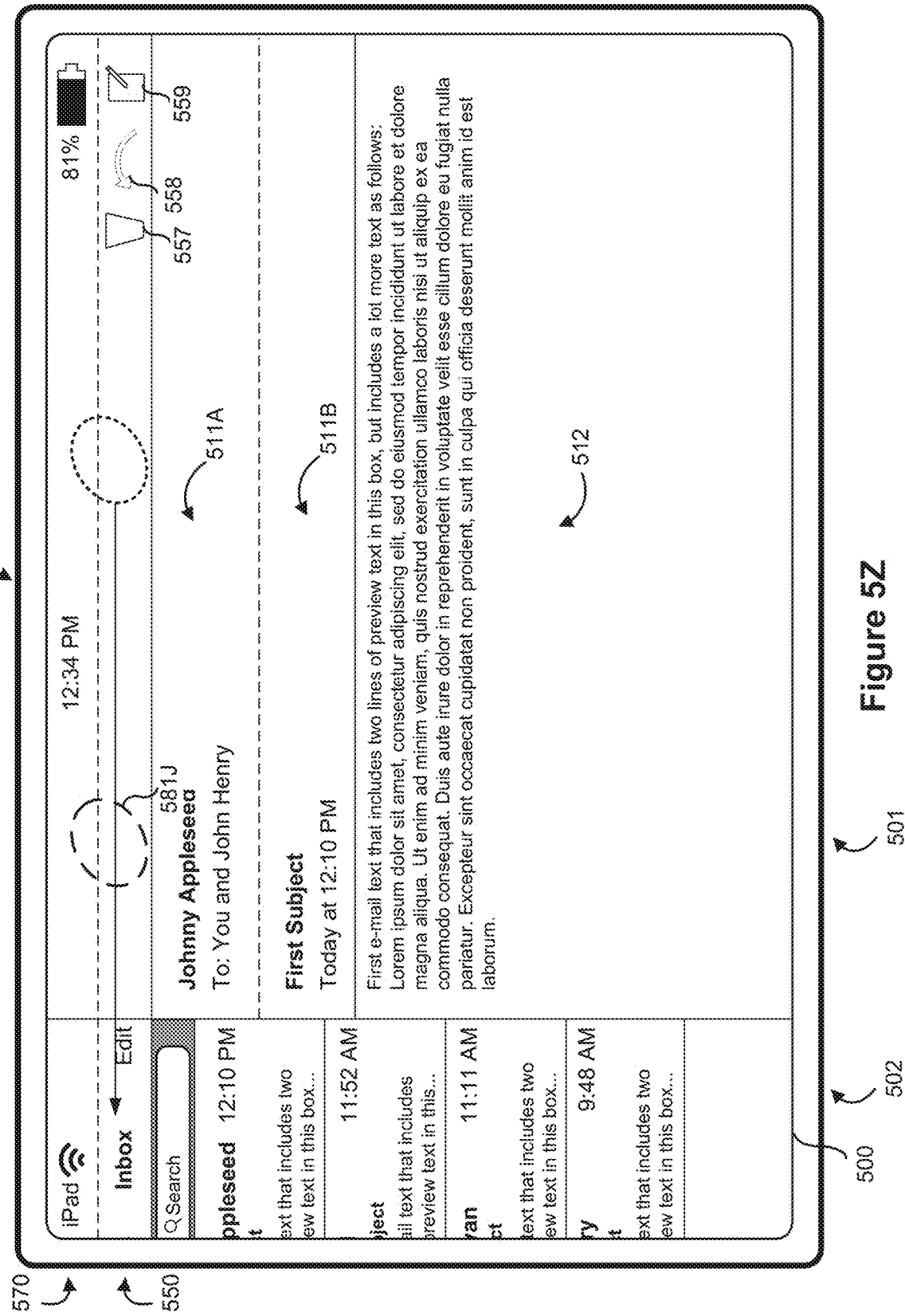
Figure 5A:
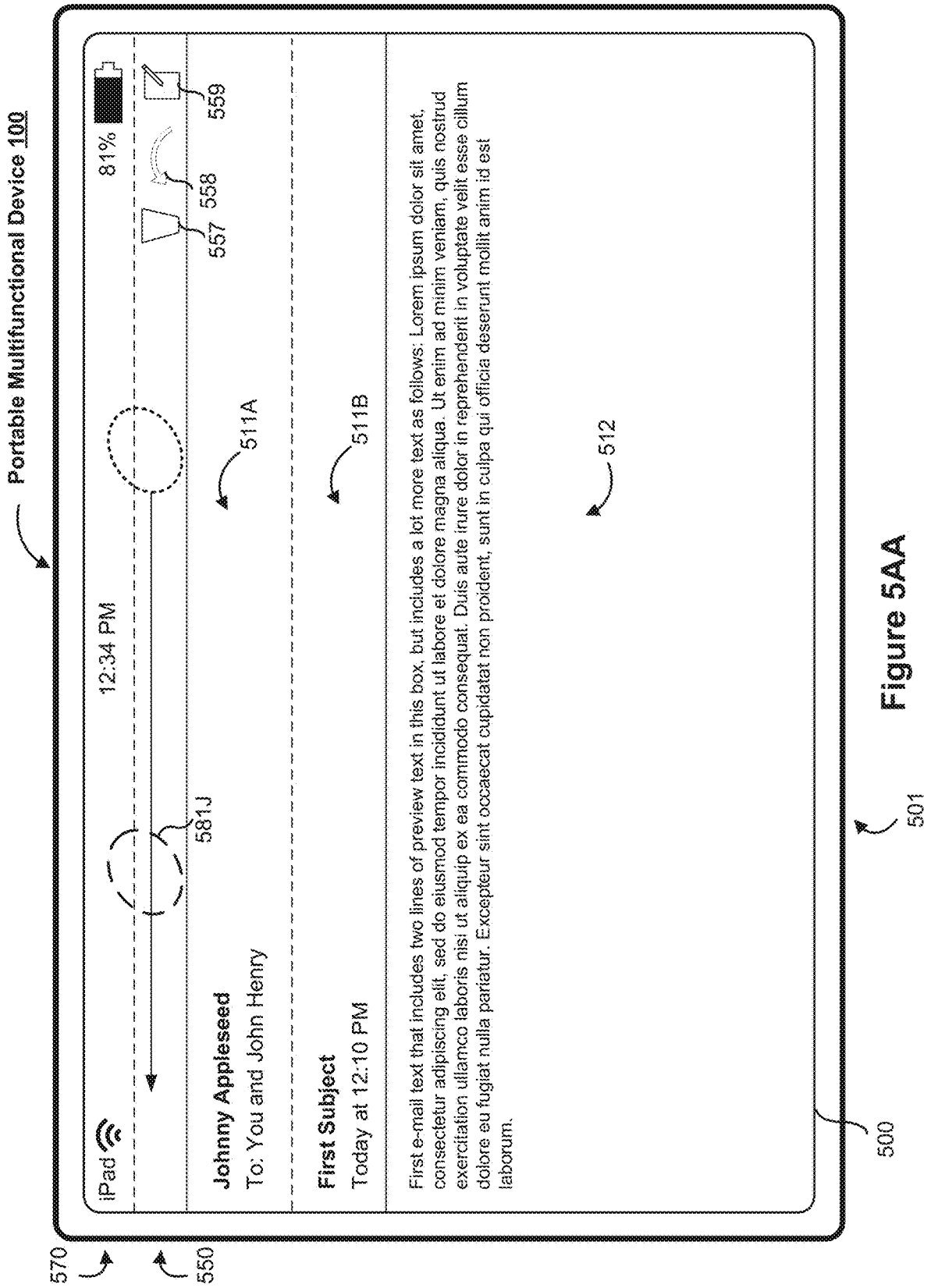
Figure 5A:
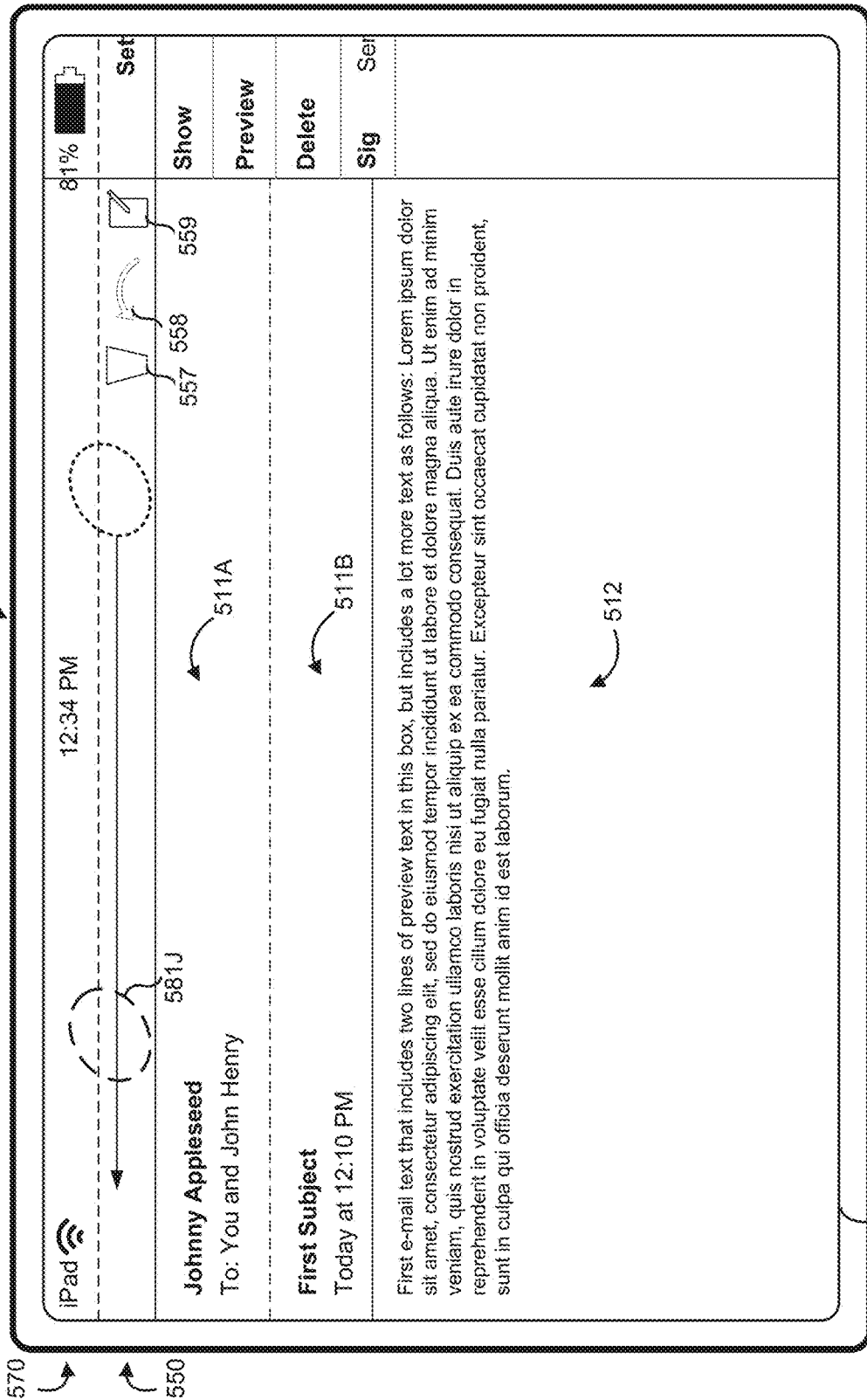
Figure 5A:
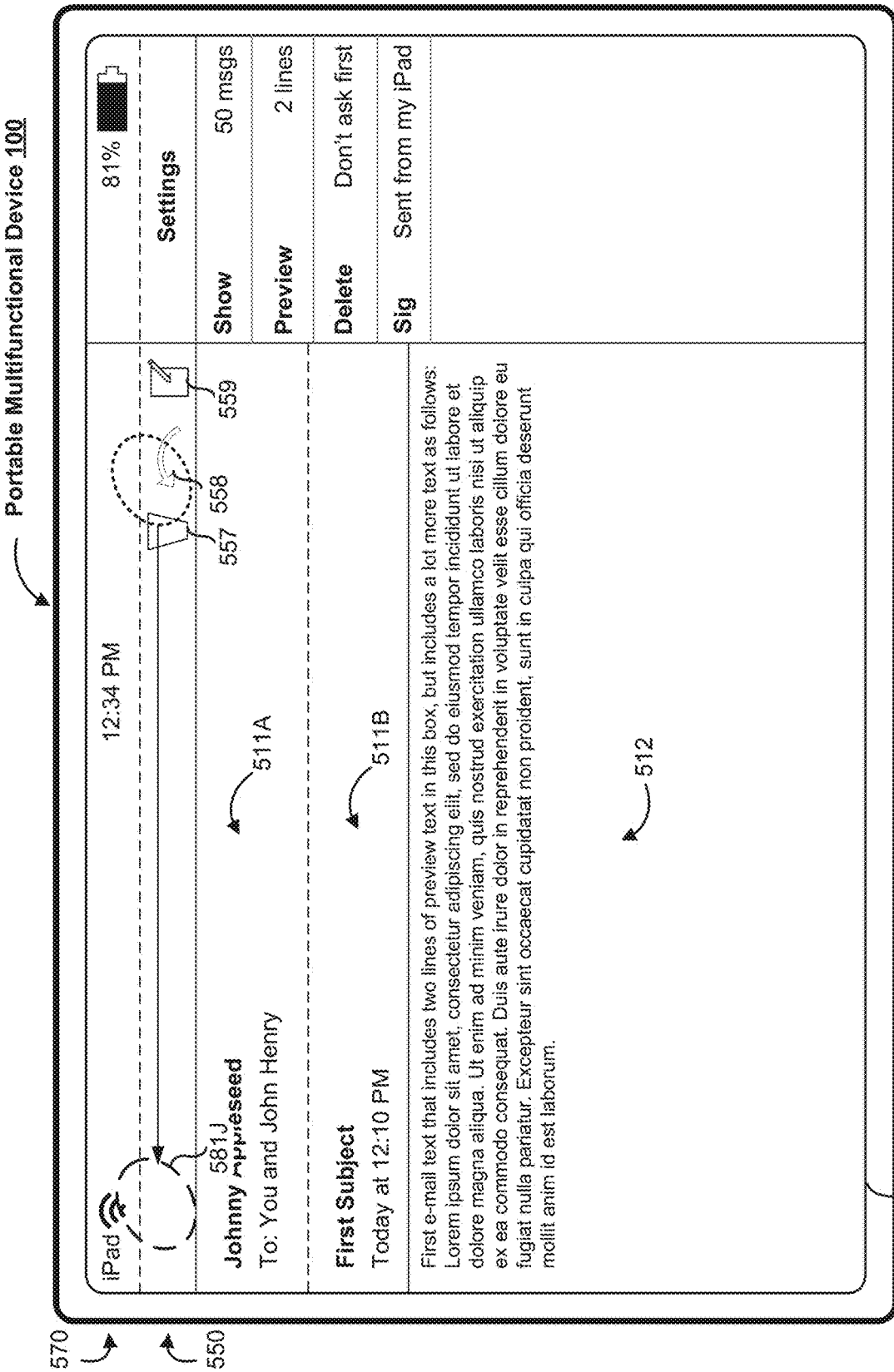
Figure 5A:
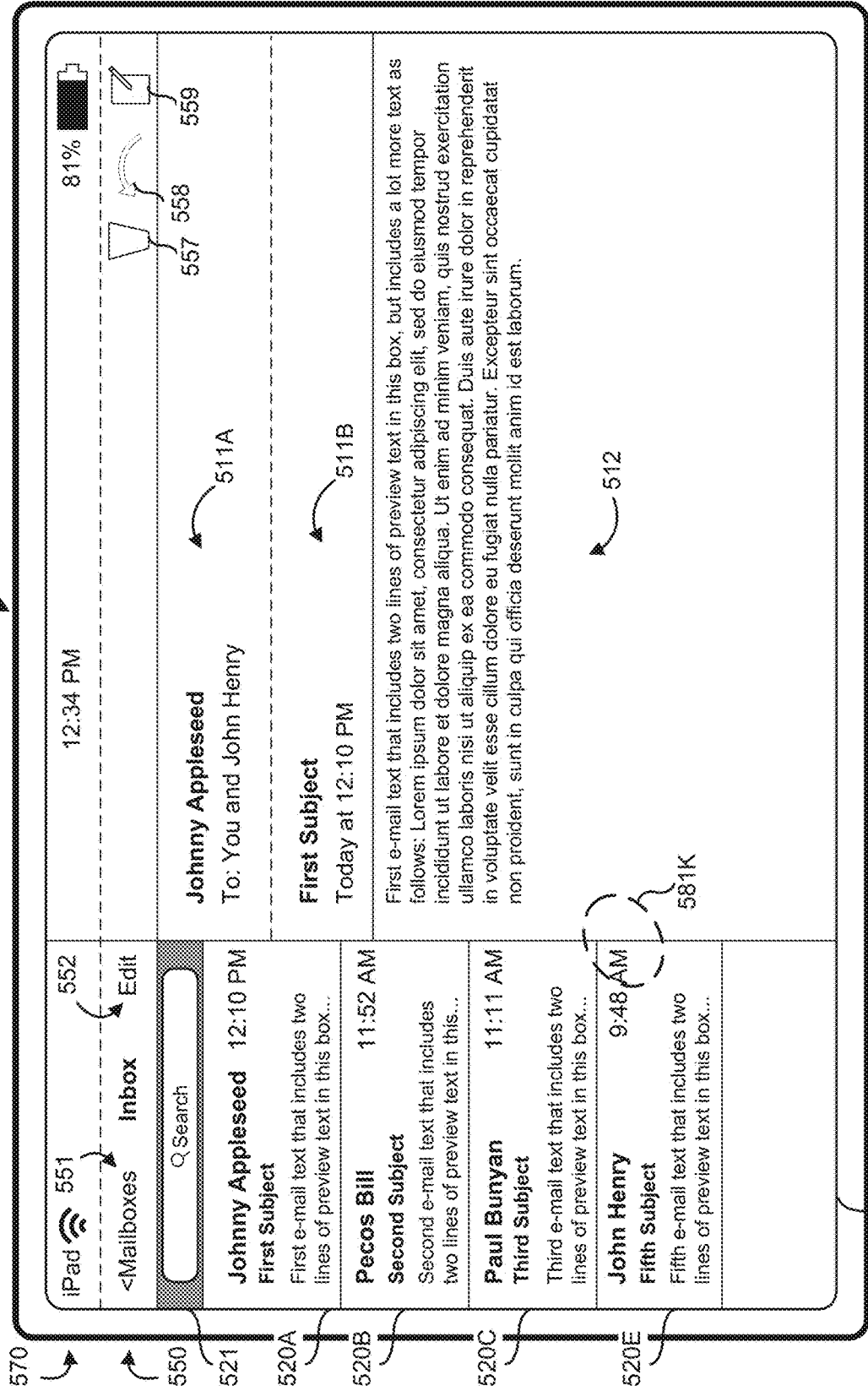
Figure 5A:
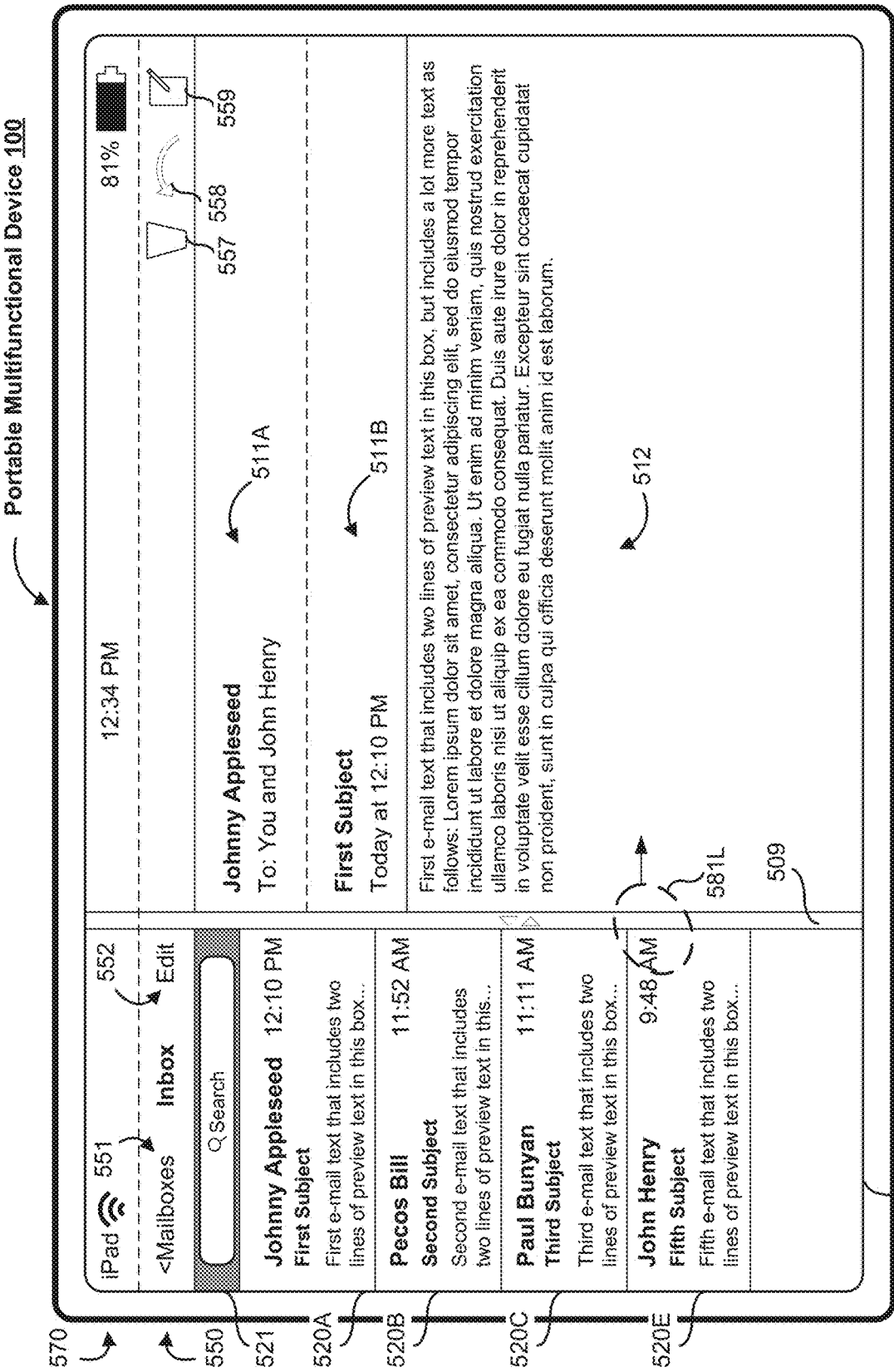
Figure 5A:
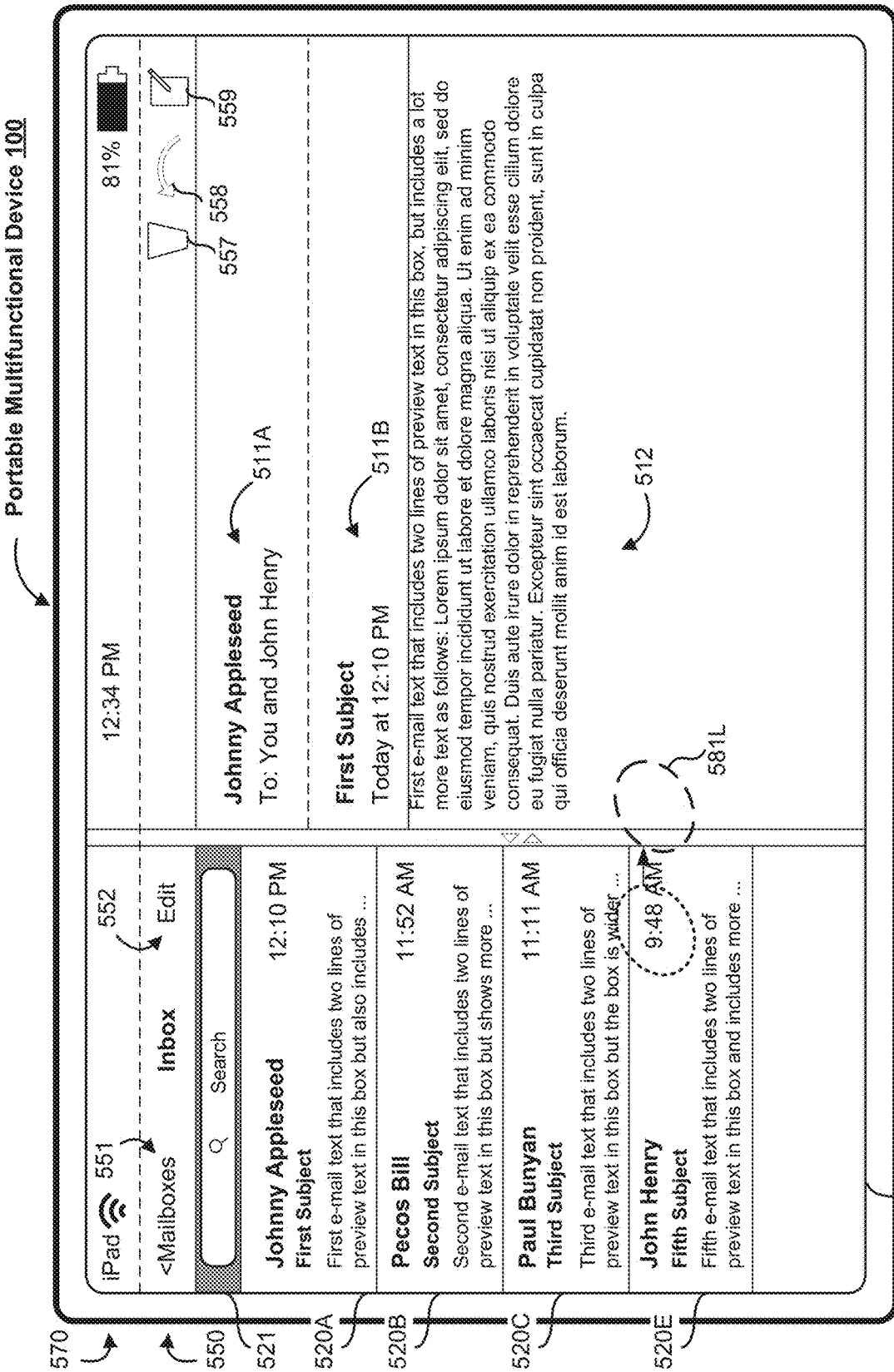
Figure 5A:
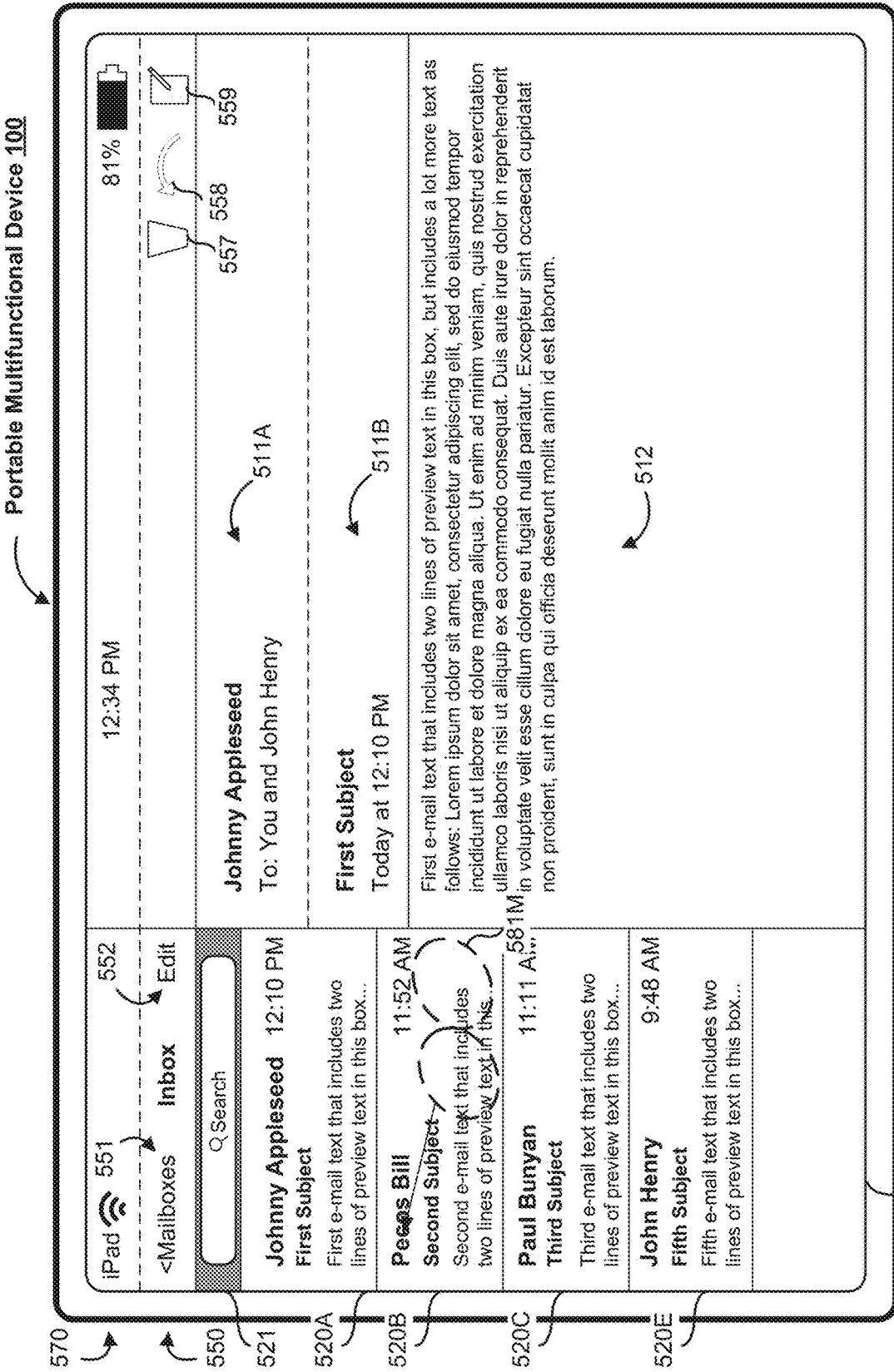
Figure 5A:
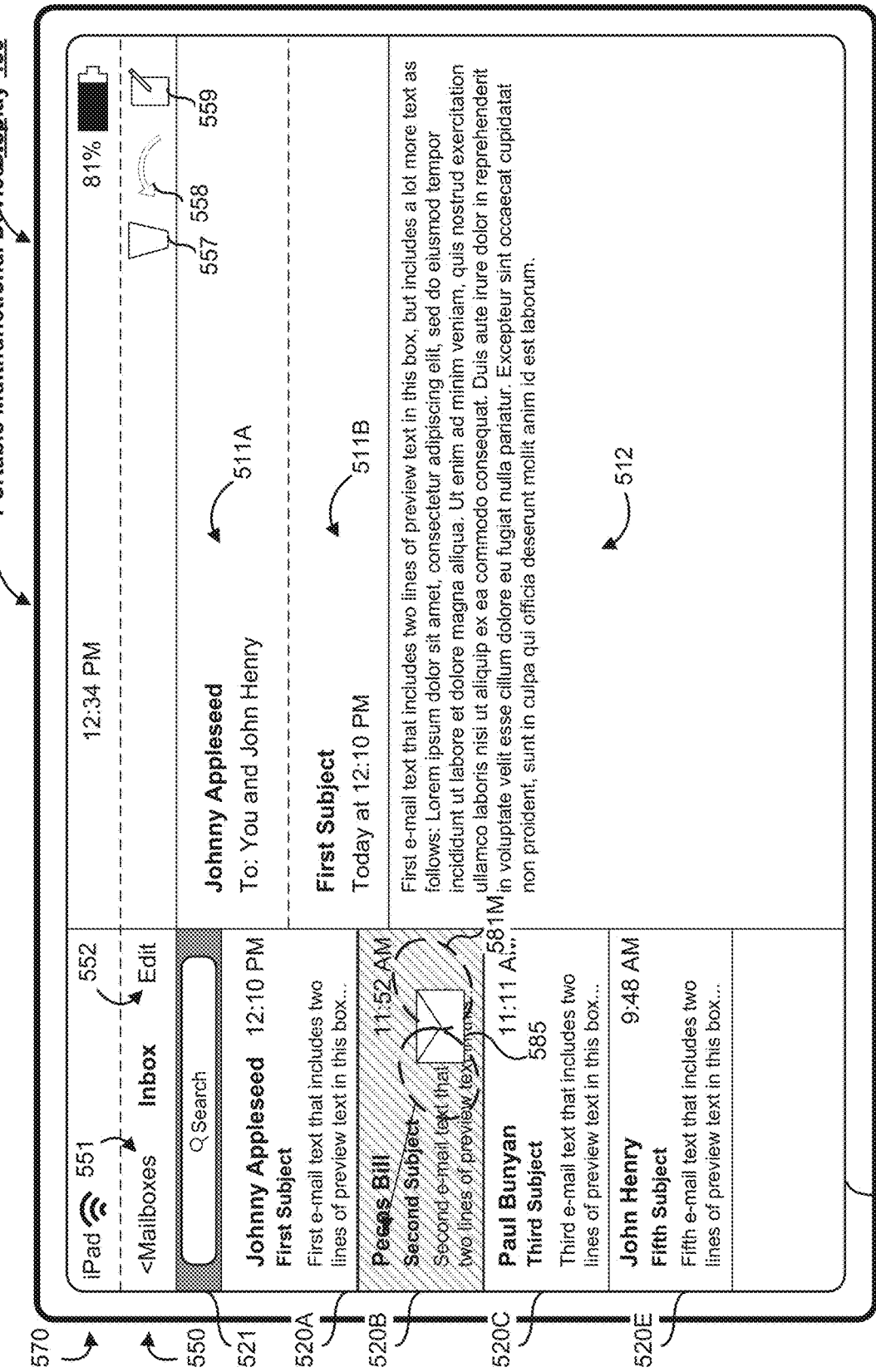
Figure 5A:
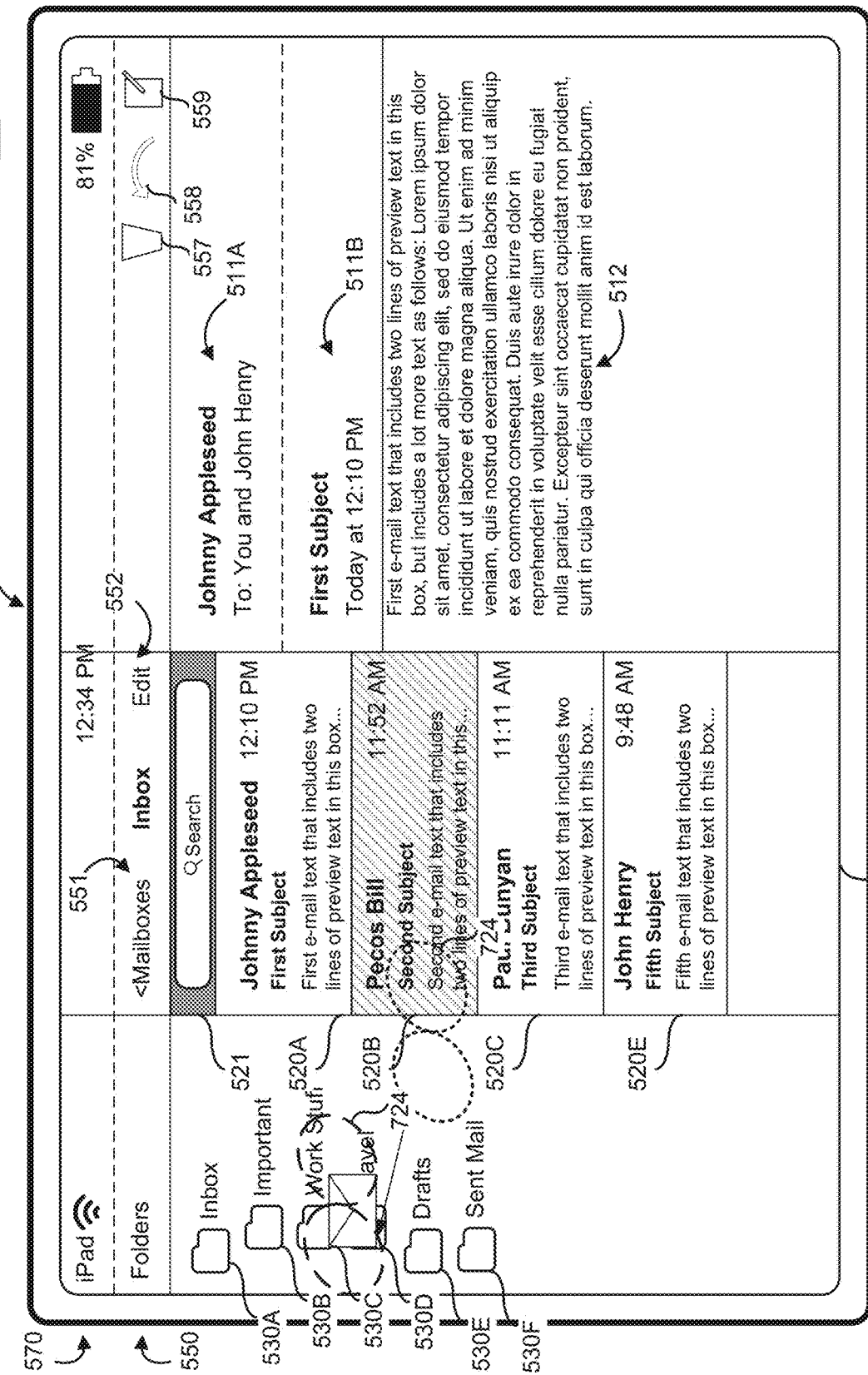
Figure 5A:
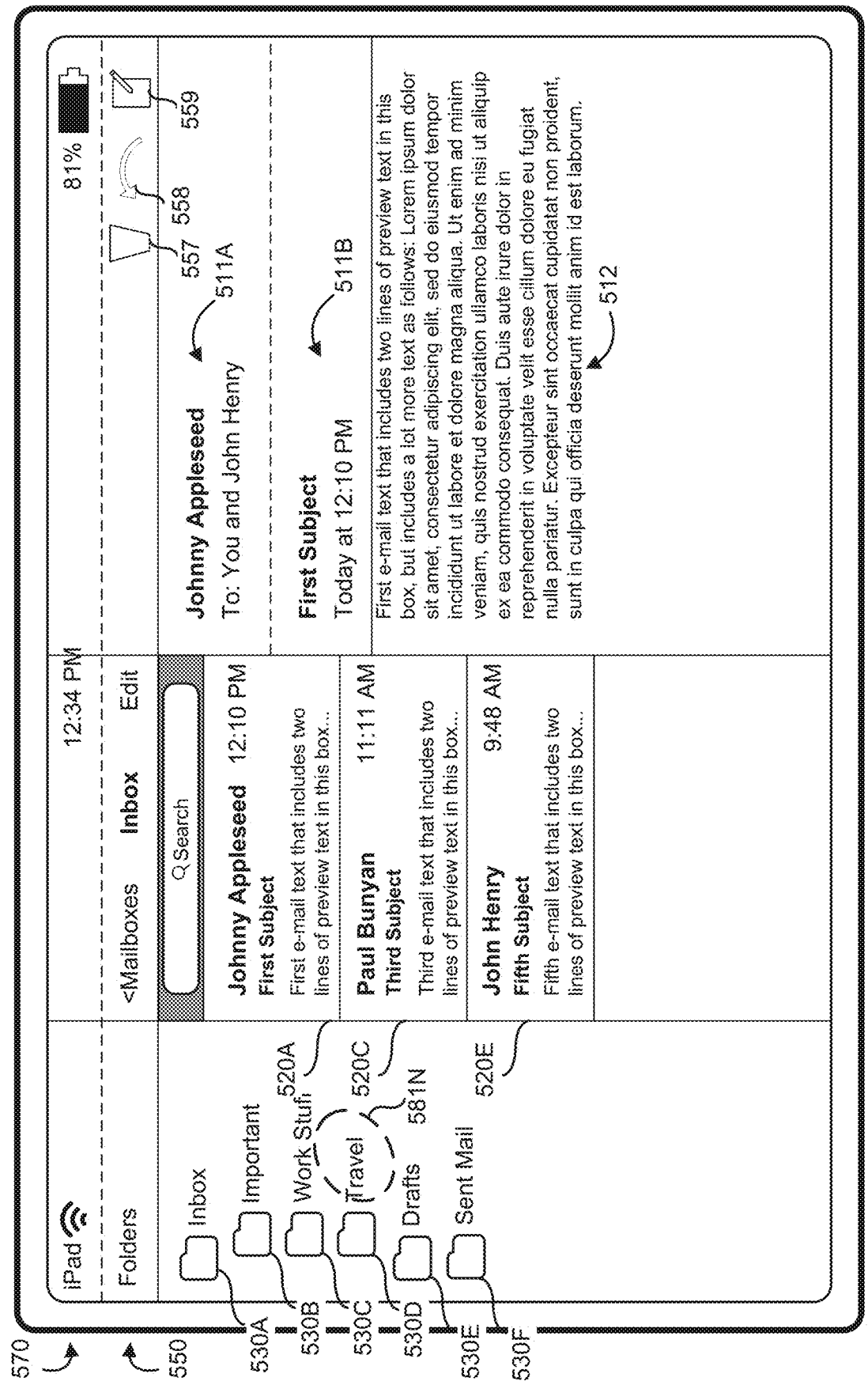
Figure 5A:
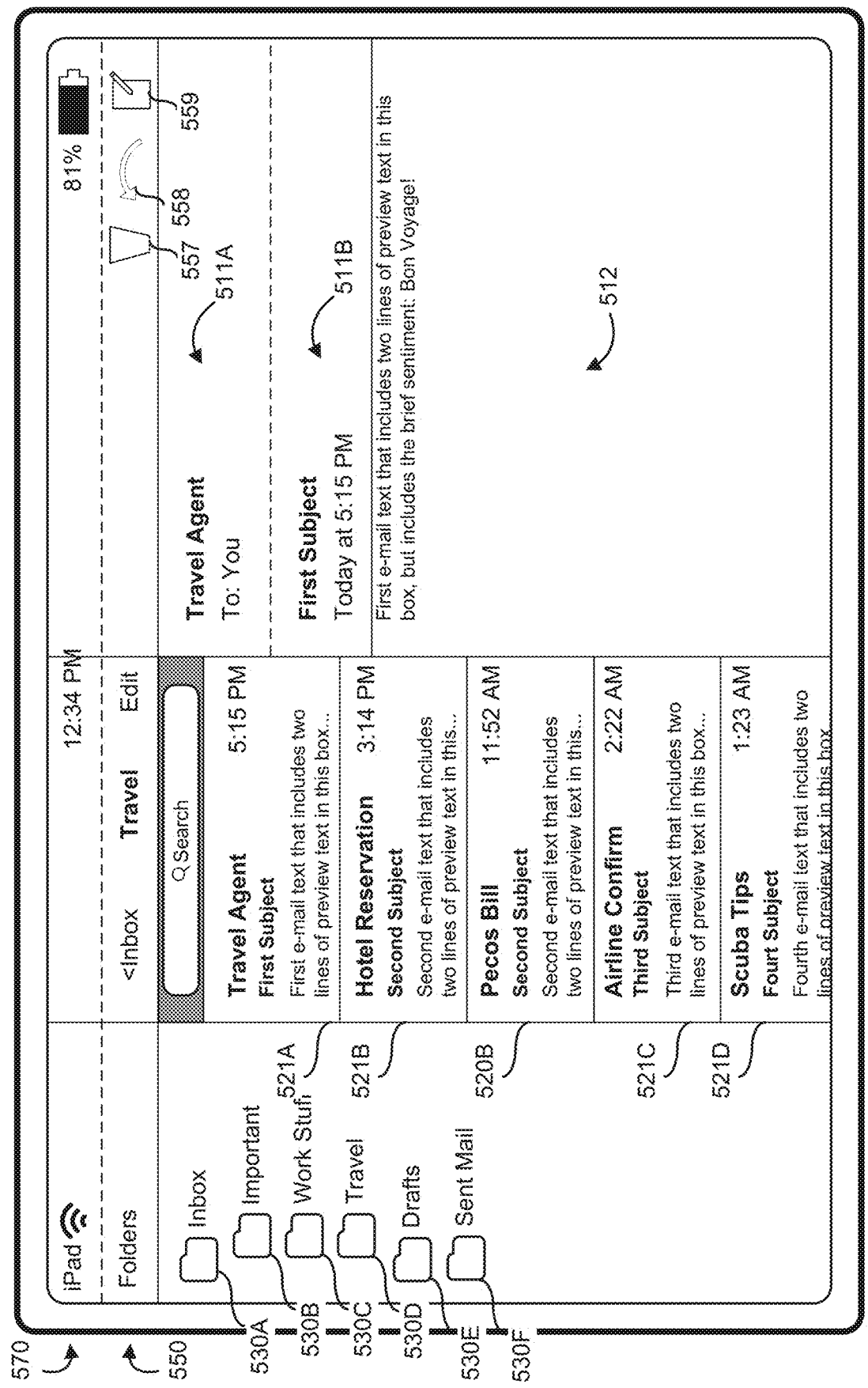
Figure 6A:
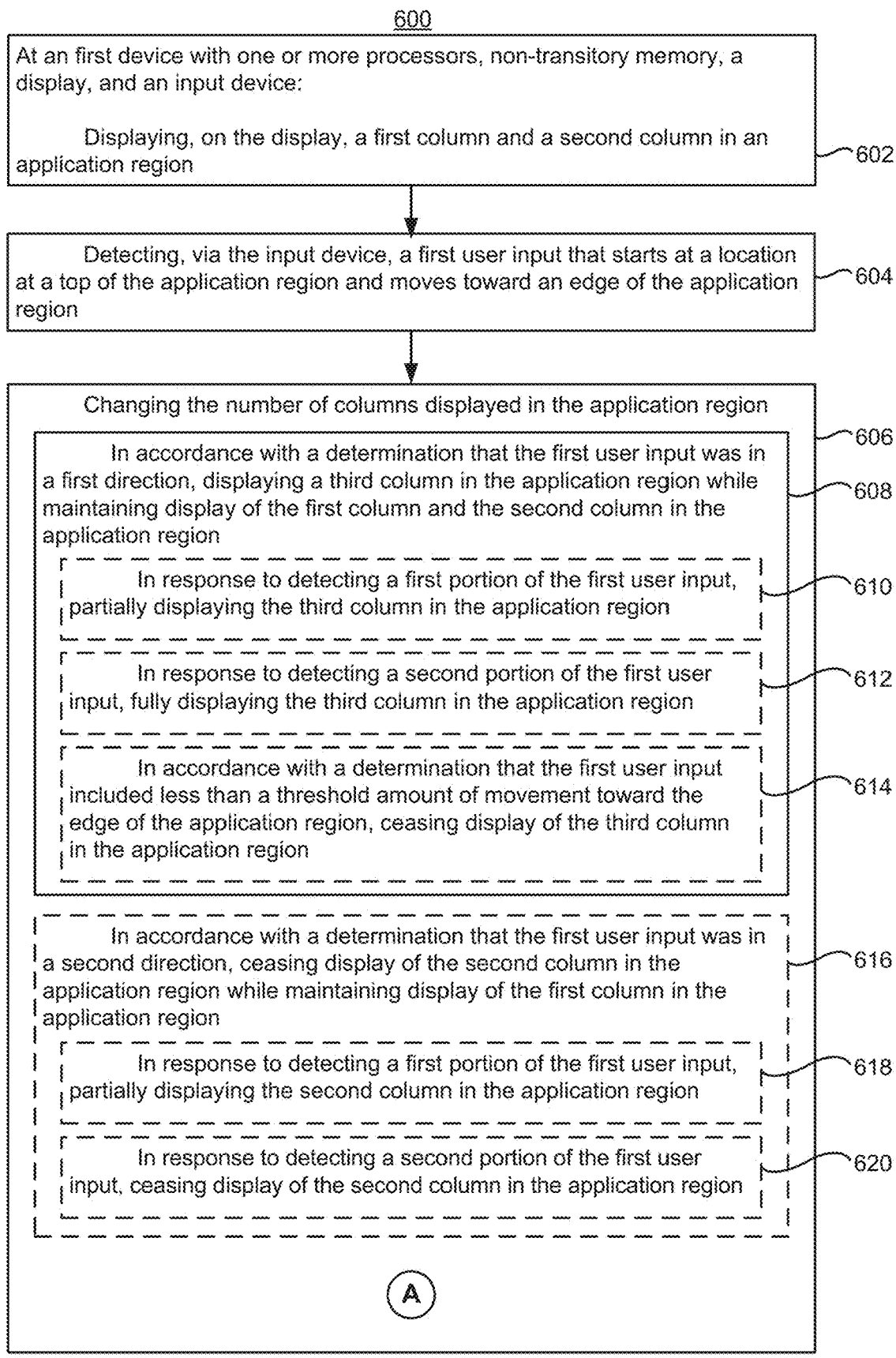
Figure 6C:
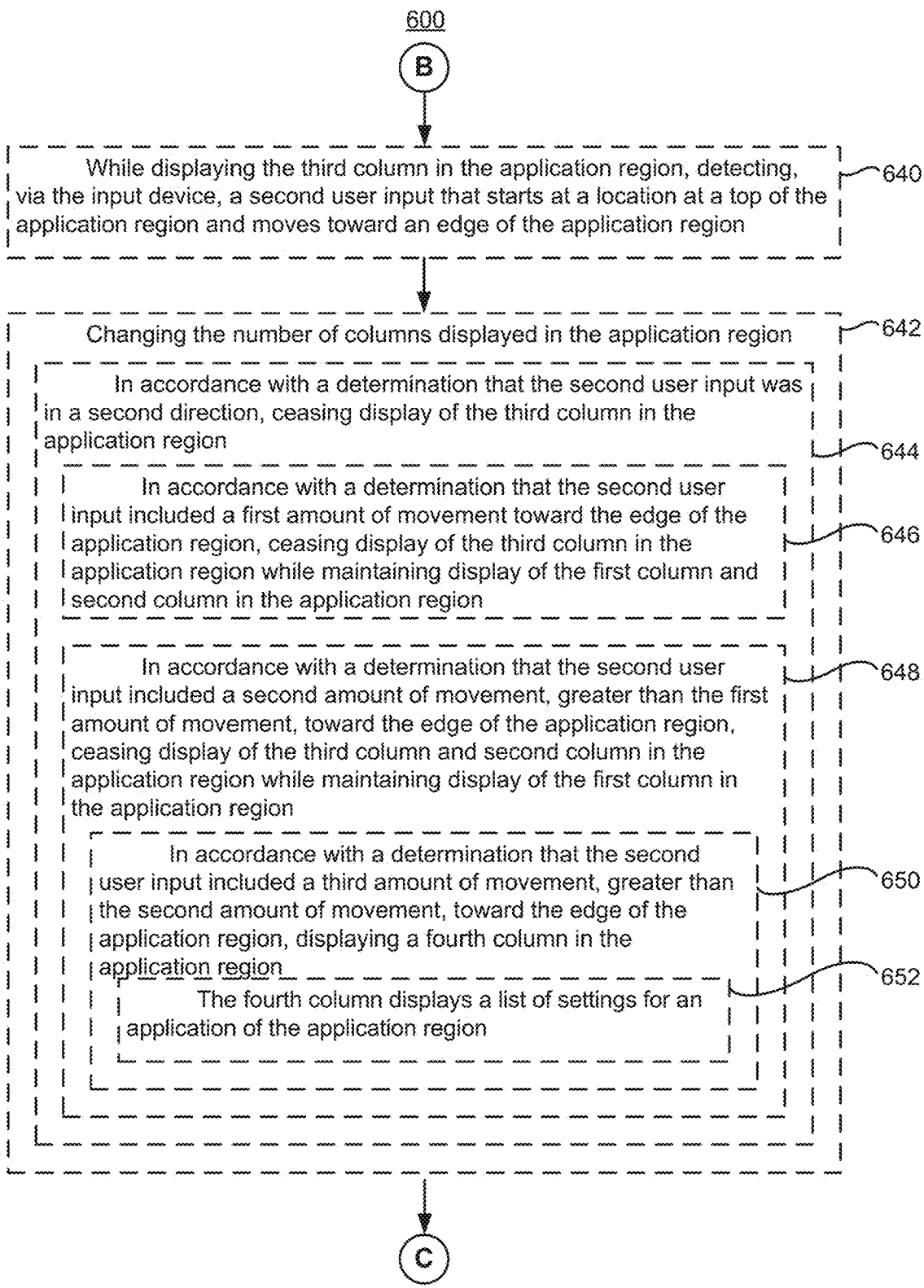
Figure 6D:
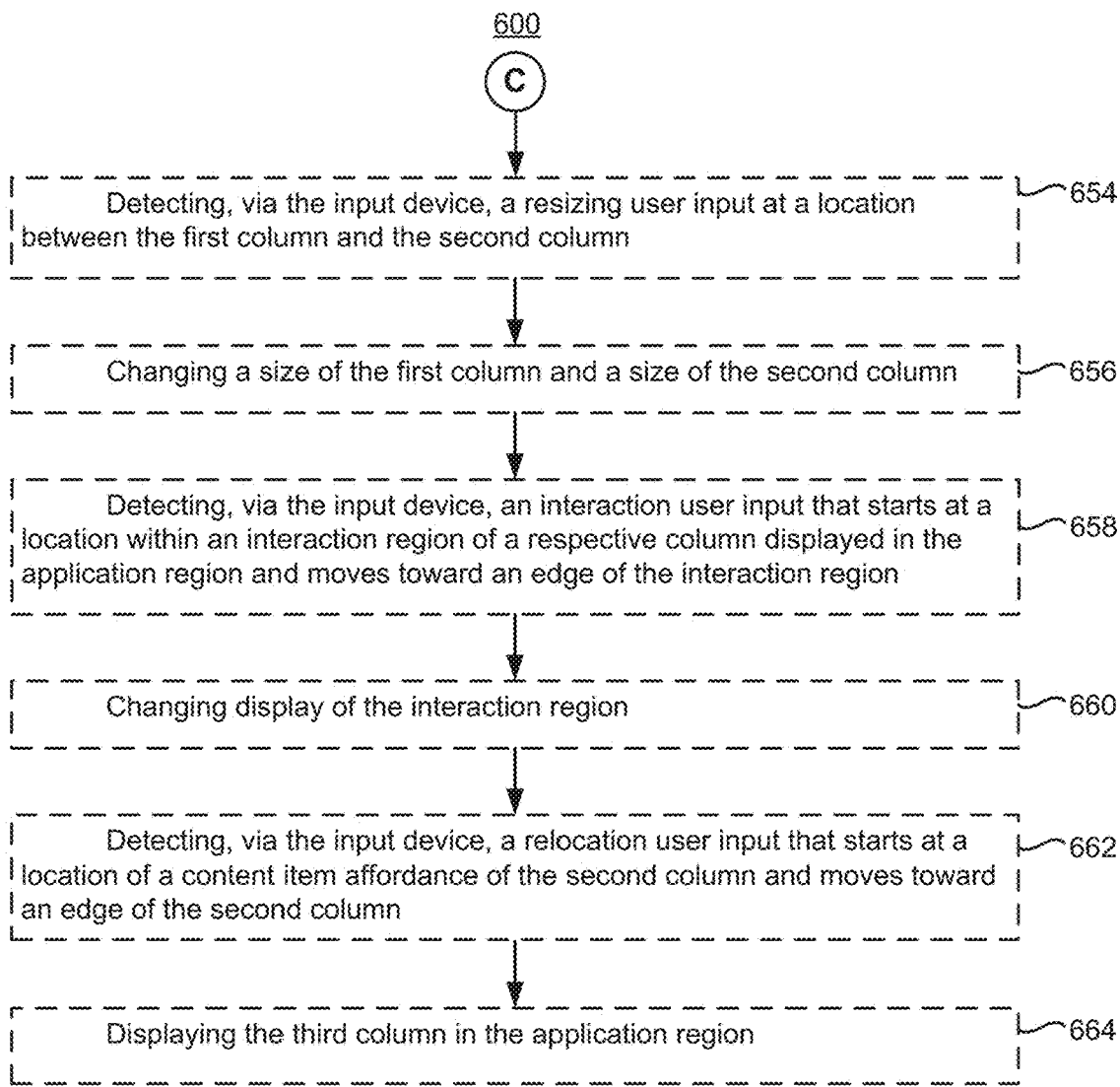

FIG. 5Z illustrates the user interface of FIG. 5Y in response to detecting a third portion of the swipe 581I (e.g., movement of the contact a third distance). In FIG. 5Z, the second column 502 is moved in the direction of the swipe 581I (e.g., to the left) partially off the display. The first column 501 is increased in size to the right of the second column 502.

FIG. 5AA illustrates the user interface 500 of FIG. 5Z in response to detecting a fourth portion of the swipe 581J (e.g., movement of the contact a fourth distance). In FIG. 5AA, the second column 502 is hidden and the first column 501 is further increased in size to occupy the width of the application region.

FIG. 5AB illustrates the user interface 500 of FIG. 5AA in response to detecting a fifth portion of the swipe 581J (e.g., movement of the contact a fifth distance). In FIG. 5AB, the first column 501 is reduced in size and a fourth column 504 is partially displayed to the right of the first column 501.

FIG. 5AC illustrates the user interface 500 of FIG. 5AB in response to detecting a sixth portion of the swipe 581J (e.g., movement of the contact a sixth distance). In FIG. 5AB, the first column 501 is further reduced in size and the fourth column 504 is fully displayed to the right of the first column 501. In FIG. 5AC, the fourth column 504 includes a number of settings affordances for changing settings of the mail application. In other embodiments, the fourth column 504 can include other affordances and/or information.

Thus, FIGS. 5I-5AC illustrate the user interface 500 in response to a variety of swipes detected starting at a location within the application bar 550. The user interface 500 can have other responses to swipes not shown in the figures. For example, from the state of FIG. 5AC, in response to a swipe in the first direction (e.g., to the right), the portable multifunctional device 100 can change the number of columns by, in accordance with a distance of the swipe, removing the fourth column, removing the fourth column and adding the second column, or removing the fourth column and adding both the second column and the third column. As another example, from the state of FIG. 5N, in response to a swipe in the second direction (e.g., to the left), the portable multifunctional device 100 can change the number of columns by, in accordance with a distance of the swipe, removing the second column (as shown in FIGS. 5O-5Q) or removing the second column and add the fourth column. As another example, from the state of FIG. 5Q, in response to a swipe in the second direction (e.g., to the left), the portable multifunctional device 100 can change the number of columns by adding the fourth column.

FIG. 5AD illustrates the user interface 500 of FIG. 5D with a touch 581K detected at a location between the first column 501 and the second column 502.

FIG. 5AE illustrates the user interface 500 of FIG. 5AD in response to detecting the touch 581K at the location between the first column 501 and the second column 502. In FIG. 5AE, a resizing affordance 509 is displayed between the first column and the second column 502.

FIG. 5AE illustrates a drag 581L detected starting at a location of the resizing affordance 509.

FIG. 5AF illustrates the user interface 500 of FIG. 5AE in response to detecting the drag 581L starting at the location of the resizing affordance 509. In response to the drag 581L, the resizing affordance 509 is moved and the first column 501 and second column 502 are resized such that the resizing affordance 509 remains between the first column 501 and second column 502. Thus, the second column 502 is increased in size and the first column 501 is decreased in size.

FIG. 5AG illustrates the user interface 500 of FIG. 5D with a multi-touch drag 581M detected at a location of the second message affordance 520B.

FIG. 5AH illustrates the user interface 500 of FIG. 5AG in response to detecting a first portion of the multi-touch drag 581M (e.g., multiple contacts) starting at the location of the second message affordance 520B. In FIG. 5AH, the second message affordance 520B is darkened and a message icon 585 is displayed at the starting location of the multi-touch drag 581M.

FIG. 5AI illustrates the user interface 500 of FIG. 5AH in response to detecting a second portion of the multi-touch drag 581M (e.g., movement of the multiple contacts a first distance). The message icon 585 is moved in accordance with a movement of the multi-touch drag 581M. Further, the third column 503 is displayed in response to the multi-touch drag 581M reaching a left edge of the application region.

FIG. 5AJ illustrates the user interface 500 of FIG. 5AI in response to detecting a third portion of the multi-touch drag 581M (e.g., liftoff of the multiple contacts). In FIG. 5AJ, the second message affordance 520B is no longer displayed, indicating that the second message is no longer in the inbox folder. Rather, as shown below, the second message is in the "Travel" folder over which the multi-touch drag 581M of FIG. 5AI ended.

FIG. 5AJ illustrates a touch 581N detected at a location of the travel folder affordance 530D.

FIG. 5AK illustrates the user interface 500 in response to detecting the touch 581N at the location of the travel folder affordance 530D. In FIG. 5AK, the second column 502 displays a second set of message affordances 521A-521D and the second message affordance 520B from the first set. Further, the first column 501 displays a message associated with the first message affordance 521D of the second set.

FIGS. 6A-6D illustrate a flow diagram of a method 600 of displaying an application region with a changing number of columns in accordance with some embodiments. The method 600 is performed at an electronic device (e.g., the portable multifunction device 100 in FIG. 1A, or the device 300 in FIG. 3) with a display and an input device. In some embodiments, the display is a touch-screen display and the input device is on or integrated with the display. In some embodiments, the display is separate from the input device. Some operations in method 600 are, optionally, combined and/or the order of some operations is, optionally, changed.

As described below, the method 600 provides an intuitive way to change a number of columns of an application region displayed as part of a user interface. The method reduces the cognitive burden on a user when changing the number of columns, thereby creating a more efficient human-machine interface. For battery-operated electronic devices, enabling a user to change a number of column of an application region faster and more efficiently conserves power and increases the time between battery charges.

The device displays (602), on the display, a first column and a second column in an application region. For example, in FIG. 5A, the device displays a first column 501 and a second column 502 in an application region beneath the device bar 570.

The device detects (604), via the input device, a first user input that starts at a location at a top of the application region and moves toward an edge of the application region. The first user input can be, for example, a swipe, a drag, of a flick. For example, in FIG. 5I, the device detects a swipe 551A that starts at a location within an application bar 550 and moves toward a right edge of the application region (and the user interface 500).

In response to detecting the first user input, the device changes (606) the number of columns displayed in the application region. In some embodiments, in accordance with a determination that the first user input was in a first direction, the device displays (608) a third column in the application region while maintaining display of the first column and the second column in the application region. For example, in FIG. 5K, in response to detecting the swipe 581F to the right, the device displays a third column 503 while maintain display of the first column 501 and the second column 502.

In some embodiments, in response to detecting a first portion of the first user input, the device partially displays (610) the third column in the application region. Thus, the user interface indicates to a user that the third column can be displayed increasing the likelihood that a user will be aware of and use a more efficient method of displaying the third column. Further, partially displaying the third column provides an option for the user to fully display the third column (by continuing the first user input) or cease displaying the third column (by discontinuing the first user input). This option allows for more efficient manipulation of the user interface by the user, creating a more efficient human-machine interface. For battery-operated electronic devices, a more efficient human-machine user interface conserves power and increases the time between battery charges. Further, a more efficient human-machine user interface reduces the amount of user interaction with the device and reduces wear-and-tear of the device. For example, in FIG. 5J, in response to a first portion of the swipe 581F (e.g., contact and movement a first distance), the device partially displays the third column 503. In some embodiments, in response to detecting a second portion of the first user input, the device fully displays (612) the third column in the application region. For example, in FIG. 5K, in response to a second portion of the swipe 581F (e.g., movement a second distance and/or liftoff of the contact), the device fully displays the third column 503.

In some embodiments, in accordance with a determination that the first user input included less than a threshold amount of movement toward the edge of the application, the device ceases display (614) of the third column in the application region. Thus, a user is provided with an option to cease displaying the third column in response to a small (or partial) user input. This option allows for more efficient manipulation of the user interface by the user, creating a more efficient human-machine interface. For battery-operated electronic devices, a more efficient human-machine user interface conserves power and increases the time between battery charges. Further, a more efficient human-machine user interface reduces the amount of user interaction with the device and reduces wear-and-tear of the device. For example, in FIG. 5J, the device displays (partially) the third column 503 in response to a first portion of the swipe 581F (e.g., contact and movement a first distance). As described above, if a second portion of the swipe 581F (e.g., movement a second distance) is not detected, the device returns to the state of FIG. 5I in which the third column 503 is not displayed. The amount of movement can be, for example, a distance, a speed, or a combination of the two. Thus, if the swipe 581F is not long enough and/or fast enough, the third column 503 is only temporarily (and, perhaps, only partially) displayed.

In some embodiments, in accordance with a determination that the first user input was in a second direction (e.g., a direction opposite the first direction), the device ceases display (616) of the second column in the application region while maintaining display of the first column in the application region. Thus, a user can increase the amount of display used for the first column and more efficiently consume the content thereof. Thus, the device can include a smaller screen (at a lower cost) with the same usability. For example, in FIG. 5Q, in response to detecting the swipe 581H to the left, the device ceases display of the second column 502 while maintain display of the first column 501.

In some embodiments, in response to detecting a first portion of the first user input, the device partially displays (618) the second column in the application region. For example, in FIG. 5P, in response to a first portion of the swipe 581H (e.g., contact and movement a first distance), the device partially displays the second column 502 (e.g., by partially hiding the second column 502). In some embodiments, in response to detecting a second portion of the first user input, the device ceases display (620) the second column in the application region. For example, in FIG. 5O, in response to a second portion of the swipe 581F (e.g., movement a second distance and/or liftoff of the contact), the device ceases display of the second column 502.

In some embodiments, in changing the number of columns displayed in the application region, the device does not change (622) a size of the application region. For example, from FIG. 5I to FIG. 5K, the device change the number of columns from two columns to three columns, but the size of the application region remains constant, spanning the width of the user interface 500.

In some embodiments, in changing the number of columns displayed in the application region, the device does not change (624) a size of the second column. For example, from FIG. 5I to FIG. 5K, the device changes the number of columns from two columns to three columns, but the size of the second column 502 remains constant. In contrast, the size of the first column 501 is reduced (e.g., the width of the first column 501 is reduced).

In some embodiments, the first column displays (626) a content file and the second column displays a list of content files. For example, in FIG. 5K, the first column 501 displays a message in a content section of the first column 512. In FIG. 5K, the second column 502 displays a number of message affordances 520A-520E. In various implementations, the content file can include a message, a text document, a media file, a spreadsheet, or any other type of content.

In some embodiments, in response to detecting a user input at a location of one of the list of content files, the device changes display (628) of the first column to display the corresponding content file. For example, in FIG. 5D, the device detects a touch 581C at a location of the third message affordance 520C in the second column 502. In response, in FIG. 5E, the device displays the third message in the first column 501.

In some embodiments, the second column displays (630) a list of content files and the third column displays a list of content folders. For example, in FIG. 5K, the second column 502 displays a number of message affordances 520A-520E. In FIG. 5K, the third column 503 displays a number of folder affordances 530A-530F.

In some embodiments, in response to detecting a user input at a location of one of the content folders, the device changes display (632) of the second column to display a corresponding list of content files. For example, in FIG. 5AJ, the device detects a touch 581N at a location of the fourth folder affordance 530D. In response, in FIG. 5AK, the device displays a corresponding set of message affordances 520B, 521A-521D.

In some embodiments, in accordance with a determination that the first user input included a first amount of movement toward the edge of the application region, the device changes (634) the number of columns by a first number of columns and, in accordance with a determination that the first user input included a second amount of movement, greater than the first amount of movement, toward the edge of the application region, the device changes (636) the number of columns by a second number of columns greater than the first number of columns. Thus a user can select a number of columns to add or remove with a single input. For battery-operated electronic devices, a single input that can perform multiple functions conserves power and increases the time between battery charges. Further, a single input that can perform multiple functions reduces the amount of user interaction with the device and reduces wear-and-tear of the device. For example, from FIG. 5L to FIG. 5N, the device removes one column in response to a swipe 581G including a first amount of movement and, from FIG. 5R to FIG. 5V, the device removes two column in response to a swipe 581I including a second amount of movement.

In some embodiments, in accordance with a determination that the first user input included a third amount of movement toward the edge of the application region, the device changes (638) the number of columns by the second number of columns and displays a different column in the application region. Thus a user can both remove and add columns with a single input. For battery-operated electronic devices, a single input that can perform multiple functions conserves power and increases the time between battery charges. Further, a single input that can perform multiple functions reduces the amount of user interaction with the device and reduces wear-and-tear of the device. For example, from FIG. 5W to FIG. 5AC, in response to a swipe 581J including a third amount of movement, the device removes two columns and adds a fourth column 504.

In some embodiments, while displaying the third column in the application region, the device detects (640), via the input device, a second user input that starts at a location at a top of the application region and moves toward an edge of the application region. For example, in FIG. 5L, the device displays the third column 503 in the application region and detects a swipe 581G starting at a location within the application bar 550 and moving toward the left edge of the application region.

In some embodiments, in response to detecting the second user input, the device changes (642) the number of columns displayed in the application region. For example, in FIG. 5N, in response to detecting the swipe 581G, the device changes the number of columns displayed from three to two.

In some embodiments, in accordance with a determination that the second user input was in a second direction, the device ceases display (644) of the third column in the application region. For example, in FIG. 5N, in response to the swipe 581G to the right, the device ceases display of the third column 503.

In some embodiments, in accordance with a determination that the second user input included a first amount of movement toward the edge of the application region, the device ceases display (646) of the third column in the application region while maintaining display of the first column and second column in the application region. For example, in FIG. 5N, in response to the swipe 581G having a first amount of movement, the device ceases display of the third column 503 and maintains display of the first column 501 and second column 502 in the application region.

In some embodiments, in accordance with a determination that the second user input included a second amount of movement, greater than the first amount, toward the edge of the application region, the device ceases display (648) of the third column and second column in the application region while maintaining display of the first column in the application region. For example, in FIG. 5V, in response to the swipe 581I having a second amount of movement, the device ceases display of the third column 503 and second column 502 in the application region and maintains display of the first column 501 in the application region.

In some embodiments, in accordance with a determination that the second user input included a third amount of movement, greater than the second amount, toward the edge of the application region, the device displays (650) a fourth column in the application region. For example, in FIG. 5AC, in response to the swipe 581J having a third amount of movement, the device displays the fourth column 504 in the display region.

In some embodiments, the fourth column displays (652) a list of settings for an application of the application region. For example, in FIG. 5AC, the fourth column 504 includes a number of settings affordances for changing settings of the mail application displayed in the application region.

In some embodiments, the device detects (654), via the input device, a resizing user input at a location between the first column and the second column. For example, in FIG. 5AD, the device detects a touch 581K at a location between the first column 501 and the second column 502. As another example, in FIG. 5AE, the device detects a drag 581L at a location of a resizing affordance 509 displayed between the first column 501 and the second column 502.

In some embodiments, in response to detecting the resizing user input, the device changes (656) a size of the first column and a size of the second column. For example, in response to detecting the drag 581L in FIG. 5AE, the device changes the size, in FIG. 5AF, of the first column 501 and the second column 502. In particular, size of the first column 501 is decreased and the size of the second column 502 is increased.

In some embodiments, the device detects (658), via the input device, an interaction user input that starts at a location within an interaction region of a respective column and moves toward an edge of the interaction region. For example, in FIG. 5F, the device detects a swipe 581E that starts at a location of the fourth message affordance 520D within an interaction region of the second column 502 and moves toward an edge of the user interface 500.

In some embodiments, in response to the interaction user input, the device changes (660) display of the interaction region. Thus, a user can, from the same initial state, change the number of columns of the application region and interact with the content of the application region. This can reduce the number of inputs to perform each of these functions, conserving power and increasing the time between battery charges. Further, reducing the number of inputs reduces the amount of user interaction with the device and reduces wear-and-tear of the device. For example, in response to detecting the swipe 581E in FIG. 5F, the device changes the display of the second column 502, in FIG. 5H, by removing the fourth message affordance 520D.

In some embodiments, the device detects (662), via the input device, a relocation user input that starts at a location of a content item affordance of the second column and moves toward an edge of the second column. For example, in FIG. 5AG, the device detects a multi-touch drag 581M that starts at a location of the second message affordance 520B in the second column 502 and moves toward the left edge of the second column.

In some embodiments, in response to detecting the relocation user input, the device displays (664) the third column in the application region. For example, in FIG. 5AI, the device displays the third column 503 in response to detecting the multi-touch drag 581M.

It should be understood that the particular order in which the operations in FIGS. 6A-6D have been described is merely example and is not intended to indicate that the described order is the only order in which the operations could be performed. One of ordinary skill in the art would recognize various ways to reorder the operations described herein.

Figure 7:
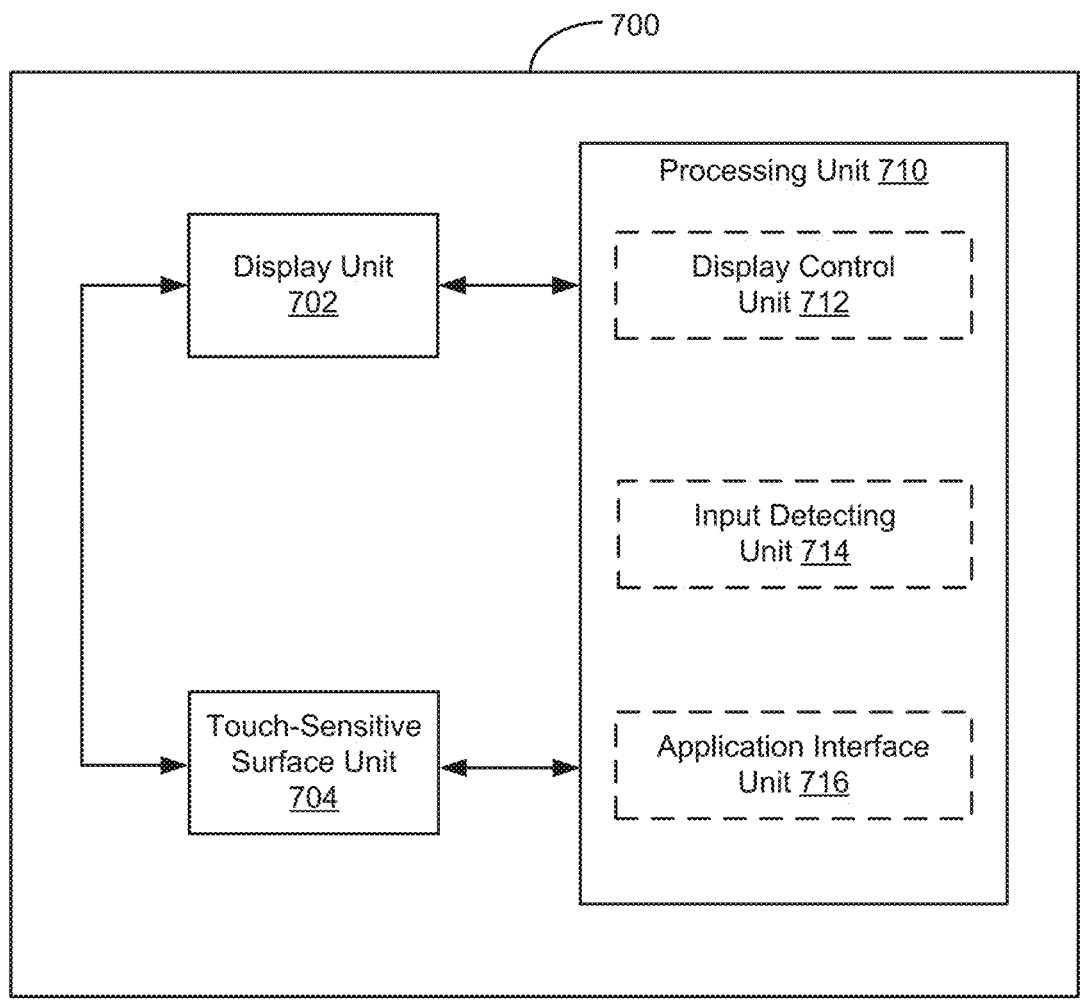
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a user interface, a touch-sensitive surface unit 704 configured to receive contacts, and a processing unit 710 coupled with the display unit 702 and the touch-sensitive surface unit 704. In some embodiments, the processing unit 710 includes a display control unit 712, an input detecting unit 714, and an application interface unit 716.

The processing unit 710 is configured to display (e.g., with the display control unit 712), on the display unit 702, a first column and a second column in an application region.

The processing unit 710 is configured to detect (e.g., with the input detecting unit 714), via the touch-sensitive surface unit 704, a first user input that starts at a location at a top of the application region and moves toward an edge of the application region. The first user input can be, for example, a swipe, a drag, of a flick.

The processing unit 710 is configured to change (e.g., with the application interface unit 716) the number of columns displayed in the application region.

The processing unit 710 is configured to, in accordance with a determination that the first user input was in a first direction, display (e.g., with the display control unit 712) a third column in the application region while maintaining display of the first column and the second column in the application region. In some embodiments, the processing unit 710 is configured to, in response to detecting (e.g., with the input detecting unit 714) a first portion of the first user input, partially display (e.g., with the display control unit 712) the third column in the application region. In some embodiments, the processing unit 710 is configured to, in response to detecting (e.g., with the input detecting unit 714) a second portion of the first user input, fully display (e.g., with the input detecting unit 714) the third column in the application region. In some embodiments, the processing unit 710 is configured to, in accordance with a determination that the first user input included less than a threshold amount of movement toward the edge of the application region, cease display (e.g., with the display control unit 712) of the third column in the application region.

In some embodiments, the processing unit 710 is configured to, in accordance with a determination that the first user input was in a second direction, cease display (e.g., with the display control unit 712) of the second column in the application region while maintaining display of the first column in the application region. In some embodiments, the processing unit 710 is configured to, in response to detecting a first portion of the first user input, partially display (e.g., with the display control unit 712) the second column in the application region. In some embodiments, the processing unit 710 is configure to, in response to detecting a second portion of the first user input, cease display (e.g., with the display control unit 712) of the second column in the application region.

In some embodiments, the processing unit 710 is configured to change the number of columns displayed in the application region (e.g., with the application interface unit 716) without changing a size of the application. In some embodiments, the processing unit 710 is configured to change the number of columns displayed in the application region (e.g., with the application interface unit 716) without changing a size of the second column.

In some embodiments, the first column displays a content file and the second column displays a list of content files. Thus, in some embodiments, the processing unit 710 is configured to, in response to detecting a user input (e.g., with the input detecting unit 714) at a location of one of the list of content files, change display (e.g., with the display control unit 712) of the first column to display the corresponding content file.

In some embodiments, the second column displays a list of content files and the third column displays a list of content folders. Thus, in some embodiments, the processing unit 710 is configured to, in response to detecting a user input (e.g., with the input detecting unit 714), change display (e.g., with the display control unit 712) of the second column to display the corresponding list of content files.

In some embodiments, the processing unit 710 is configured to, in accordance with a determination that the first user input included a first amount of movement toward the edge of the application region, change (e.g., with the application interface unit 716) the number of columns by a first number of columns. In some embodiments, the processing unit 710 is configured to, in accordance with a determination that the first user input included a second amount of movement, greater than the first amount of movement, toward the edge of the application region, change (e.g., with the application interface unit 716) the number of columns by a second number of columns greater than the first number of columns. In some embodiments, the processing unit 710 is configured to, in accordance with a determination that the first user input included a third amount of movement, greater than the second amount of movement, toward the edge of the application region, change (e.g., with the application interface unit 716) the number of columns by the second number of columns and display (e.g., with the display control unit 712) a different column in the application region.

In some embodiments, while displaying the third column in the application region, the processing unit 710 is configured to detect (e.g., with the input detecting unit 714), via the touch-sensitive surface unit 704, a second user input that starts at a location at a top of the application region and moves toward an edge of the application region.

In some embodiments, the processing unit 710 is configured to, in response to detecting the second user input, change (e.g., with the application interface unit 716) the number of columns displayed in the application region. In some embodiments, the processing unit 710 is configured to, in accordance with a determination that the second user input was in a second direction, cease display (e.g., with the display control unit 712) of the third column in the application region. In some embodiments, the processing unit 710 is configured to, in accordance with a determination that the second user input included a first amount of movement toward the edge of the application region, cease display (e.g., with the display control unit 712) of the third column in the application region while maintaining display of the first column and second column in the application region. In some embodiments, the processing unit 710 is configured to, in accordance with a determination that the second user input included a second amount of movement, greater than the first amount of movement, toward the edge of the application region, cease display (e.g., with the display control unit 712) of the third column and second column in the application region while maintaining display of the first column in the application region. In some embodiments, the processing unit 710 is configured to, in accordance with a determination that the second user input included a third amount of movement, greater than the second amount of movement, toward the edge of the application region, display (e.g., with the display control unit 712) a fourth column in the application region. In some embodiments, the fourth column displays a list of settings for an application of the application region.

In some embodiments, the processing unit 710 is configured to detect (e.g., with the input detecting unit 714), via the touch-sensitive surface unit 704, a resizing user input at a location between the first column and the second column. In some embodiments, the processing unit 710 is configured to, in response to detecting the resizing user input, change (e.g., with the application interface unit 716) a size of the first column and a size of the second column.

In some embodiments, the processing unit 710 is configured to detect (e.g., with the input detecting unit 714), via the touch-sensitive surface unit 704, an interaction user input at a location within an interaction region of a respective column displayed in the application region and moves toward an edge of the interaction region. In some embodiments, the processing unit 710 is configured to, in response to detecting the interaction user input, change (e.g., with the application interface unit 716) display of the interaction region.

In some embodiments, the processing unit 710 is configured to detect (e.g., with the input detecting unit 714), via the touch-sensitive surface unit 704, a relocation user input at a location of a content item affordance of the second column and moves toward an edge of the second column. In some embodiments, the processing unit 710 is configured to, in response to detecting the relocation user input, display (e.g., with the display control unit 712) the third column in the application region.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, displaying operation 602, detecting operation 604, and changing operation 606 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
 at a device with one or more processors, non-transitory memory, a display, and an input device:
  displaying, on the display, a first column and a second column in an application region of a messaging application, wherein the second column includes a plurality of representations of a respective plurality of messages associated with a first folder and the first column includes content of a first message of the plurality of messages;
  detecting, via the input device, a movement of a single contact that starts at a location at a top of the second column within the application region and moves toward an edge of the application region; and
  in response to detecting the movement of the single contact, changing a number of columns displayed in the application region, wherein changing the number of columns displayed in the application region includes, in accordance with a determination that the movement of the single contact was in a first direction, displaying a third column in the application region by displaying an entirety of the first column with a reduced size and maintaining a size of the second column in the application region, wherein the third column includes a plurality of representations of a respective plurality of folders including the first folder.

2. The method of claim 1, wherein displaying the third column in the application region includes, in response to a detecting a first portion of the movement of the single contact, partially displaying the third column in the application region and, in response to detecting a second portion of the movement of the single contact, fully displaying the third column in the application region.

3. The method of claim 1, wherein displaying the third column in the application region includes, in accordance with a determination that the movement of the single contact included less than a threshold amount of movement toward the edge of the application region, ceasing display of the third column in the application region.

4. The method of claim 1, wherein changing the number of columns displayed in the application region includes, in accordance with a determination that the movement of the single contact was in a second direction, ceasing display of the second column in the application region while maintaining display of the first column in the application region.

5. The method of claim 4, wherein ceasing display of the second column in the application region includes, in response to detecting a first portion of the movement of the single contact, partially displaying the second column in the application region and, in response to detecting a second portion of the movement of the single contact, ceasing display of the second column in the application region.

6. The method of claim 1, further comprising, while displaying the third column in the application region:
 detecting, via the input device, another movement of a single contact that starts at a location at a top of the application region and moves toward an edge of the application region; and
 in response to detecting the other movement of the single contact, changing the number of columns displayed in the application region, wherein changing the number of columns displayed in the application region includes, in accordance with a determination that the other movement of the single contact was in a second direction, ceasing display of the third column in the application region.

7. The method of claim 6, wherein changing the number of columns includes:
 in accordance with a determination that the other movement of the single contact included a first amount of movement toward the edge of the application region, ceasing display of the third column in the application region while maintaining display of the first column and second column in the application region; and
 in accordance with a determination that the other movement of the single contact included a second amount of movement, greater than the first amount of movement, toward the edge of the application region, ceasing display of the third column and second column in the application region while maintaining display of the first column in the application region.

8. The method of claim 7, wherein changing the number of columns further includes, in accordance with a determination that the other movement of the single contact included a third amount of movement, greater than the second amount of movement, toward the edge of the application region, displaying a fourth column in the application region.

9. The method of claim 8, wherein the fourth column displays a list of settings for the messaging application.

10. The method of claim 1, wherein changing the number of columns displayed in the application region does not include changing a size of the application region.

11. The method of claim 1, further comprising:
detecting a resizing user input at a location between the first column and the second column;
in response to detecting the resizing user input, changing a size of the first column and the size of the second column.

12. The method of claim 1, further comprising, in response to detecting a user input at a location of one of the representations of the respective plurality of messages, changing display of the first column to include content of a second message of the plurality of messages.

13. The method of claim 1, further comprising, in response to detecting a user input at a location of one of the representations of the respective plurality of folders, changing display of the second column to include a plurality of representations of a respective plurality of messages associated with a second folder.

14. The method of claim 1, wherein changing the number of columns displayed in the application region includes:
in accordance with a determination that the movement of the single contact included a first amount of movement toward the edge of the application region, changing the number of columns by a first number of columns; and
in accordance with a determination that the movement of the single contact included a second amount of movement, greater than the first amount of movement, toward the edge of the application region, changing the number of columns by a second number of columns greater than the first number of columns.

15. The method of claim 14, further comprising, in accordance with a determination that the movement of the single contact included a third amount of movement, greater than the second amount of movement, toward the edge of the user interface, decreasing the number of columns by the second number of columns and displaying a different column in the application region.

16. The method of claim 1, further comprising:
detecting, via the input device, an interaction user input that starts at a location within an interaction region of a respective column displayed in the application region and moves toward an edge of the interaction region; and
in response to detecting the interaction user input, changing display of interaction region.

17. The method of claim 1, further comprising:
detecting, via the input device, a relocation user input that starts at a location of a content item affordance of the second column and moves toward an edge of the second column; and
in response to detecting the relocation user input, displaying the third column in the application region.

18. A non-transitory computer readable storage medium storing one or more programs, the one or more programs comprising instructions, which, when executed by an electronic device with a display, and an input device, cause the electronic device to:
display, on the display, a first column and a second column in an application region of a messaging application, wherein the second column includes a plurality of representations of a respective plurality of messages associated with a first folder and the first column includes content of a first message of the plurality of messages;
detect, via the input device, a movement of a single contact that starts at a location at a top of the second column within the application region and moves toward an edge of the application region; and
in response to detecting the movement of the single contact, change a number of columns displayed in the application region, wherein changing the number of columns displayed in the application region includes, in accordance with a determination that the movement of the single contact was in a first direction, displaying a third column in the application region by displaying an entirety of the first column with a reduced size and maintaining a size of the second column in the application region, wherein the third column includes a plurality of representations of a respective plurality of folders including the first folder.

19. The non-transitory computer readable storage medium of claim 18, wherein displaying the third column in the application region includes, in response to a detecting a first portion of the movement of the single contact, partially displaying the third column in the application region and, in response to detecting a second portion of the movement of the single contact, fully displaying the third column in the application region.

20. The non-transitory computer readable storage medium of claim 18, wherein displaying the third column in the application region includes, in accordance with a determination that the movement of the single contact included less than a threshold amount of movement toward the edge of the application region, ceasing display of the third column in the application region.

21. The non-transitory computer readable storage medium of claim 18, wherein changing the number of columns displayed in the application region includes, in accordance with a determination that the movement of the single contact was in a second direction, ceasing display of the second column in the application region while maintaining display of the first column in the application region.

22. The non-transitory computer readable storage medium of claim 21, wherein ceasing display of the second column in the application region includes, in response to detecting a first portion of the movement of the single contact, partially displaying the second column in the application region and, in response to detecting a second portion of the movement of the single contact, ceasing display of the second column in the application region.

23. An electronic device comprising:
a display unit configured to display a user interface;
one or more input units configured to receive inputs; and
a processing unit coupled with the display unit and the one or more input units, the processing unit configured to:
display, on the display unit, a first column and a second column in an application region of a messaging application, wherein the second column includes a plurality of representations of a respective plurality of messages associated with a first folder and the first column includes content of a first message of the plurality of messages;
detect, via the one or more input units, a movement of a single contact that starts at a location at a top of the second column within the application region and moves toward an edge of the application region; and in response to detecting the movement of the single contact, change a number of columns displayed in the application region by, in accordance with a determination that the movement of the single contact was in a first direction, displaying a third column in the application region by displaying an entirety of the first column with a reduced size and maintaining a size of the second column in the application region, wherein the third column includes a plurality of representations of a respective plurality of folders including the first folder.

24. The electronic device of claim 23, wherein the processing unit is configured to display the third column in the application region by, in response to a detecting a first portion of the movement of the single contact, partially displaying the third column in the application region and, in response to detecting a second portion of the movement of the single contact, fully displaying the third column in the application region.

25. The electronic device of claim 23, wherein the processing unit is configured to display the third column in the application region by, in accordance with a determination that the movement of the single contact included less than a threshold amount of movement toward the edge of the application region, ceasing display of the third column in the application region.

26. The electronic device of claim 23, wherein the processing unit is configured to change the number of columns displayed in the application region by, in accordance with a determination that the movement of the single contact was in a second direction, ceasing display of the second column in the application region while maintaining display of the first column in the application region.

27. The electronic device of claim 26, wherein the processing unit is configured to cease display of the second column in the application region by, in response to detecting a first portion of the movement of the single contact, partially displaying the second column in the application region and, in response to detecting a second portion of the movement of the single contact, ceasing display of the second column in the application region.

28. The electronic device of claim 23, wherein the processing unit is further configured to, while displaying the third column in the application region:

detect, via the one or more input devices, another movement of a single contact that starts at a location at a top of the application region and moves toward an edge of the application region; and in response to detecting the other movement of the single contact, change the number of columns displayed in the application region by, in accordance with a determination that the other movement of the single contact was in a second direction, ceasing display of the third column in the application region.

29. The electronic device of claim 28, wherein the processing unit is configured to change the number of columns by:

in accordance with a determination that the other movement of the single contact included a first amount of movement toward the edge of the application region, ceasing display of the third column in the application region while maintaining display of the first column and second column in the application region; and in accordance with a determination that the other movement of the single contact included a second amount of movement, greater than the first amount of movement, toward the edge of the application region, ceasing display of the third column and second column in the application region while maintaining display of the first column in the application region.

30. The electronic device of claim 29, wherein the processing unit is further configured to change the number of columns by, in accordance with a determination that the other movement of the single contact included a third amount of movement, greater than the second amount of movement, toward the edge of the application region, displaying a fourth column in the application region.

31. The electronic device of claim 30, wherein the fourth column displays a list of settings for the messaging_application.

32. The electronic device of claim 23, wherein the processing unit is configured to change the number of columns displayed in the application region without changing a size of the application region.

* * * * *